(12) United States Patent
Blackford et al.

(10) Patent No.: US 8,083,131 B2
(45) Date of Patent: Dec. 27, 2011

(54) BANKING APPARATUS OPERATED RESPONSIVE TO DATA BEARING RECORDS

(75) Inventors: Damon J. Blackford, Akron, OH (US); Mike R. Ryan, Canton, OH (US); William D. Beskitt, Canton, OH (US); Thomas A. VanKirk, Wooster, OH (US); Stephen Stone, Streetsboro, OH (US); David A. Peters, Tallmadge, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 468 days.

(21) Appl. No.: 12/291,688

(22) Filed: Nov. 12, 2008

(65) Prior Publication Data
US 2009/0145961 A1    Jun. 11, 2009

Related U.S. Application Data

(63) Continuation-in-part of application No. 11/983,410, filed on Nov. 8, 2007.

(60) Provisional application No. 61/002,912, filed on Nov. 13, 2007, provisional application No. 61/002,910, filed on Nov. 13, 2007, provisional application No. 60/858,023, filed on Nov. 10, 2006.

(51) Int. Cl.
*G06Q 40/00* (2006.01)
*G06Q 20/00* (2006.01)
*G07D 11/00* (2006.01)
*G07F 19/00* (2006.01)
*G06K 5/00* (2006.01)

(52) U.S. Cl. ........ 235/379; 235/380; 235/381; 235/382; 705/43; 705/73

(58) Field of Classification Search .................. 235/435, 235/379–382; 705/43, 45, 73; 232/1 D; 902/8, 12
See application file for complete search history.

(56) References Cited

U.S. PATENT DOCUMENTS

| | | | | |
|---|---|---|---|---|
| 3,889,056 A | * | 6/1975 | Mayer et al. | 380/54 |
| 5,984,177 A | * | 11/1999 | Do et al. | 235/379 |
| 7,284,695 B1 | * | 10/2007 | Warren et al. | 235/379 |
| 7,467,744 B1 | * | 12/2008 | Crews et al. | 235/379 |
| 7,891,546 B1 | * | 2/2011 | Steinbach et al. | 235/375 |
| 7,896,228 B1 | * | 3/2011 | Motz et al. | 235/375 |
| 2004/0099727 A1 | * | 5/2004 | Magee et al. | 235/379 |
| 2004/0226991 A1 | * | 11/2004 | Utz et al. | 235/379 |
| 2004/0245333 A1 | * | 12/2004 | Kraft et al. | 235/381 |
| 2006/0131421 A1 | * | 6/2006 | Dunn et al. | 235/475 |
| 2006/0144923 A1 | * | 7/2006 | VanKirk et al. | 235/379 |

(Continued)

*Primary Examiner* — Daniel Walsh
(74) *Attorney, Agent, or Firm* — Ralph E. Jocke; Daniel D. Wasil; Walker & Jocke

(57) ABSTRACT

An automated banking machine controlled responsive to data bearing records includes a card reader that is operative to read data from user cards including identifying data and to authorize operation of an automated banking machine responsive to the identifying data. The automated banking machine includes a deposit accepting device. The deposit accepting device is operative to receive a stack of sheets and to separate each sheet from the stack through operation of a picker. Each sheet is aligned with the sheet path and analyzed by analysis devices including at least one magnetic read head, an imager and/or a validation device. Sheets determined not to have at least one property of a genuine sheet are returned to a user of the machine. Sheets determined to have at least one property of genuine sheets are processed and stored in the machine.

24 Claims, 45 Drawing Sheets

U.S. PATENT DOCUMENTS

| | | |
|---|---|---|
| 2006/0273159 A1* | 12/2006 | Utz et al. ............... 235/381 |
| 2007/0138255 A1* | 6/2007 | Carreon et al. ............ 235/379 |
| 2008/0023539 A1* | 1/2008 | Rao et al. ............... 235/379 |
| 2008/0110976 A1* | 5/2008 | Utz et al. ............... 235/379 |
| 2009/0145960 A1* | 6/2009 | Ryan et al. .............. 235/379 |
| 2009/0159659 A1* | 6/2009 | Norris et al. ............ 235/379 |
| 2011/0024494 A9* | 2/2011 | Rao et al. ............... 235/379 |

* cited by examiner

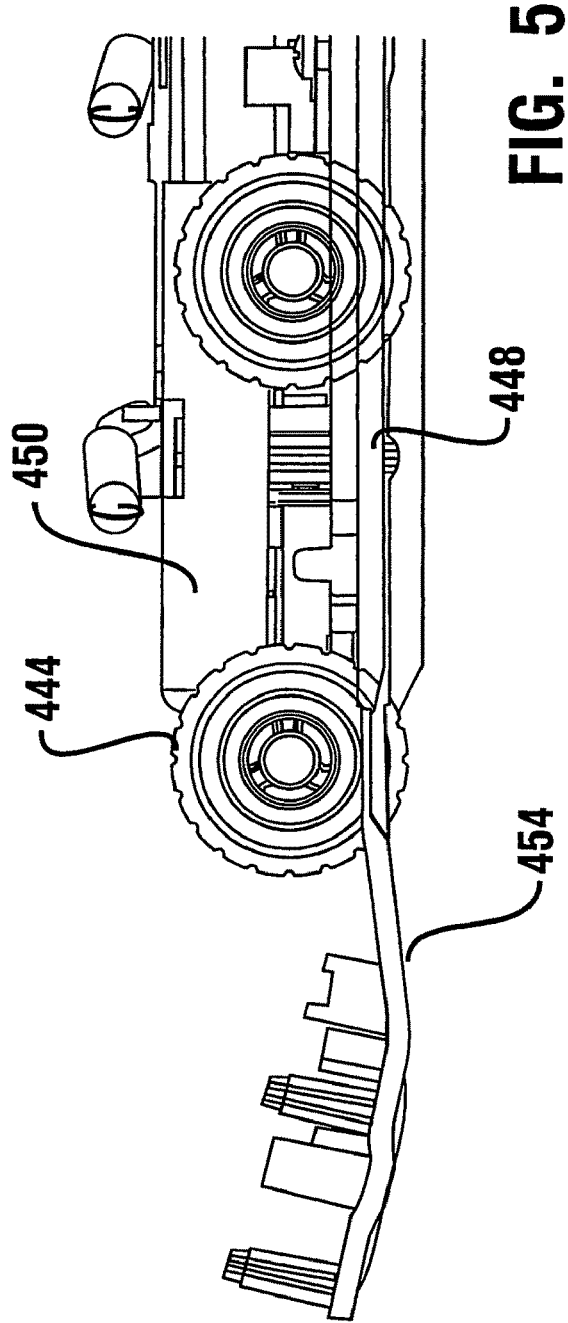
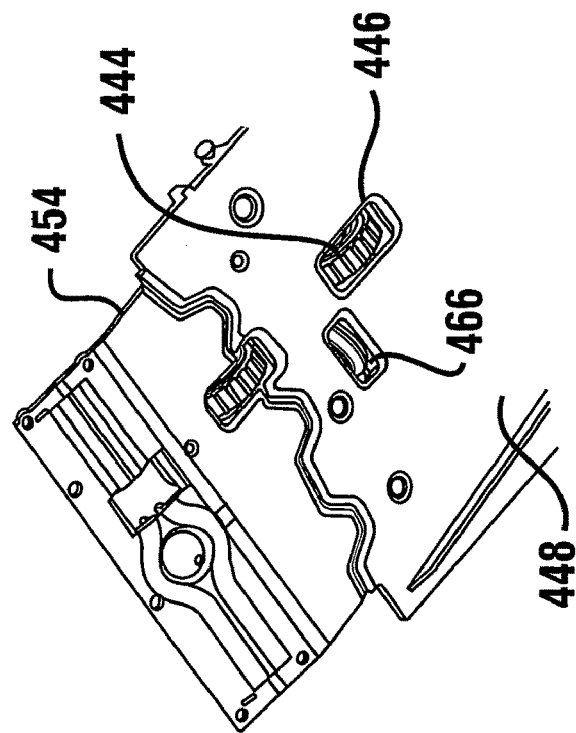
FIG. 5
FIG. 6

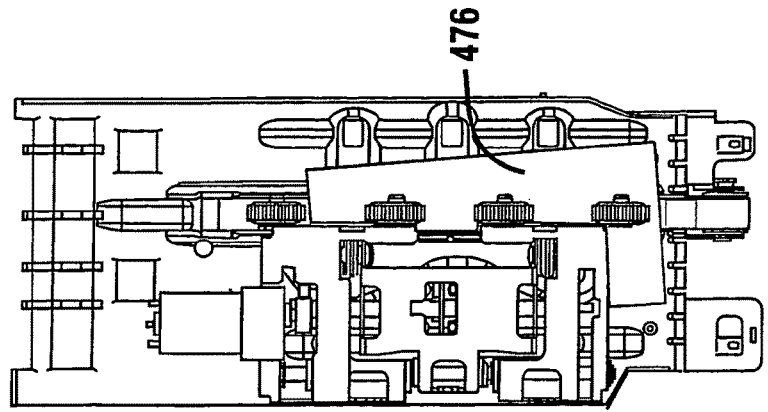
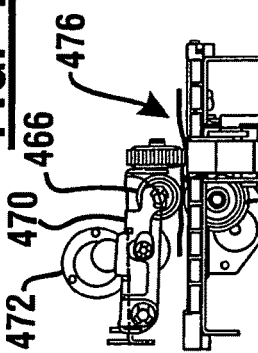
FIG. 11
FIG. 12
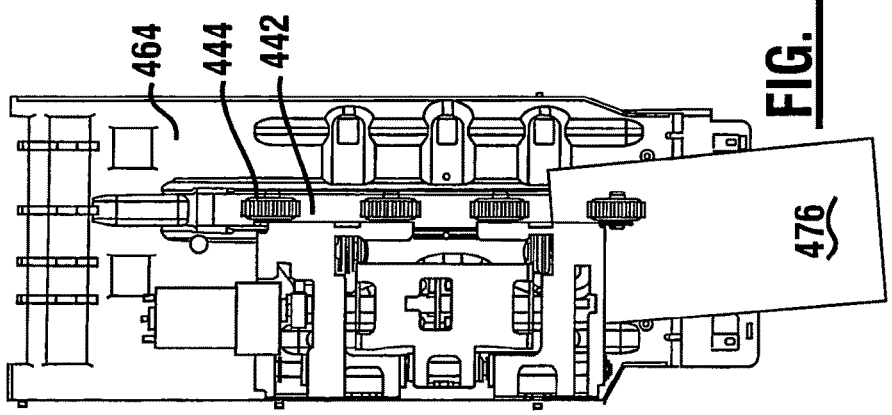
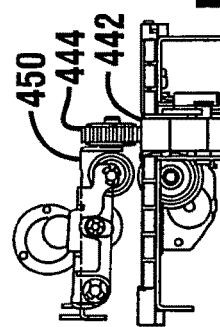
FIG. 9
FIG. 10
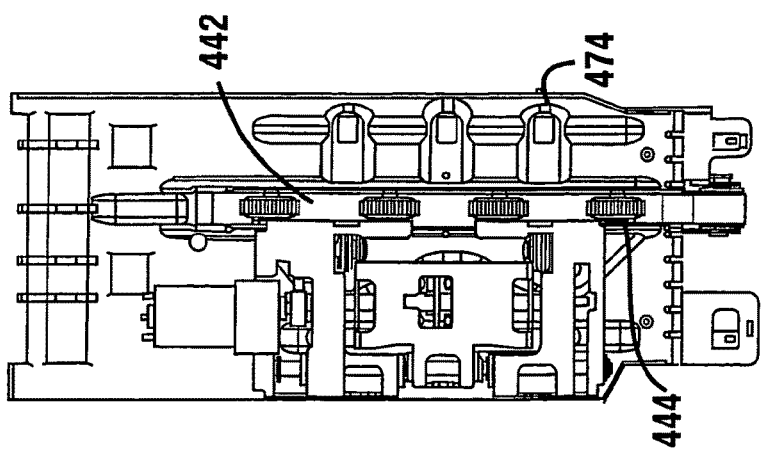
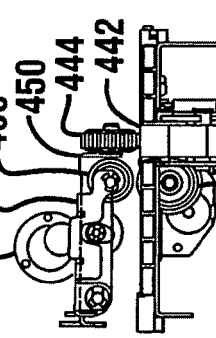
FIG. 7
FIG. 8

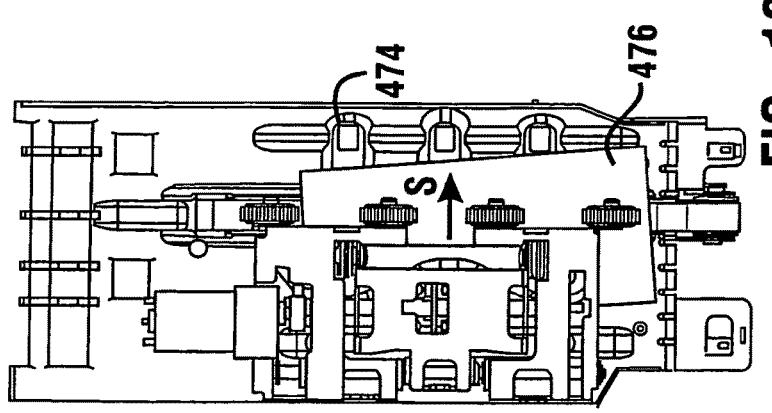
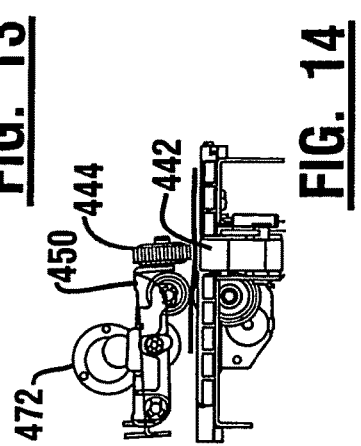
FIG. 13
FIG. 14
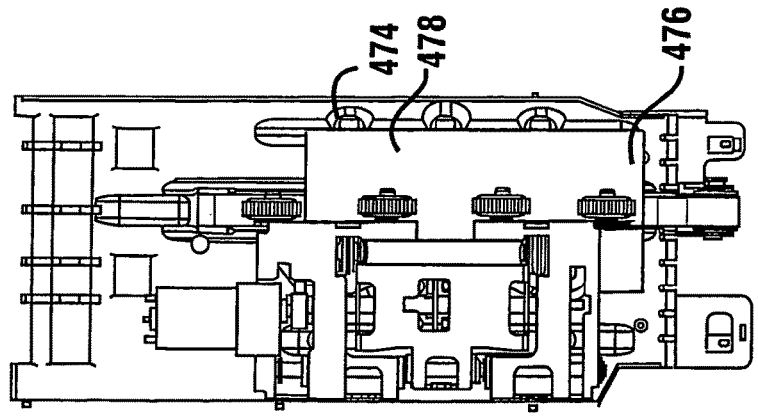
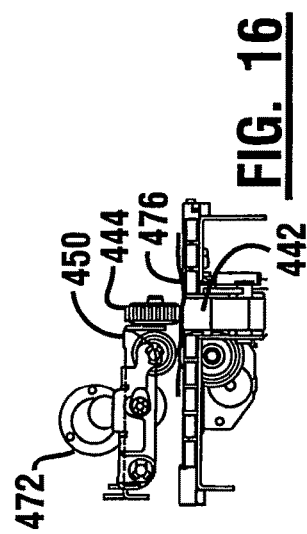
FIG. 15
FIG. 16
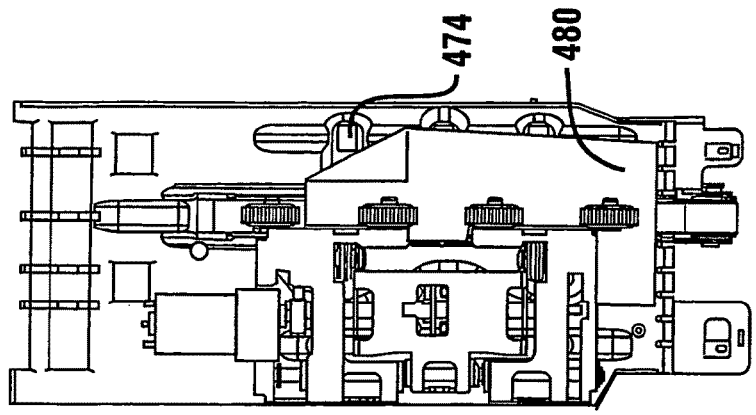
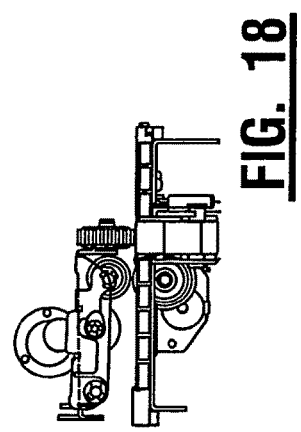
FIG. 17
FIG. 18

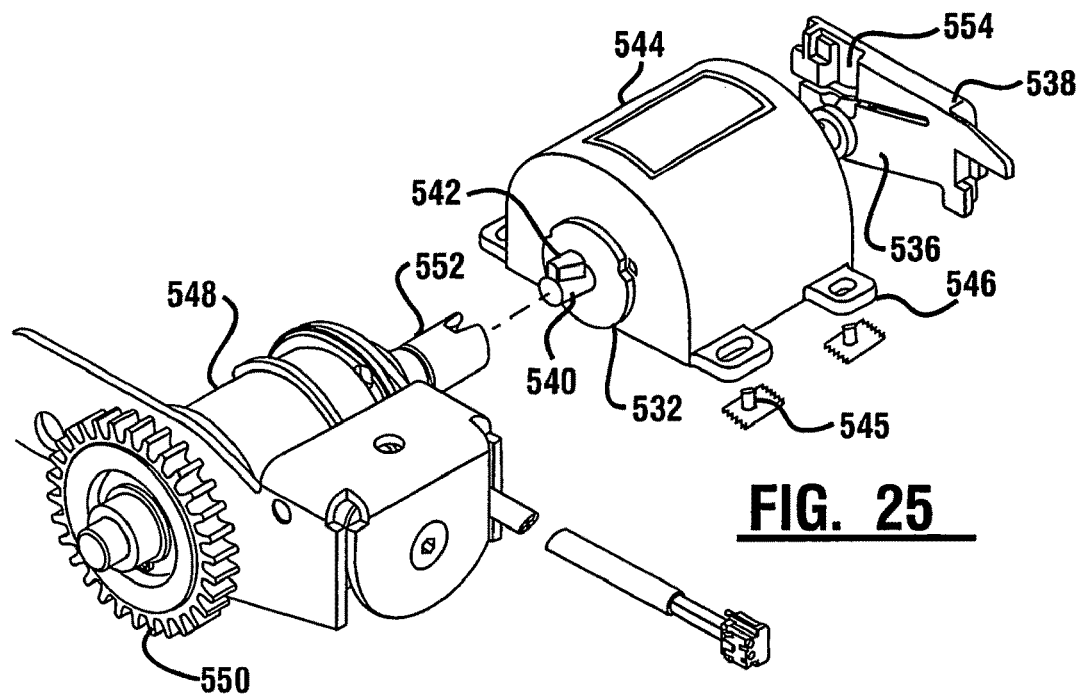
FIG. 25
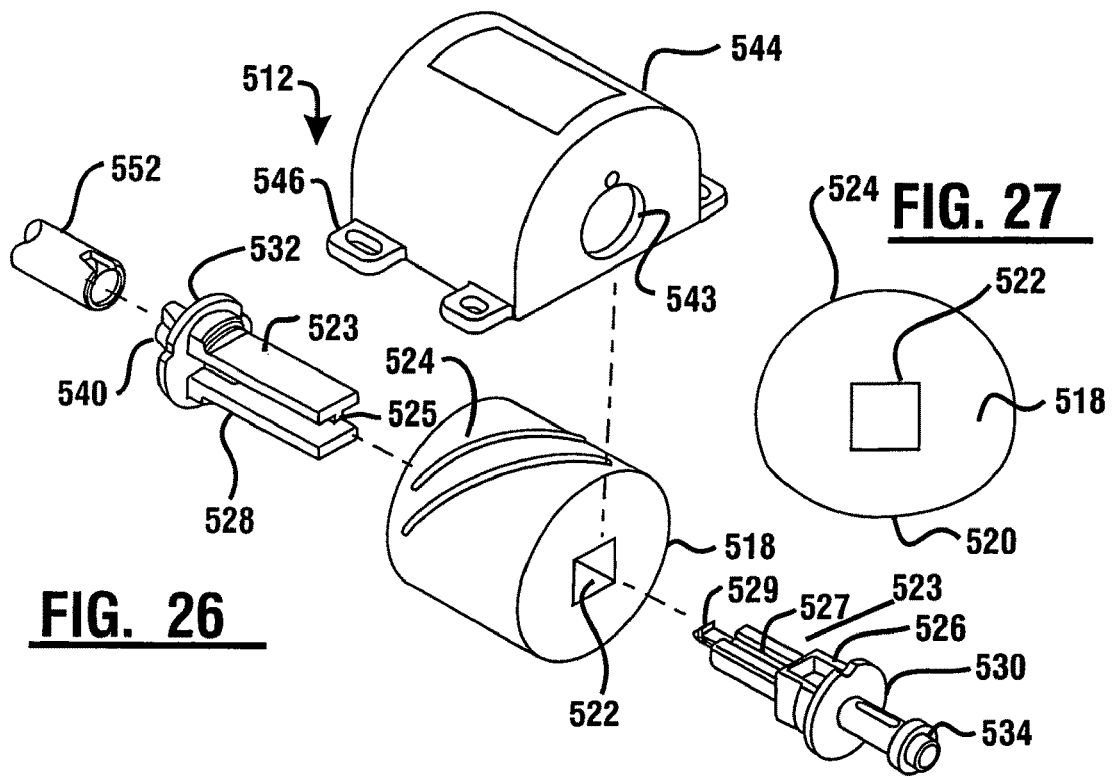
FIG. 26
FIG. 27

Gate is closed. Plate portions rest on lower platen.
Upper belt rests on lower belt.

Gate is open. Stop lifts plate portions up.
Checks are inserted to stop.
(Note - upper belt not shown)

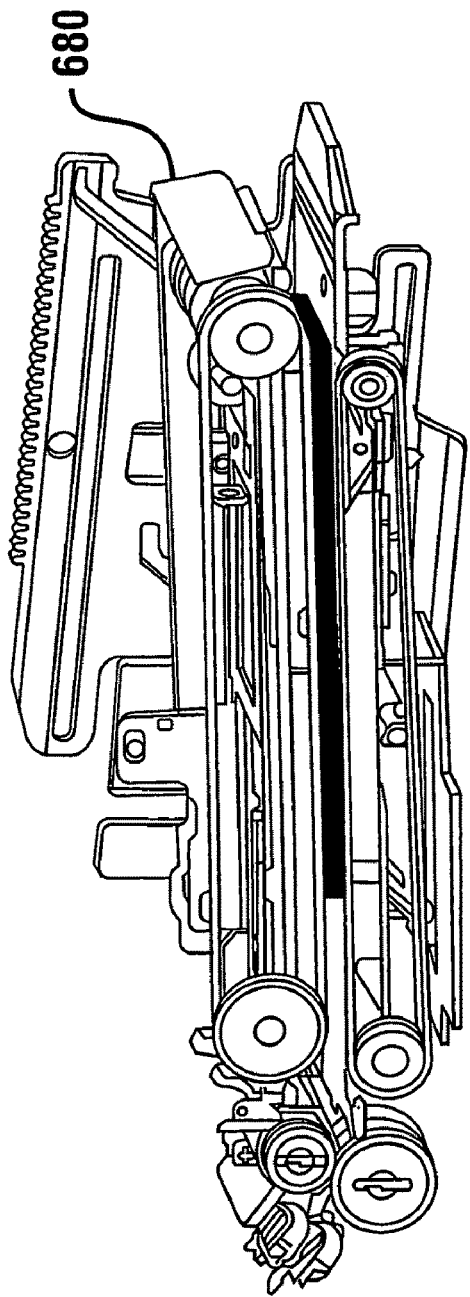
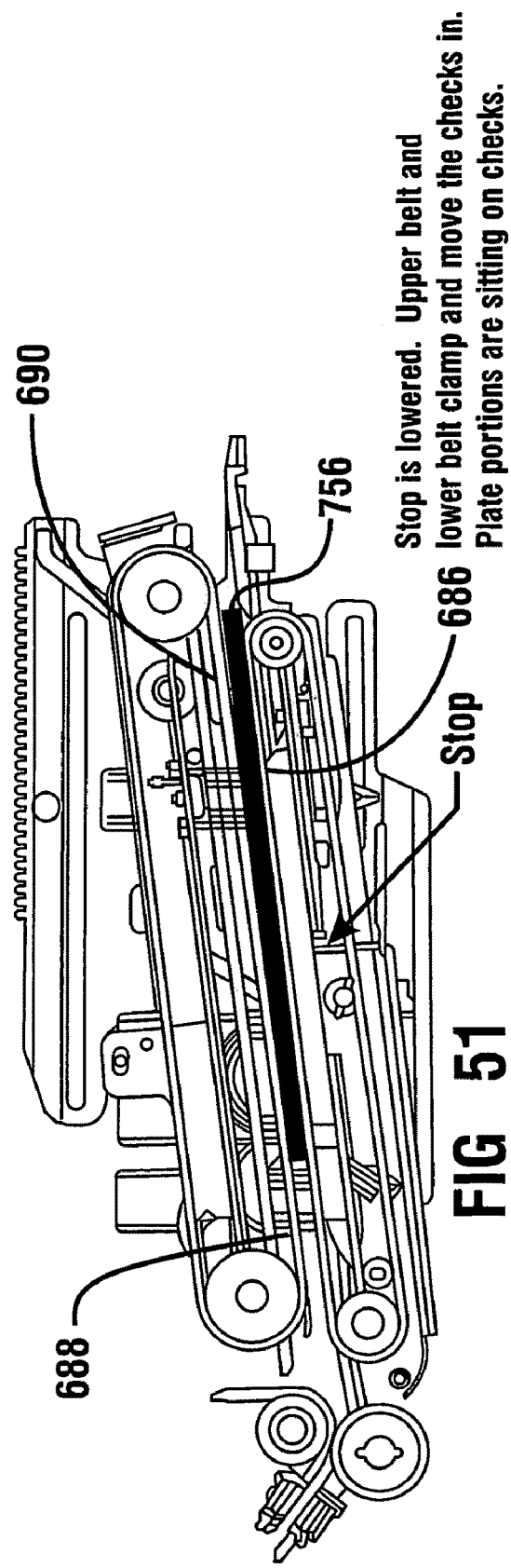
FIG 50
FIG 51
Stop is lowered. Upper belt and lower belt clamp and move the checks in. Plate portions are sitting on checks.

Gate is lowered

Both belts move the stack into pick up position.

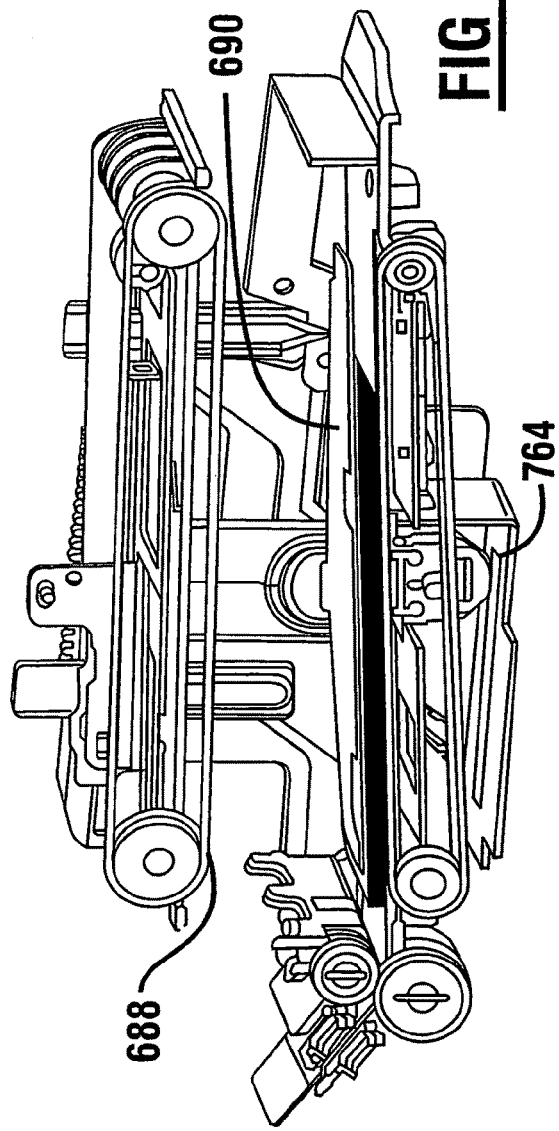
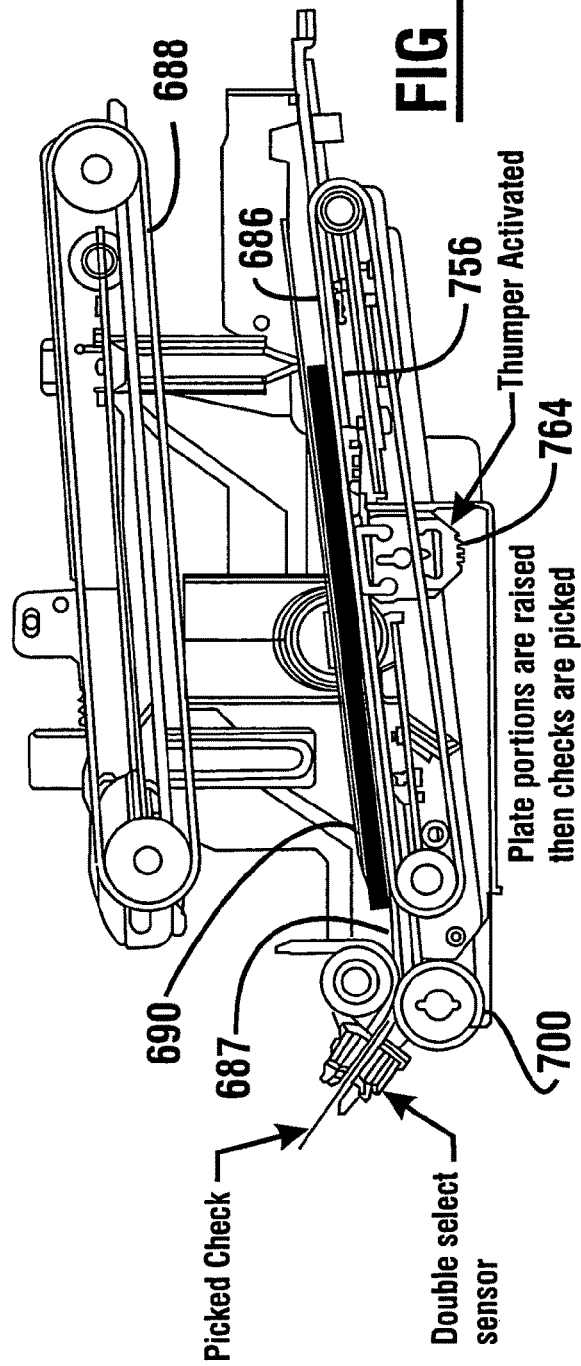

Rejected checks sit on top of plate portions.
Checks are fed into area via reject path.
Reject gate is lowered to redirect rejected
checks into reject path.

Rejected checks sit on top of plate portions.
Non-feed Checks are below plate portions.
Checks are clamped between upper belt and lower belt.
Gate is opened and both belts are run to feed checks back to customer.

690

If the customer doesn't take checks upper belt and lower belt pull checks back into the machine.

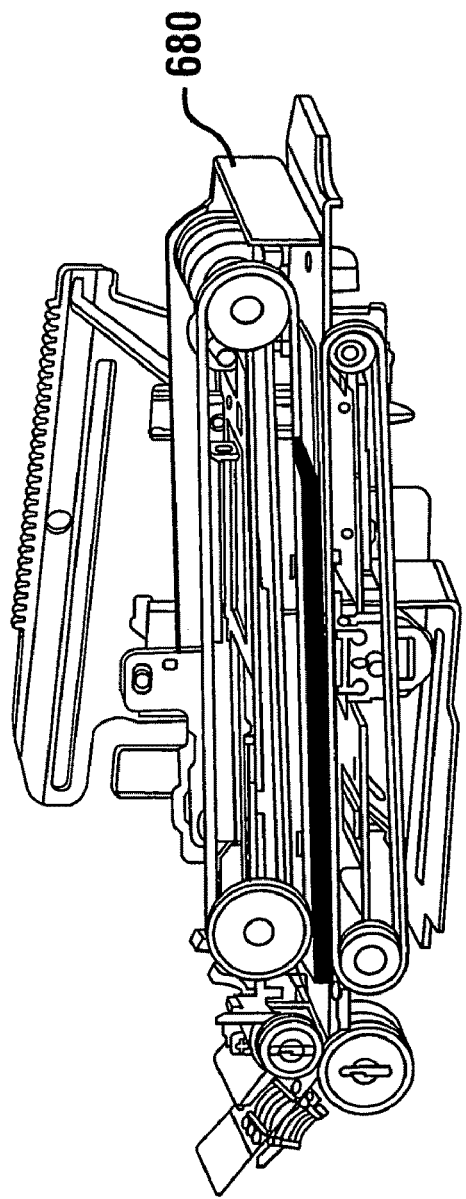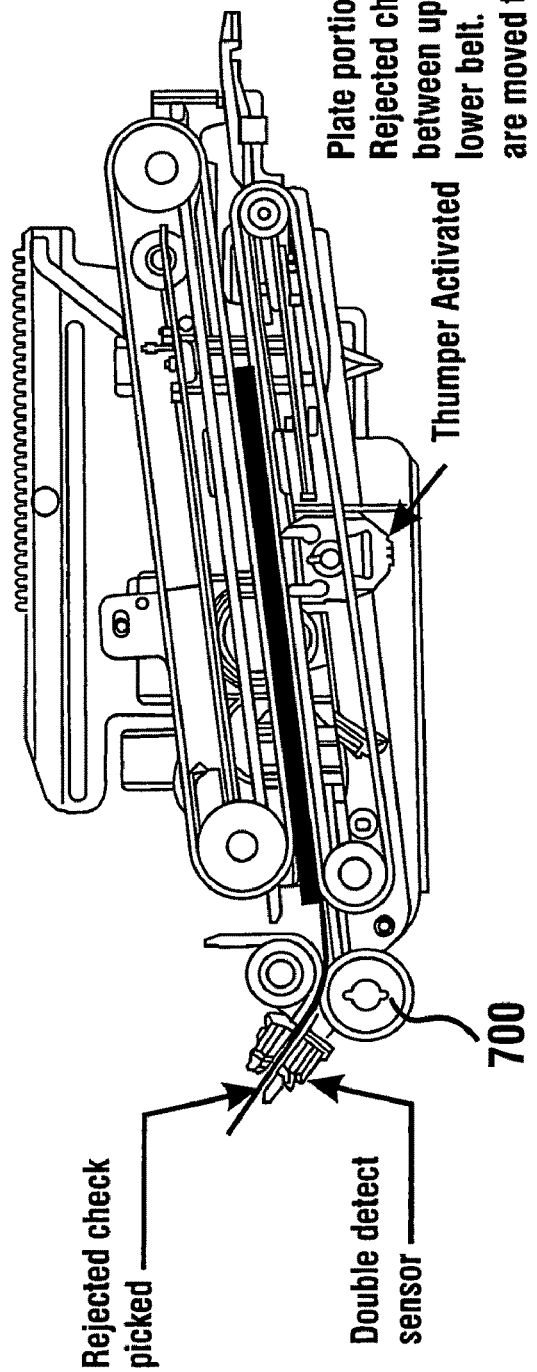

Plate portions sit on lower platen.
Rejected checks are above plate.
Rejected checks are clamped between upper belt and lower belt.
Gate is opened and both belts are run to feed rejected checks back to customer.

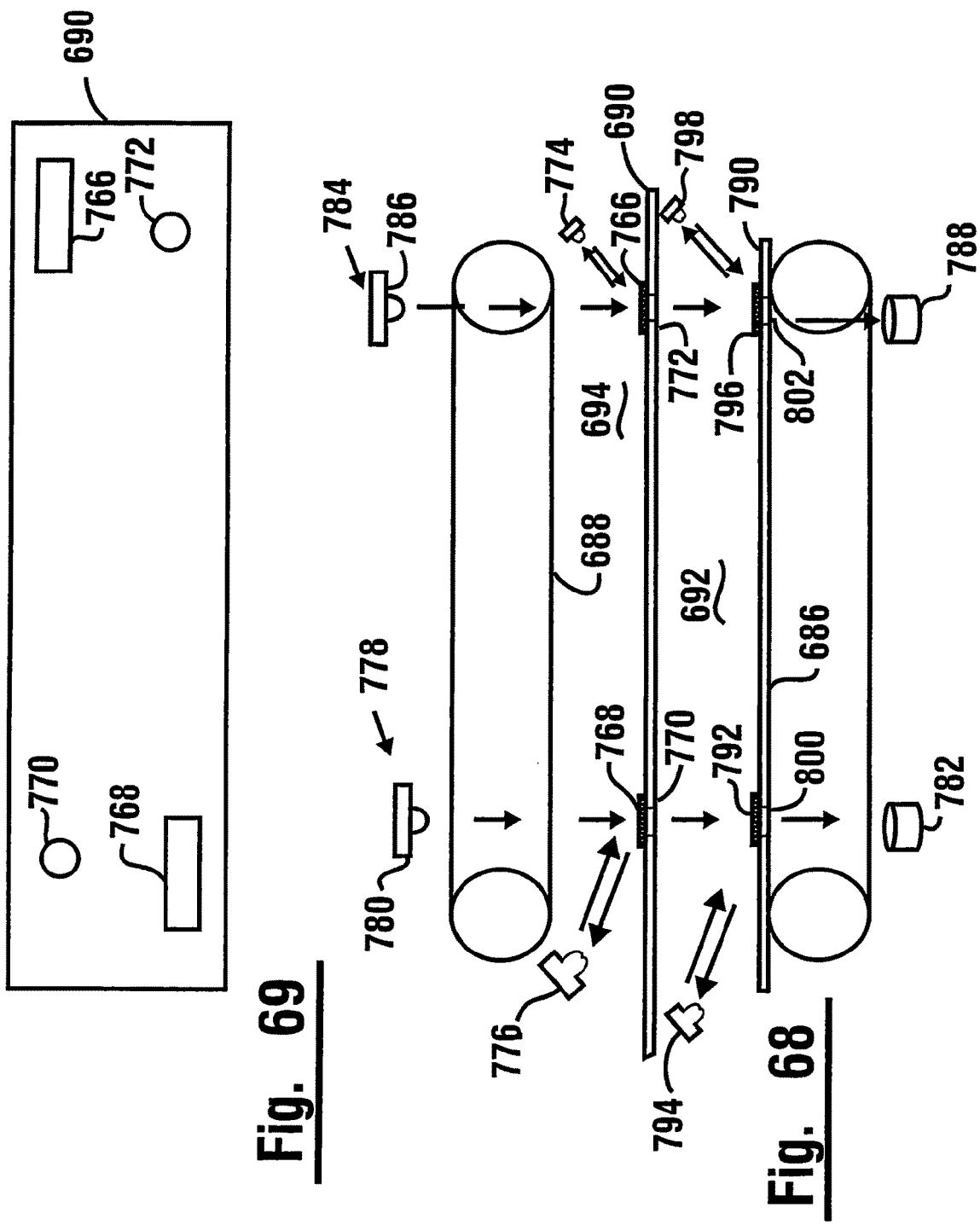

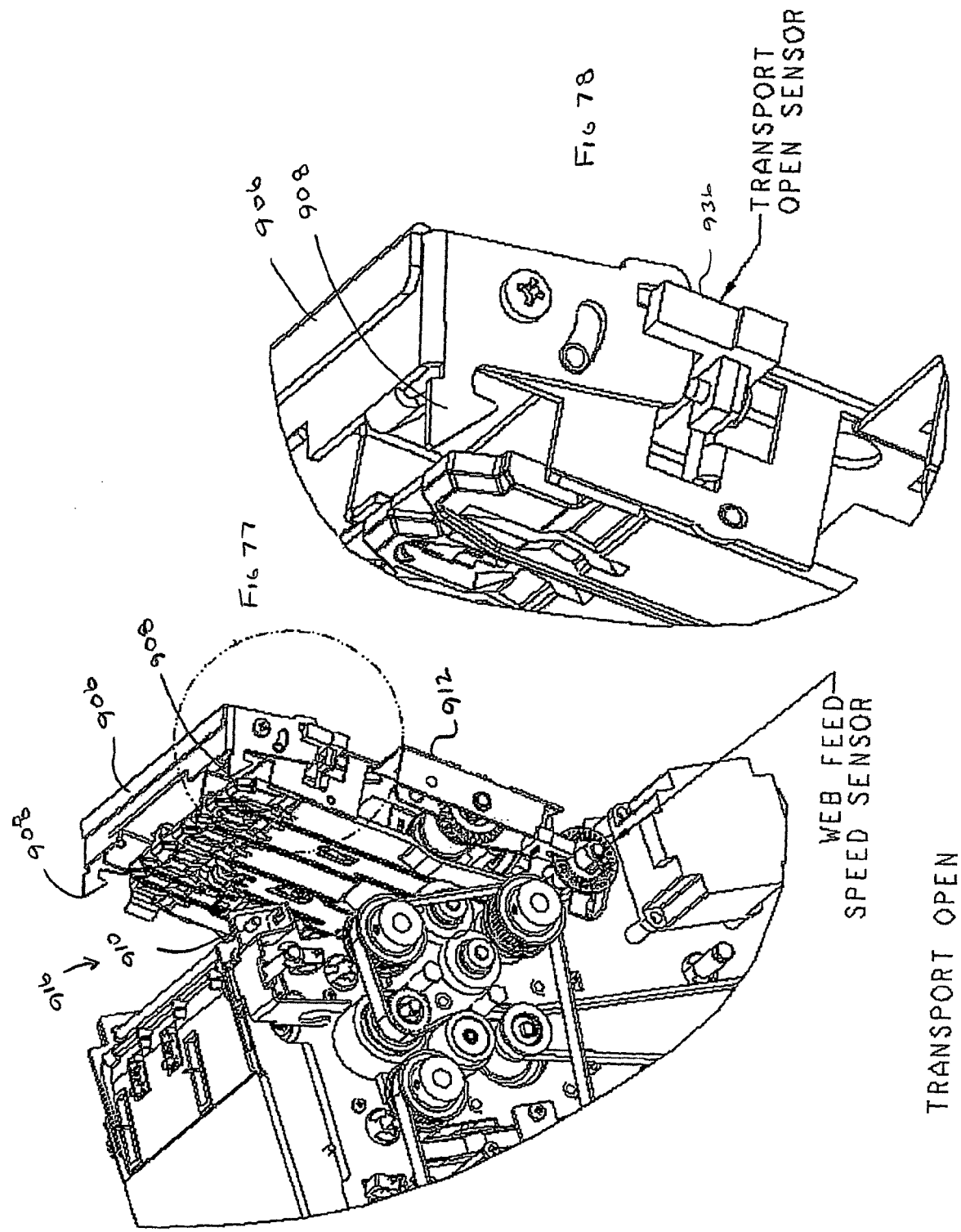

WEB/TAPE IS CLEAR WITH DIFFERENT BLACK PRINTING AT EACH END OF WEB/TAPE.

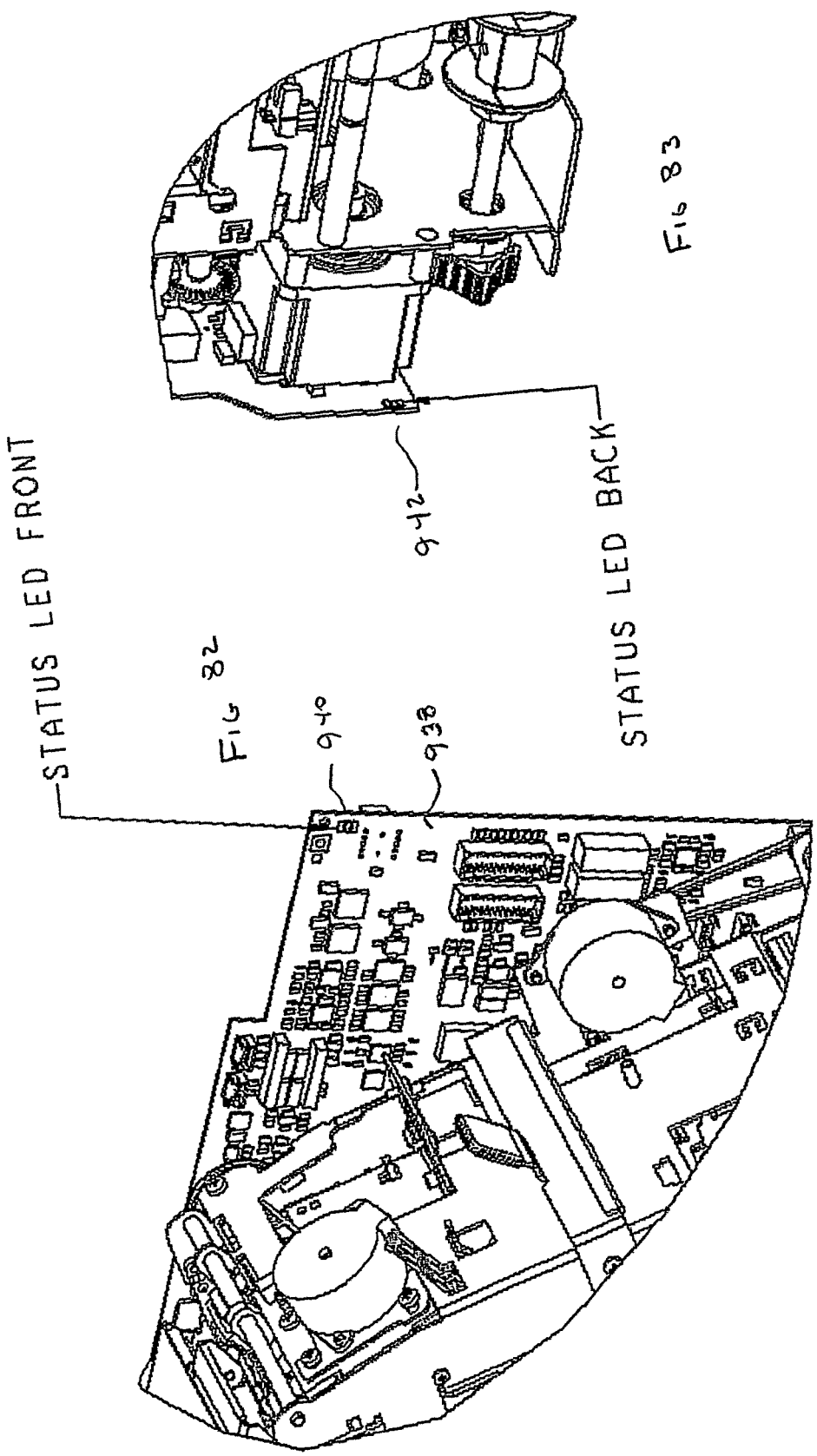

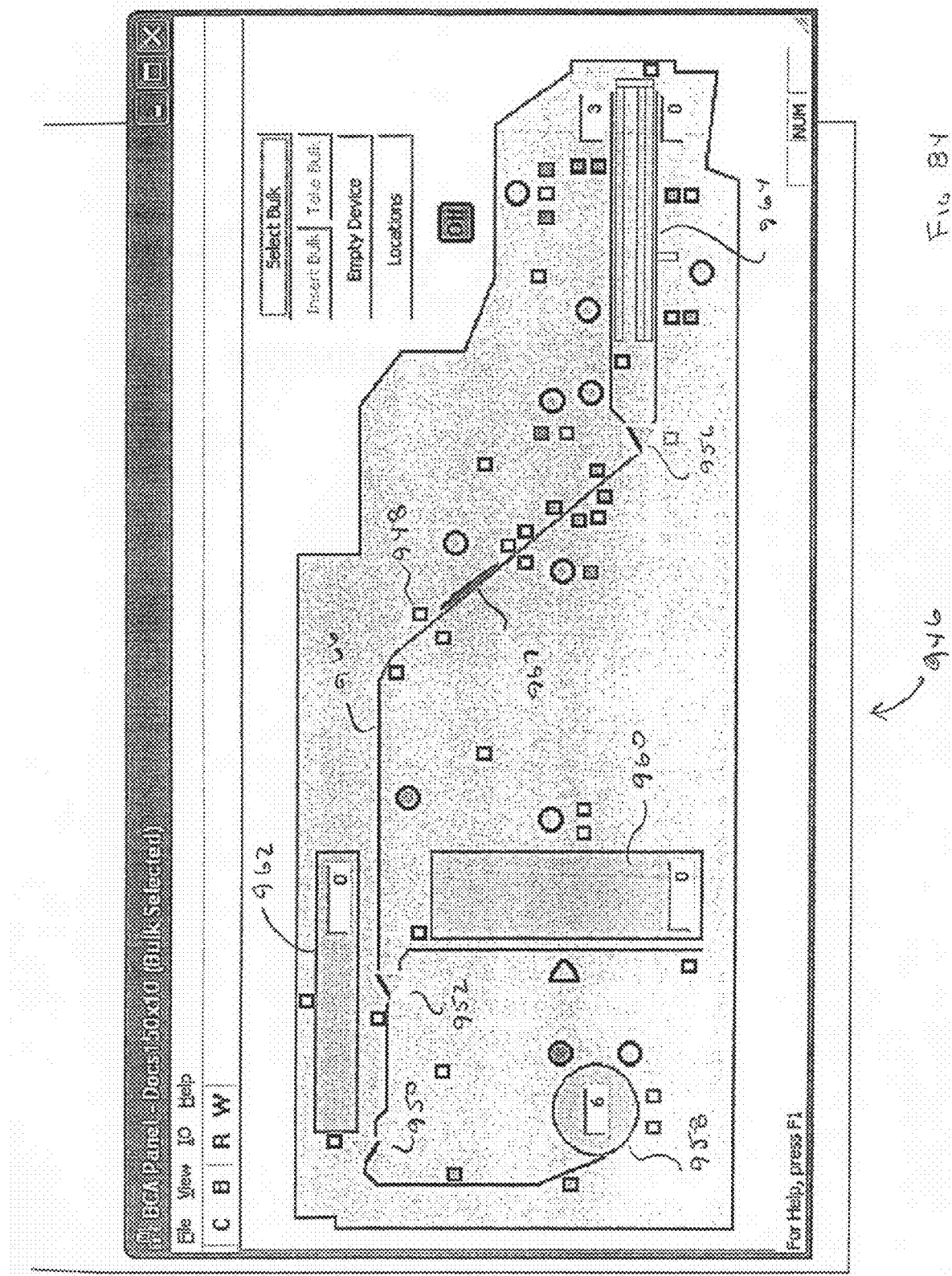

BANKING APPARATUS OPERATED RESPONSIVE TO DATA BEARING RECORDS

CROSS REFERENCE TO RELATED APPLICATIONS

This application claims benefit pursuant to 35 U.S.C. §119 (e) of Provisional Application Ser. Nos. 61/002,912 and 61/002,910 filed Nov. 13, 2007, the disclosures of which are incorporated herein by reference. This application is also a continuation-in-part of U.S. Ser. No. 11/983,410 filed Nov. 8, 2007, which claims benefit pursuant to 35 U.S.C. §119(e) of Provisional Application Ser. No. 60/858,023 filed Nov. 10, 2006 the disclosures of which are incorporated herein by reference.

TECHNICAL FIELD

This invention pertains to automated banking machines that operate responsive to data bearing records such as user cards and which may be classified in U.S. Class 235, Subclass 379.

BACKGROUND ART

Automated banking machines are known in the prior art. Such automated banking machines operate responsive to data read from coded records such as user cards. Automated banking machines are commonly used to carry out transactions such as dispensing cash, checking account balances, paying bills and/or receiving deposits from users. Other types of automated banking machines may be used to purchase tickets, to issue coupons, to present checks, to print scrip and/or to carry out other functions either for a consumer or a service provider. For purposes of this description any device which is used for carrying out transactions involving automated transfers of value shall be referred to as an automated banking machine.

Automated banking machines may benefit from improvements.

OBJECTS OF EXEMPLARY EMBODIMENTS

It is an object of an exemplary embodiment to provide an automated banking apparatus that operates responsive to data bearing records.

It is a further object of an exemplary embodiment to provide a coded record sensing device and method.

It is a further object of an exemplary embodiment to provide an automated banking machine.

It is a further object of an exemplary embodiment to provide a record controlled banking apparatus.

It is a further object of an exemplary embodiment to provide a deposit accepting apparatus which can be used to accept, image and verify the authenticity of items.

Further objects of exemplary embodiments will be made apparent in the following Description of Exemplary Embodiments and the appended claims.

In an exemplary embodiment an automated banking machine includes a card reader. The card reader is operative to read data included on user cards. The data read from user cards is used to identify authorized users who may perform transactions at the machine. The exemplary embodiment operates to accept documents. These documents may include checks, currency bills and/or other types of documents. A single deposit accepting device may accept multiple types of documents. In this embodiment a document such as a check is received through an opening in the housing of the banking machine and moved in a transport path therein in a first direction by a first transport. Sensors are operative to sense the document has moved into a suitable location within the device. The document is then disengaged from the first transport and engaged with a pair of second transports which are disposed from one another in the first direction. The second transports engage the document and are operative to move the document in the transport path a direction transverse of the first direction. The first transport disengages from the document such that the second transports can move the document and align an edge thereof extending along the first direction with a plurality of non-contact sensors. At least one processor operates in accordance with its programming to control the second transports and controls movement of the document in the second direction such that an edge of the document is aligned with the non-contact sensors which serve as a "virtual wall" for purposes of positioning the document.

Once the document is aligned such that an edge extends along the first direction in the desired orientation, the first transport reengages the document while the second transports disengage. The document is then moved again in the first direction past one or more appropriate sensing devices. In the exemplary embodiment because the document is aligned along the first direction, documents which are checks may have magnetic indicia such as the micr line or other portion thereof, read through operation of one or more magnetic sensors such as a magnetic read head. Alternatively or in addition when the document is moved in a first direction, the magnetic properties of the document may be read or otherwise sensed in a plurality of locations by one or more magnetic sensors which are operative to read magnetic properties of the document, including indicia thereon such as the micr line and/or other features.

In this exemplary embodiment the check is moved in a first direction past a pair of scanning sensors. The scanning sensors are operative to read optical indicia on each side of the check and to produce image data corresponding thereto. The data corresponding to the optical indicia may be processed such that data corresponding to images of the front and rear of the check or portions thereof are generated and stored through operation of the processor in one or more data stores of the banking machine. The indicia on the check may also be analyzed for purposes of determining information regarding on the check so that it can be used in conducting a transaction.

In this embodiment once a check has been moved past the sensors which capture data corresponding to optical indicia, the check is moved in generally the first direction into an area which may serve as an escrow area for checks. In some embodiments the escrow area may be of sufficient length so that multiple checks or other documents may be temporarily stored therein. In the exemplary embodiment, the machine operates to determine whether the check is to be accepted or returned to the customer while the check is held in the escrow area. For example in some embodiments one or more processors in the banking machine may operate to determine if the check can be sufficiently accurately read, redeemed for cash or otherwise processed while the check is stored in the escrow area. If it is determined that the check cannot be accepted, one or more transports are operative to move the check out of the banking machine so that the check is returned to the customer.

Alternatively if the check is found to be suitable for acceptance, the check is moved from the escrow area past one or more stamper printers. The stamper printer is operative to apply ink marks to one or more surfaces of the check so as to indicate that the check has been cancelled or otherwise processed. In an exemplary embodiment the check is thereafter moved into a vertically extending transport. As the check enters the vertical transport, printing is conducted on the check through operation of a suitable inkjet or other printer. Appropriate printing is applied to the check to indicate it has been cancelled or otherwise processed as the check moves past the inkjet printer. Of course printing of various indicia may be applied when other types of documents are processed.

In the exemplary embodiment the inkjet printer has aligned on an opposed side of the transport therefrom, an ink catcher mechanism. The ink catcher mechanism of the exemplary embodiment includes a movable head. The movable head includes an opening therein such that the opening may be aligned with the ink spraying nozzles on the head of the inkjet printer so as to receive ink therein that is not deposited on the check or other document. The exemplary embodiment of the movable head also includes a wiper. The head is moved through operation of a motor or other moving device at appropriate times so that the wiper engages the head of the inkjet printer so as to minimize the buildup of ink and contaminants thereon. This facilitates accurate printing and helps to minimize the risk of potential damage to checks by the accumulation of excess ink within the machine.

Checks or other documents that move past the printer in the vertical transport are moved downward in the exemplary embodiment into a storage area. Once the documents have moved adjacent a lower surface of the storage area a transversely movable plunger mechanism is operative to engage the check and move it out of the vertical transport. In an exemplary embodiment the plunger mechanism is operative to be movable such that the check can be either moved into a storage location on either transverse side of the vertical transport. Once the check is moved out of the transport by the plunger mechanism the check or other document may be held in intermediate relation between a pair of wall surfaces and a spring biased backing plate. As a result checks or other documents may be selectively moved by the plunger mechanism for storage in a selected one of the locations in the storage area.

Various approaches may be taken in the operation of automated banking machines for storing documents that are received by the document accepting mechanism. For example in some embodiments the mechanism may only accept checks. In such embodiments the machine may operate in accordance with its programming to segregate checks that are drawn on the particular institution owning the banking machine that receives the check, from checks that are drawn on other institutions. Alternatively the banking machine may be programmed to store valid checks in one compartment and suspect checks in another compartment. Alternatively in some other embodiments the document accepting mechanism may store multiple types of documents. For example in a banking machine that accepts currency bills and checks through the mechanism, bills may be stored in one compartment while checks are stored in another. Various approaches may be taken based on the programming of the particular automated banking machine.

In an alternative embodiment the automated banking machine includes a sheet access area which is operative to accept a stack including a plurality of sheets from a machine user. The sheet access area is bounded by a first sheet driver member and an opposed second sheet driver member. At least one divider plate extends vertically intermediate of the first and second sheet driver members. The at least one divider plate and second sheet driver member are relatively movable with respect to the first sheet driver member. The at least one divider plate is operative to separate a first side from a second side of the sheet access area.

In the exemplary embodiment, a first side of the sheet access area is operative to receive a stack of sheets from the machine user. The first side is in operative connection with a sheet picker that separates each sheet individually from the stack. The picker delivers each individual sheet to a transport in the sheet processing device which is alternatively referred to herein as a deposit accepting device. The sheet processing device is operative in conjunction with the machine to determine whether each of the sheets is acceptable, and if so acceptable sheets are accepted and stored in the machine. If not, the sheets are moved back toward the sheet access area. In the exemplary embodiment, a diverter moves and/or directs sheets to be delivered out of the machine from the at least one sheet processing device to the second side of the divider plate. In the exemplary embodiment the first sheet driver member and the second sheet driver member are operative to act through at least one opening in the at least one divider plate to move sheets both on the first side and the second side of the divider plate. Sheets to be returned to the banking machine user are moved by the first and second sheet driving members out of the sheet opening of the machine for delivery to the user.

In still other embodiments, radiation type sheet detectors are used in conjunction with the at least one divider plate to detect sheets on the first side and on the second side. A further radiation type sheet detector is used to detect sheets that may be present on either the first side or the second side. This is accomplished in an exemplary embodiment through the use of an angularly reflective piece in operative supported connection with at least one divider plate. The angularly reflective piece is operative to reflect radiation. The radiation in the exemplary embodiment is received and reflected at an acute angle relative to the divider plate. This enables a sensor including an emitter and receiver combination to be positioned transversely away from the divider plate. This enables successfully determining whether sheets are present on a particular side of the divider plate.

Further in the exemplary embodiment the at least one divider plate includes at least one aperture. At least one sensor includes a radiation emitter on a first side of the aperture and a radiation receiver on a second side of the aperture. Signals from this sensor are used by at least one processor in the machine to determine if sheets are present in the sheet access area either on the first side or the second side of the divider plate. As can be appreciated, in this embodiment at least one processor is operative to determine the presence of sheets and where they are in the sheet access area. This is possible because the sensor that senses radiation through the aperture is operative to determine if any sheets are present in the sheet access area regardless of whether they are on the first side or the second side of the divider plate. Further the radiation sensor is operative to sense radiation reflected from the radiation reflective piece. The signals corresponding to the magnitude of radiation sensed are used by at least one processor in the machine to determine if sheets are present on the side associated with the radiation reflective piece. As a result this exemplary arrangement enables determining if sheets are present and where they are located. Further in other exemplary embodiments the reflective piece may be used in connection with sheet engaging pieces in each of the first side and the second side. Further additional sensors may be used of the reflective or through type to determine sheet position in alternative embodiments.

In still other exemplary embodiments a sheet storage and retrieval device such as a belt recycler device may be used. The sheet storage and retrieval device may be used to store sheets that are being held pending determination whether they are suitable for storage in the machine, or should be returned to the customer. The first sheet storage and retrieval device may be used to selectively deliver sheets either to the sheet access area for return to the customer or for delivery to a sheet storage area.

In other exemplary embodiments a second sheet storage and retrieval device is positioned in operatively intermediate relation of the first sheet storage and retrieval device and the sheet access area. In some exemplary embodiments sheets stored in escrow in the first sheet storage and retrieval device are moved in a sheet path toward the sheet access area. A divider in operative connection with the sheet path is operative to divert sheets that are determined to have at least one property which indicates they should be stored in the machine, for storage in the second sheet storage and retrieval device. Those sheets that are to be returned to the customer are moved in the sheet path and are directed by the diverter to the second storage area for return to the customer. Sheets to be retained in the machine stored on the second sheet storage and retrieval device can be then moved therefrom into suitable storage areas in the machine. This may include for example in some embodiments, check storage areas or note storage areas. In some exemplary embodiments the first sheet storage and retrieval device and the second sheet storage and retrieval device may each comprise a belt recycling device. Of course in other embodiments other devices operative to store and deliver sheets may be used. Further in some embodiments note storage areas in the machine may be in operative connection with recycling devices which are operative to selectively deliver notes stored therein. Such recycling devices may be part of the cash dispenser device in the automated banking machine.

In still other exemplary embodiments the sheet processing device in the machine may include in combination with a device for aligning sheets with the sheet path, at least one transversely movable magnetic read head. In the exemplary embodiment, the device includes one relatively fixed magnetic read head and one magnetic read head that are selectively movable. The sheet processing device further includes at least one sensor that is operative to sense the width of each check that is received in the machine. The at least one sensor is operative to sense the width after the check has been positioned and aligned relative to the direction of the sheet path. In the exemplary embodiment the alignment of the check in the sheet path is operative to position the check so that if the check is in a first physical orientation, magnetic characters in the micr line will pass adjacent the fixed magnetic read head. Further in the exemplary embodiment, based on the sensed width of the check, the movable magnetic read head is positioned through operation of a positioning device to move transversely in the sheet path to a selected transverse position in the sheet path. If the check is in a second orientation indicia included in the micr line of the check will pass adjacent the second magnetic read head. As a result in the exemplary embodiment, the magnetic read heads are positioned for each check regardless of the facing position of the check such that at least one of the magnetic read heads will be positioned to capture signals corresponding to micr line indicia on the check. In other exemplary embodiments both magnetic read heads may be selectively movable so as to assure reading of indicia.

Exemplary embodiments of the automated banking machine provide the capability of testing the operability of the magnetic read heads of the check reading device. In the exemplary embodiment the at least one processor operates when the automated banking machine is not performing transactions to operate an electromagnetic radiation emitter within the housing of the machine. In exemplary embodiments the emitter may include an electric motor for running a sheet transport or other device that also performs another function in the machine. In exemplary embodiments the at least one processor in the machine operates in accordance with its programming to determine at least one property of the electromagnetic radiation generated by the emitter that can be sensed by the magnetic read heads and associated sensing circuitry. The at least one processor analyzes signals corresponding to the type and/or level of radiation from the radiation emitter that can be sensed by the read heads and/or sensing circuitry. In the exemplary embodiment the at least one processor operates to determine if the read head/sensing circuitry has experienced a reduction in its ability to sense radiation from the emitter based on one or more previously stored values. Such analysis is conducted to determine if there has been degradation in performance or a malfunction in the read head or the associated magnetic sensing circuitry. The at least one processor operates in response to identifying conditions which correspond to a probable malfunction in accordance with its associated programming. This may include for example causing the banking machine to cease attempting to carry out transactions that involve the reading of magnetic data on documents. Alternatively or in addition, the automated banking machine may operate to cause a notification concerning the condition to be given to a remote servicer or to a transaction processor.

Other exemplary embodiments include features that facilitate servicing of an automated banking machine. These features help to facilitate the repair, analysis and diagnosis of conditions and malfunctions that may occur at the machine.

Numerous types of novel systems and methods are taught by the disclosure hereof.

BRIEF DESCRIPTION OF DRAWINGS

FIG. 5 is a side view of the platen and first and second drives shown in FIG. 4.

FIG. 6 is a bottom view corresponding to FIGS. 4 and 5 showing the platen with rolls of the first and second transports extending therethrough.

FIG. 7 is a top plan view of an upper platen and a lower platen of a transport mechanism of the exemplary deposit accepting apparatus.

FIG. 8 is a front view showing the positions of the first and second transports corresponding to FIG. 7.

FIG. 9 is a view similar to FIG. 7 with the transports operating to move a document in a first direction.

FIG. 10 is a front view of the first and second transports corresponding to FIG. 9.

FIG. 11 is a view similar to FIG. 9 with the document moved further into the deposit accepting apparatus.

FIG. 12 is a front plan view showing the positions of the first and second transports.

FIG. 13 is a view similar to FIG. 11 showing the document moved in a second direction transverse to the first direction.

FIG. 14 is a front plan view showing the relative positions of the first and second transports when a document is moved in a transverse direction.

FIG. 15 is a view similar to FIG. 13 showing an edge of the document aligned with the non-contact sensors.

FIG. 16 corresponds to FIG. 15 and shows the positions of the first and second transports.

FIG. 17 is a view similar to FIG. 15 but showing an alternative document including a folded edge.

FIG. 18 is a front view of the first and second transports corresponding to FIG. 17.

FIG. 25 is a partially exploded view of an exemplary form of the stamper printer used in the exemplary embodiment.

FIG. 26 is another exploded view of the exemplary stamper printer.

FIG. 27 is a side view showing the eccentric profile of the exemplary embodiment of the printing roll of the stamper printer.

FIGS. 50 and 51 show the sheet access area while moving the stack of sheets toward a picker.

FIGS. 56 and 57 show the sheet access area with the upper sheet driving member disposed away from the stack.

FIGS. 64 and 65 show retracted sheets being picked for storage in the machine through operation of the picker.

FIG. 68 shows an exemplary sensor arrangement of the sheet access area.

FIG. 69 is a plan view of an exemplary divider plate.

FIG. 77 is an opposite hand isometric view of the portion of the deposit accepting device shown in FIG. 6.

FIG. 78 is an enlarged view of the open transport access cover including a sensor and a latch.

FIG. 82 is an isometric view showing a deposit accepting device and a visual indicator at the front of the device.

FIG. 83 is a portion of the rear area of an exemplary deposit accepting device including a rear visual indicator.

FIG. 84 is an exemplary screen output from the automated banking machine showing a visual representation of the deposit accepting device.

DESCRIPTION OF EXEMPLARY EMBODIMENTS

U.S. Pat. No. 6,474,548 the disclosure of which is incorporated herein by reference, discloses an exemplary deposit accepting device of a card activated cash dispensing automated banking machine. For purposes of this disclosure a deposit accepting device shall be construed to encompass any apparatus which senses indicia on documents input to an automated banking machine.

Figure 1:
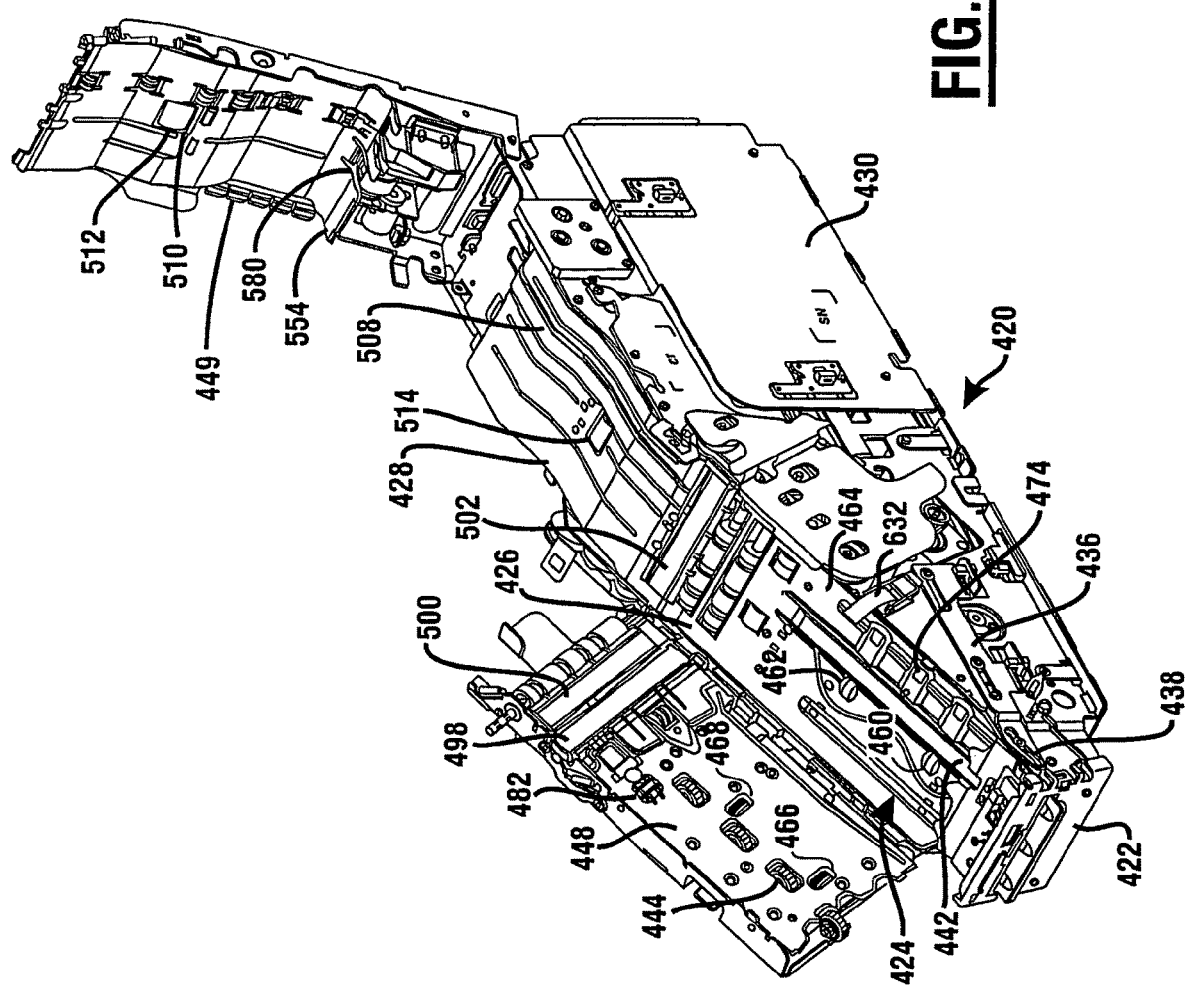
FIG. 1 is an isometric view of an exemplary deposit accepting apparatus shown in an open condition for servicing.

A deposit accepting device 420 of an exemplary embodiment and having the features described hereafter is shown in FIG. 1. The deposit accepting device is shown with the mechanism open so as to enable more readily describing its components. The deposit accepting mechanism would be open in the manner shown in FIGS. 1 and 2 only when the device is not in operation. Rather the device would be placed in the open condition for servicing activities such as clearing jams, cleaning, adjusting or replacing components. This can be readily done in this exemplary embodiment by a servicer as later described.

The deposit accepting device includes a document inlet opening 422. In the exemplary embodiment during operation the inlet opening is in communication with the outside of the housing of the automated banking machine. Documents received through the inlet opening travel along a transport path in the device. The transport path in the device further includes a document alignment area 424 in which documents are aligned to facilitate the processing thereof. The exemplary form of the unit further includes a document analysis area 426. The exemplary document analysis area includes scanning sensors and magnetic sensors for purposes of reading indicia from the documents.

The exemplary form of the device further includes an escrow area 428 along the transport path. In the escrow area documents that have been received are stored pending determination to either accept the documents or return them to the user. The exemplary deposit accepting device further includes a storage area 430 which operates to store documents that have been accepted for deposit within the deposit accepting device. Of course it should be understood that this structure is exemplary of arrangements that may be used.

In the exemplary embodiment documents are received through the opening and the presence of a document is sensed by at least one sensor 432. Sensing a document at the opening at an appropriate time during ATM operation (such as at a time when a user indicates through an input device of the machine that they wish to input a document) causes at least one processor to operate so as to control a gate 434. The processor operates upon sensing the document to cause the gate to move from the closed position to the open position. This is accomplished in the exemplary embodiment by a drive such as an electric motor or solenoid moving an actuator member 436 as shown in FIG. 1. The actuator member 436 includes a cam slot 438 which causes corresponding movement of the gate 434 to the desired position. In some embodiments the at least one sensor 432 or other sensor in the device is operative to sense properties that would indicate whether the document being inserted is a double or other multiple document. At least one processor in the banking machine may operate in accordance with its programming to not accept multiple documents and to cause the banking machine to provide at least one output to advise the user to insert a single document.

Figure 4:
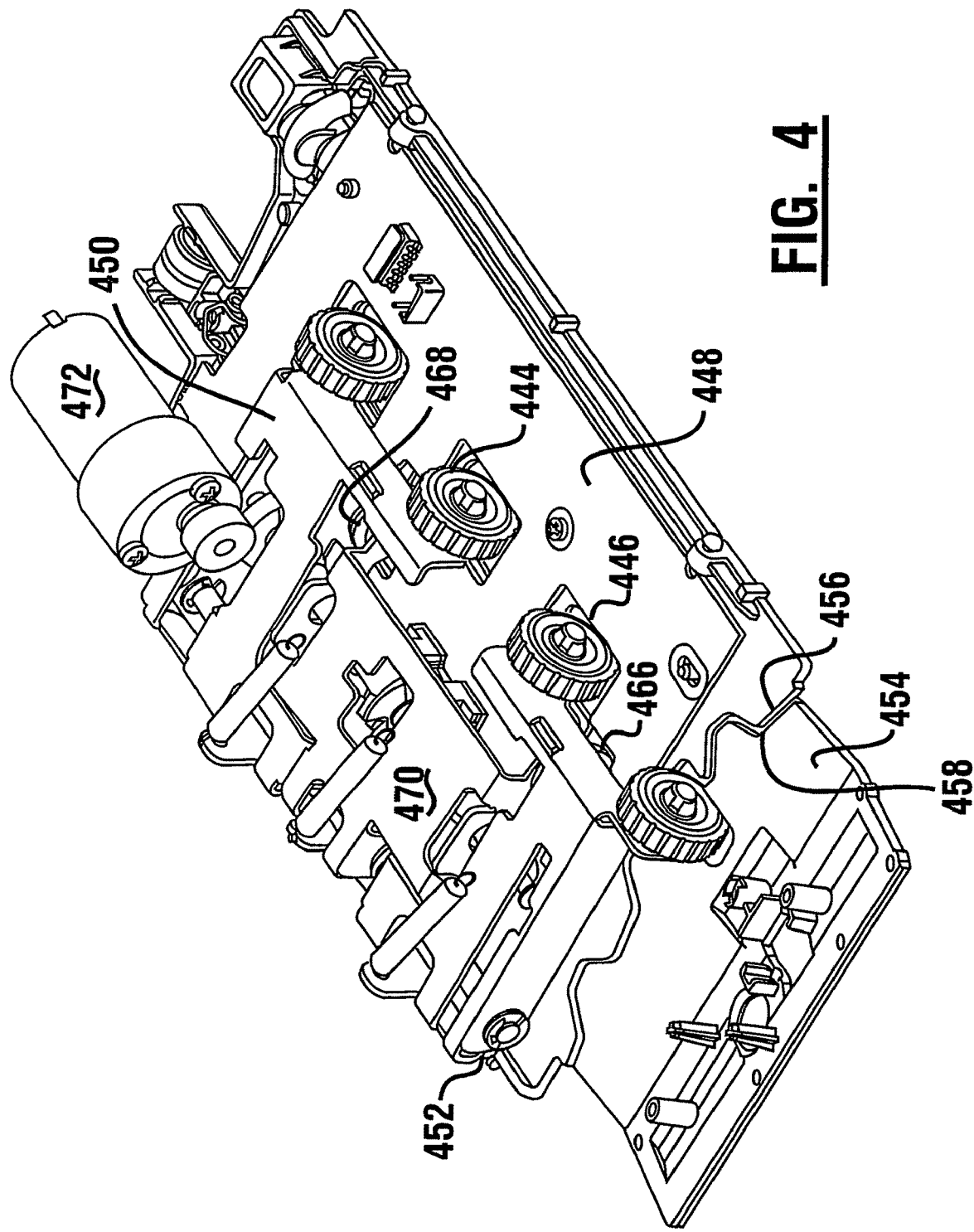
FIG. 4 is a top isometric view of a portion of an upper platen including elements of a first transport which moves documents in a first longitudinal direction in the deposit accepting apparatus and second transports which move documents in a direction transverse to the first direction.

Responsive to the sensing of the document and other conditions as determined by at least one processor, a first transport 440 operates to move the document into the document alignment area. In the exemplary embodiment the document is moved in engaged relation between a belt flight 442 and rollers 444. As best shown in FIGS. 1 and 4, rollers 444 extend in openings 446 in an upper platen 448 to engage or at least move in very close proximity to belt flight 442. As shown in FIG. 4, rollers 444 are mounted on a movable carriage 450. Carriage 450 is movable rotationally about a shaft 452. Movement of the carriage 450 enables selectively positioning of the rollers 444 to be in proximity to the surface of belt flight 442 or to be disposed away therefrom for reasons that are later discussed. After the document is sensed as having moved into the device the processor operates to cause the gate to be closed. Alternatively if a user has provided inputs through input devices on the machine indicating that they will be depositing more documents in the machine, the gate may remain open until the last document is deposited.

As shown in FIG. 4 through 6, platen 448 in the operative position is in adjacent relation with a lead in guide 454. Guide portion 454 and platen 448 include corresponding contoured edges 456, 458. The contoured edges of the exemplary embodiment are of a toothed contoured configuration. This configuration is used in the exemplary embodiment to reduce the risk that documents will become caught at the adjacent edges of the platen and the guide. The toothed contoured configuration of the adjacent surfaces helps to minimize the risk that documents catch or are folded or damaged as they pass the adjacent surfaces. Of course it should be understood that this approach is exemplary and in other embodiments other approaches may be used.

In the exemplary embodiment the document alignment area includes transverse transport rolls 460 and 462. The transverse transport rolls extend through apertures in the platen 464 that supports belt flight 442. The transverse transport rolls of the exemplary embodiment are configured to have axially tapered surfaces extending in each longitudinal direction from the radially outermost extending portion of the roll so as to minimize the risks of documents being caught by a surface thereof. In alternative embodiments transverse transport rolls may have simple or compound curved surfaces to minimize the risk of catching transversely moving documents, which configurations shall also be referred to as tapered for purposes of this disclosure. In the exemplary embodiment the upper surface of the transverse transport rolls are generally at about the same level as the upper surface of belt flight 442. In addition each of the transverse transport rolls are in operative connection with a drive device. The drive device of the exemplary embodiment enables the transverse transport rolls to move independently for purposes of aligning documents as later discussed.

In supporting connection with platen 448 are a pair of transverse follower rolls 466 and 468. The transverse follower rolls each extend in a corresponding opening in the platen 448. Transverse follower roll 466 generally corresponds to the position of transverse transport roll 460. Likewise transverse follower roll 468 corresponds to the position of transverse transport roll 462. As shown in FIG. 4, rolls 466 and 468 are supported on a movable carriage 470. Carriage 470 is rotatably movable about shaft 452. A drive 472 is selectively operative responsive to operation of one or more processors in the banking machine to cause the movement of carriage 470 and carriage 450. The drive may be a suitable device for imparting movement, such as a motor or a solenoid. As a result, drive 472 of the exemplary embodiment is selectively operative to dispose rollers 444 adjacent to belt flight 442 or dispose the rollers therefrom. Likewise drive 472 is selectively operative to place transverse follower rolls 466 and 468 in adjacent relation with transverse transport rolls 460 and 462. These features are useful for purposes of aligning documents as will be later discussed. Of course this approach to a transverse transport for documents is exemplary and in other embodiments other approaches may be used.

The document alignment area 424 further includes a plurality of alignment sensors 474. In the exemplary embodiment non-contact sensors are used, which can sense the document without having to have any portion of the sensor contact the document. The exemplary alignment area includes three alignment sensors that are disposed from one another along the transport direction of belt flight 442. In the exemplary embodiment one sensor is aligned transversely with each of rolls 460 and 462 and a third sensor is positioned intermediate of the other two sensors. The alignment sensors of the exemplary embodiment are radiation type and include an emitter and a receiver. The sensors sense the documents that move adjacent thereto by detecting the level of radiation from the emitter that reaches the receiver. It should be understood that although three alignment sensors are used in the exemplary embodiment, other embodiments may include greater or lesser numbers of such sensors. Further while the alignment sensors are aligned along the direction of document transport path in the exemplary embodiment, in other embodiments other sensor arrangements may be used such as a matrix of sensors, a plurality of transversely disposed sensors or other suitable arrangement.

The operation of the document alignment area will now be described with reference to FIGS. 8 through 18. In the exemplary embodiment when a document is sensed entering the device, carriage 450 which is controlled through the drive 472 is positioned such that rollers 444 are positioned in adjacent relation to belt flight 442. This position is shown in FIG. 8. In this document receiving position carriage 470 is moved such that the transverse follower rolls 466 and 468 are disposed away from the transverse transport rolls 460 and 462.

In response to sensing a document 476 being positioned in the inlet opening 422 and other appropriate conditions, the at least one processor is operative to cause the first transport 440 to move belt flight 442. If a double or other multiple document is sensed the first transport may not run or may run and then return the document to the user as previously discussed. Moving belt flight 442 inward causes the first document to be moved and engaged with the transport in sandwiched position between the rollers 444 and the belt flight as shown in FIG. 9. In this position the transverse transport and transverse follower rolls are disposed away from one another so that the document 476 can move in engagement with the first transport into the document alignment area. The tapered surfaces of the transverse transport rolls 460,462 facilitate the document moving past the rolls without snagging. It should also be noted that projections on the surface of platen 464 operate to help to move the document by minimizing the risk of the document snagging on various component features. Further the projections on the platen help to minimize the effects of surface tension that might otherwise resist document movement and/or cause damage to the document. Of course these approaches are exemplary, and other embodiments may employ other approaches.

Position sensors for documents are included in the document alignment area and such sensors are operative to sense when the document has moved sufficiently into the document alignment area so that the document can be aligned. Such sensors may be of the radiation type or other suitable types. When the document 476 has moved sufficiently inward, the first transport is stopped. In the stopped position of the transport, the drive 472 operates to move carriage 470 as shown in FIG. 12. This causes the transverse transport and follower rolls to move adjacent with the document 476 positioned therebetween so as to engage the document.

Thereafter as shown in FIGS. 13 and 14 the drive 472 is operative to move the carriage 450. This causes the rollers 444 to be disposed from belt flight 442 which disengages this transport with respect to the document. Thereafter the one or more drives which are operative to move the transverse transport rolls, operate responsive to at least one processor so as to move document 476 in a direction transverse to the direction of prior movement by belt flight 442 as well as to deskew the document. As shown in FIG. 15, the document 476 is moved sideways until a longitudinal edge 478 is aligned with the alignment sensors 474. In the exemplary embodiment the alignment sensors 474 provide a virtual wall against which to align the longitudinal edge of the document. The sensing of the document by the alignment sensors 474 of the edge of the document enables precise positioning of the document and aligning it in a desired position which facilitates later reading indicia therefrom. In an exemplary embodiment in which the documents are checks, the precise alignment of the longitudinal edge enables positioning of the document and its micr line thereon so as to be in position to be read by a read head as later discussed. Of course in other embodiments other approaches may be used.

In some exemplary embodiments the alignment sensors are in operative connection with one or more processors so that the transports are controlled responsive to the sensors sensing a degree of reduction in radiation at a receiver from an associated emitter of a sensor as the document moves toward a blocking position relative to the sensor. The exemplary embodiment may be configured such that a drive operating the transverse transport roll may cease to further move the sheet transversely when the alignment sensor which is transversely aligned with the transport roll senses a certain reduction in the amount of radiation reaching the sensor from the emitter. Thereafter the other drive operating the other transverse transport roll may continue to operate until the alignment sensor that corresponds to that transport roll senses a similar degree of reduction. In this way the processor operating the independently controlled transverse transport rolls cause the longitudinal edge of the document to be aligned with the virtual wall produced through use of the sensors.

In alternative embodiments the apparatus may operate in accordance with its programming to cause the respective transverse transport rolls to move the document transversely such that a reduction in radiation from the respective emitter is sensed reaching the corresponding receiver until no further reduction occurs. This corresponds to a condition where the document fully covers the corresponding receiver. Thereafter the respective drive for the transverse transport roll may be reversed in direction to a desired level such as, for example, fifty percent of the total reduction which would indicate that the transverse edge is positioned to cover approximately fifty percent of the receiver. In this way this alternative embodiment may be able to align documents that have relatively high radiation transmissivity or transmissivity that is variable depending on the area of the document being sensed by the sensor. Alternatively a transverse linear array of sensors, such as CCDs may be used to determine the transverse position of a particular portion of the edge of the sheet. Alternatively a plurality of transversely extending arrays of sensors may be used to sense the positions of one or more portions of one or more edges of the sheet. A plurality of spaced arrays may be used to sense the position of the sheet. Of course these approaches are exemplary and in other embodiments other approaches may be used.

Once the document has been aligned and moved to the position shown in FIG. 15, the drive 472 operates to move the carriage 450 such that the rollers 444 are again moved adjacent to belt flight 442. Thereafter the drive moves the carriage 470 so as to dispose the transverse follower rolls 466 and 468 away from the transverse transport rolls. This position is shown in FIG. 8. Thereafter the now aligned document can be further moved along the transport path through movement of the first transport out of the document alignment area of the device to the document analysis area.

FIGS. 17 and 18 disclose an operational feature of the exemplary embodiment where a document 480 has a folded edge. In this exemplary situation the folded edge is configured so that the alignment sensor 474 which corresponds to transverse transport roll 462 cannot sense a longitudinal edge of the document until the document is unduly skewed. However, in this situation the middle alignment sensor will be operative to sense the middle portion of the longitudinal edge as will the alignment sensor that corresponds to transverse transport roll 460 before sensor 474 senses the edge of the document. In the exemplary embodiment the at least one processor that controls the operation of the drives for the transverse transport rolls is operative to control movement of the document transversely when the middle alignment sensor senses the edge of the document even through one of the end sensors has not. This is true even for a folded document or a document that has been torn. The at least one processor controls each transverse roll to move the document transversely until two of the three sensors detect and edge of the document in the desired aligned position. In this way even such an irregular document is generally accurately aligned in the longitudinal direction from the transport.

It should be understood that the exemplary embodiment uses radiation type sensors for purposes of aligning the document in the alignment section. In other embodiments other types of sensors such as sonic sensors, inductance sensors, air pressure sensors or other suitable sensors or combinations thereof, may be used.

Once the document has been aligned in the document alignment area of the transport path, the deposit accepting device operates responsive to the programming associated with one or more processors, to cause the document to be moved along the transport path by the first transport into the document analysis area. In the exemplary embodiment the document analysis area includes at least one magnetic sensing device which comprises the magnetic read head 482. Magnetic read head 482 is in supporting connection with platen 448 and in the exemplary embodiment is movable relative thereto. The alignment of the document in the document alignment area is operative in the exemplary embodiment to place the micr line on the check in corresponding relation with the magnetic read head. Thus as the document is moved by the first transport into the document analysis area, the micr line data can be read by the magnetic read head. Of course in some alternative embodiments micr or other magnetic indicia may be read through other magnetic sensing elements such as the type later discussed, or optically, in the manner shown in U.S. Pat. No. 6,474,548, for example.

Figure 20:
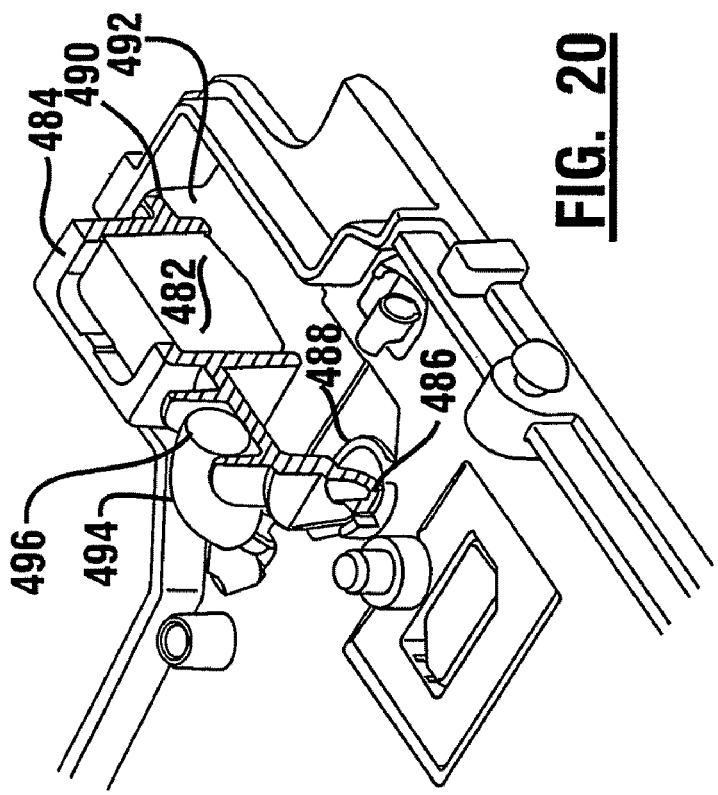
FIG. 20 is a partially sectioned view corresponding to FIG. 19 further showing the movable mounting for the magnetic read head.
Figure 21:
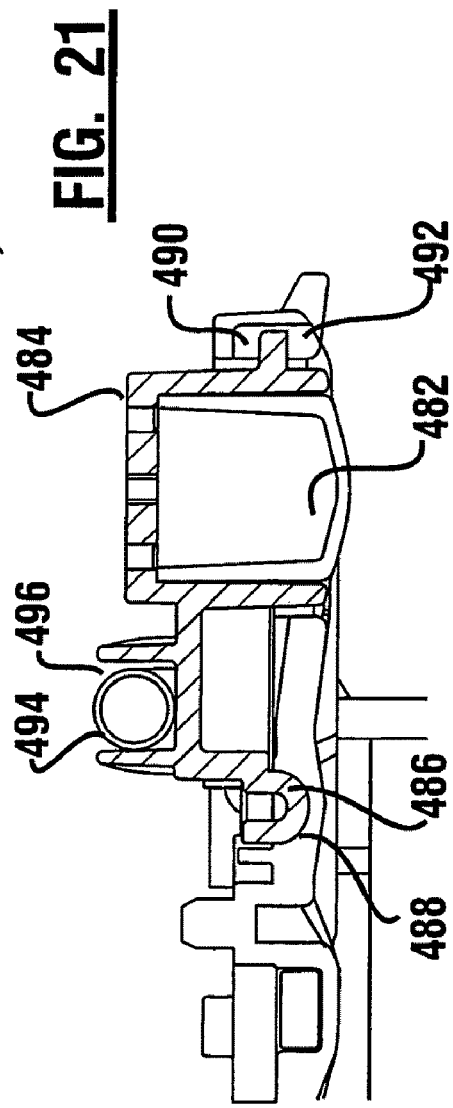
FIG. 21 is a cross-sectional side view of the mounting for the magnetic read head as shown in FIG. 19.
Figure 19:
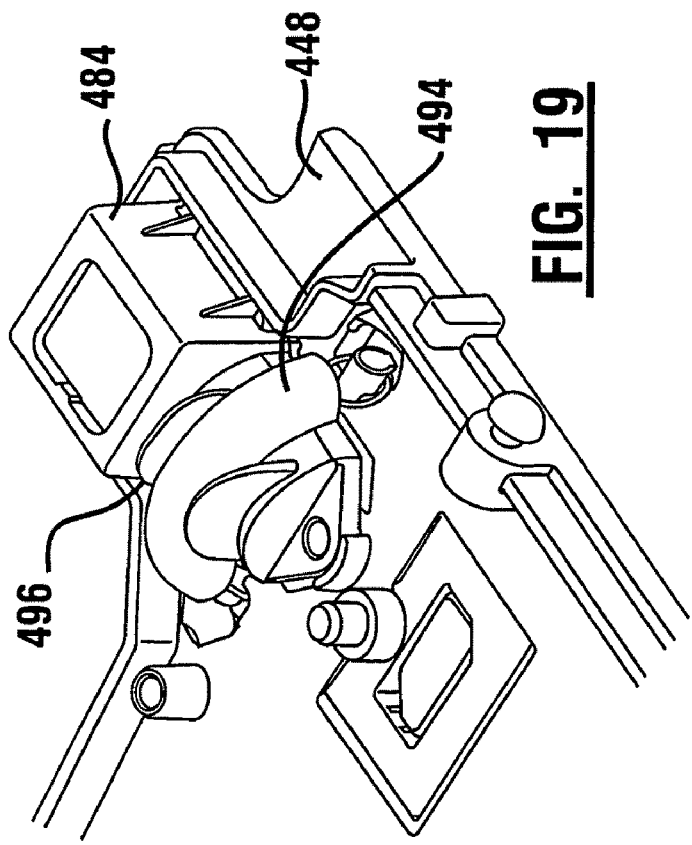
FIG. 19 is an isometric view showing the movable mounting of the exemplary magnetic read head of the embodiment.

FIGS. 19 through 21 show an exemplary form of the movable mounting for the magnetic read head 482. In the exemplary embodiment the magnetic read head is positioned in a retainer 484. Retainer 484 includes a first projection 486 that extends in and is movable in an aperture 488. Retainer 484 also includes a projection 490 which is movable in an aperture 492. A tension spring 494 extends through a saddle area 496 of the housing 484. The saddle area includes two projections which accept the spring 494 therebetween. This exemplary mounting for the magnetic read head provides for the head to float such that it can maintain engagement with documents that are moved adjacent thereto. However, the movable character of the mounting which provides both for angular and vertical movement of the read head reduces risk of snagging documents as the documents move past the read head. Further the biased spring mounting is readily disengaged and enables readily replacing the magnetic read head in situations where that is required. Of course this approach is exemplary and in other embodiments other approaches may be used.

The exemplary document analysis area includes in addition to the read head a magnetic sensing element 498. The magnetic sensing element in some exemplary embodiments may read magnetic features across the document as the document is moved in the document analysis area. In some embodiments the magnetic reading device may be operative to read numerous magnetic features or lines so as to facilitate the magnetic profile of the document as discussed herein. In some embodiments the magnetic sensing element may sense areas of the document in discrete elements which provide a relatively complete magnetic profile of the document or portions thereof. In some embodiments the magnetic sensing capabilities may be sufficient so that a separate dedicated read head for reading the micr line of checks is not required. Of course these approaches are exemplary and may vary depending on the type of documents which are being analyzed through the system.

The exemplary document analysis area further includes a first scanning sensor 500 and a second scanning sensor 502. The scanning sensors are operative to sense optical indicia on opposed sides of the document. The scanning sensors in combination with at least one processor are operative to produce data which corresponds to a visual image of each side of the document. This enables analysis of visual indicia on documents through operation of at least one processor in the ATM. In the case of checks and other instruments the scanning sensors also enable capturing data so as to produce data which corresponds to image of a check which may be used for processing an image as a substitute check, and/or other functions.

In some embodiments, the data corresponding to images of the documents may be used by the ATM to provide outputs to a user. For example, an image of a check may be output through a display screen of the ATM so a user may be assured that the ATM has captured the image data. In some cases at least one processor in the ATM may apply digital watermarks or other features in the data to minimize the risk of tampering. In some embodiments at least one processor may operate in accordance with its programming to indicate through visual outputs to a user with the image that security features have been applied to the image data. This may include outputs in the form of words and/or symbols which indicate a security feature has been applied. This helps to assure a user that the ATM operates in a secure manner in processing the accepted check. Of course, this approach is exemplary of things that may be done in some embodiments.

In alternative embodiments the programming of one or more processors associated with the ATM may enable the scanning sensors, magnetic sensors and other sensing elements to gather data which is usable to analyze other types of documents. Other types of sensing elements may include, for example, UV, IR, RFID, fluorescence, RF and other sensors that are capable of sensing properties associated with document. Documents may include for example receipts, certificates, currency, vouchers, gaming materials, travelers checks, tickets or other document types. The data gathered from the sensors in the analysis area may be processed for purposes of determining the genuineness of such items and/or the type and character thereof. Of course the nature of the sensors included in the analysis area may vary depending on the type of documents to be processed by the device. Also some embodiments may operate so that if a micr line or other magnetic characters on the document are not aligned with the magnetic read head, the document can nonetheless be analyzed and processed using data from other sensors.

It should also be noted that documents are moved in the document analysis area through engagement with a plurality of driving rolls 504. The driving rolls 504 operate in response to one or more drives that are controlled responsive to operation of one or more processors in the ATM. The drives are operative to move documents into proximity with and past the sensors so as to facilitate the reading of indicia thereon. The document may be moved in one or more directions to facilitate the reading and analysis thereof.

Once a document has been moved through the document analysis area, the document passes along the transport path into escrow area 428. Escrow area 428 includes a third transport 506. Transport 506 includes an upper belt flight 508. The plurality of cooperating rollers 510 supported through platen 449 are positioned adjacent to belt flight 508 in the operative position. Documents entering the escrow area are moved in engagement with belt flight 508 and intermediate to belt flight and the rollers.

In the exemplary embodiment documents that have been passed through the document analysis area are moved in the escrow area where the documents may be stopped for a period of time during which decisions are made concerning whether to accept the document. This may include for example, making a determination through operation of the ATM or other connected systems concerning whether to accept an input check. If it is determined that the check should not be accepted, the direction of the transports are reversed and the check is moved from the escrow area through the document analysis area, the document alignment area and back out of the ATM to the user. Alternatively if the decision is made to accept the document into the ATM, the document is moved in a manner later discussed from the escrow area to the document storage area of the device.

In some exemplary embodiments the escrow area may be sufficiently large to hold several checks or other documents therein. In this way a user who is conducting a transaction involving numerous checks may have all those checks accepted in the machine, but the programming of the machine may enable readily returning all those checks if the user elects to do so or if any one or more of the documents is determined to be unacceptable to the machine. Alternatively or in addition, storage devices such as belt storage mechanisms, transports or other escrow devices may be incorporated into the transport path of a deposit accepting device so that more numerous documents may be stored therein and returned to the user in the event that a transaction is not authorized to proceed. Of course these approaches are exemplary.

It should be noted that the exemplary escrow area includes a lower platen with a plurality of longitudinal projections which extend thereon. The longitudinal projections facilitate movement of the document and reduce surface tension so as to reduce the risk of the document being damaged.

In the exemplary embodiment the escrow area further includes a stamper printer 512. In the exemplary embodiment the stamper printer is supported through platen 449 and includes an ink roll type printer which is described in more detail in FIGS. 25 through 27. The escrow area further includes a backing roll 514 which operates to assure that documents move in proximity to the stamper printer so that indicia can be printed thereon.

The exemplary form of the stamper printer is shown in greater detail in FIGS. 25 through 27. The exemplary printer includes an eccentric ink bearing roll 518 shown in FIG. 27. The eccentric shape of the ink bearing roll in cross section includes a flattened area 520 which is disposed radially closer to a rectangular opening 522 which extends in the roll, than a printing area 524 which is angularly disposed and in opposed relation thereof. The flattened area is generally positioned adjacent to documents when documents are moved through the escrow area and printing is not to be conducted thereon by the stamper printer. In the exemplary embodiment the ink roll 518 is encapsulated in plastic and is bounded by a plastic coating or cover about its circumference. Apertures or openings are cut therethrough in the desired design that is to be printed on the documents. As can be appreciated, the apertures which are cut in the plastic which encapsulates the outer surface of the ink bearing roll enables the ink to be transferred from the ink holding roll material underlying the plastic coating, to documents in the shape of the apertures. For example in the embodiment shown a pair of angled lines are printed on documents by the stamper printer. Of course this approach is exemplary and in other embodiments other types of inking mechanisms and/or designs may be used.

In the exemplary embodiment the ink roll 518 is supported on a first shaft portion 526 and a second shaft portion 528. The shaft portions include rectangular projections that are generally rectangular in profile 523, that extend in the opening 522 of the ink roll. The shaft portions include flanged portions 530 and 532 that are disposed from the radial edges of the roll. Shaft portions 526 and 528 include an interengaging projection 525 and access 527, as well as a tab 529 and recess that engage and serve as a catch, which are operative to engage and be held together so as to support the roll.

Shaft portion 526 includes an annular projection 534. Annular projection 534 is adapted to engage in a recess which is alternatively referred to as a slot (not separately shown) which extends generally vertically in a biasing tab 536 as shown in FIG. 25. Biasing tab 536 is operative to accept the projection in nested relation and is operative to provide an axial biasing force against shaft portion 526 when the first shaft portion is positioned therein. This arrangement enables holding the shaft portion in engaged relation with the biasing tab. However, when it is desired to change the stamper printer and/or the ink roll therein, the biasing tab may be moved such that the annular projection may be removed from the interengaging slot by moving the projection 534 upward in the recess so as to facilitate removal of the printer and ink roll. The biasing tab is supported on a bracket 538 that is in supporting connection with the platen which overlies the escrow area.

Second shaft portion 528 includes an annular projection 540. Projection 540 includes on the periphery thereof an angled radially outward extending projection 542. Projection 542 has a particular contour which is angled such that the transverse width of the projection increases with proximity to the flange portion 542. This configuration is helpful in providing a secure method for moving the ink roll but also facilitates changing the ink roll and stamper printer when desired.

In the exemplary embodiment the ink roll 518 is housed within a housing 544. Housing 544 is open at the underside thereof such that the printing area 524 can extend therefrom to engage a document from the escrow area. Housing 544 also includes two pairs of outward extending ears 546. Ears 546 include apertures therein that accept housing positioning projections 545 on the associated mounting surface of the device and are operative to more precisely position the housing and the ink roll on the supporting platen and to facilitate proper positioning when a new ink roll assembly is installed. Housing 544 also includes apertures 543 through which the shaft portions extend. A flange portion is positioned adjacent to each aperture.

In the exemplary embodiment shaft portion 528 is driven through a clutch mechanism 548. Clutch mechanism 548 of the exemplary embodiment is a wrap spring clutch type mechanism which is selectively actuatable through electrical signals. The clutch is driven from a drive through a gear 550.

The clutch 548 outputs rotational movement through a coupling 552. Coupling 552 includes the annular recess that corresponds to projection 540 and a radial recess which corresponds in shape to projection 542. Thus in the exemplary embodiment the force of the biasing tab enables the coupling 552 to solidly engage shaft portion 528.

During operation gear 550 which is operatively connected to a drive provides a mechanical input to the clutch 548. However, the ink roll generally does not rotate. Transport 506 is operative to move a document in the transport in the escrow area responsive to signals from a processor. Sensors such as radiation sensors in the escrow area are operative to indicate one or more positions of the document to the processor. When the document is to be marked with the stamper printer it is positioned adjacent to the ink roll by operation of a processor controlling the transport in the escrow area. A signal is sent responsive to the processor to the clutch 548. This signal is operative to engage the coupling 552 which causes the shaft portions 528 and 526 to rotate the ink roll 518. As the ink roll rotates the printing area 524 engages the surface of the document causing ink markings to be placed thereon. The ink roll rotates in coordination with movement of the document. The clutch is operative to cause the coupling to carry out one rotation such that after the document has been marked, the printing area is again disposed upward within the housing. The flattened portion 520 of the ink roll is again disposed in its initial position facing the document. Thus documents are enabled to pass the stamper printer 512 without having any unwanted markings thereon or without being snagged by the surfaces thereof.

It should be understood that when it is desired to change the stamper printer ink roll because the ink thereon has become depleted or alternatively because a different type of marking is desired, this may be readily accomplished. A servicer does this by deforming or otherwise moving the biasing tab 536 and moving the shaft portion 526 upward such that the annular projection 534 no longer extends in the slot in the biasing tab. This also enables projection 534 to be moved upward and out of a stationary slot 554 in the bracket 538. As the annular projection 534 is moved in this manner the annular projection 540 and radial projection 542 are enabled to be removed from the corresponding recesses in the coupling 552. This enables the housing 544 to be moved such that the ears 546 on the housing can be separated from the positioning projections which help to assure the proper positioning of the ink roll when the housing is in the operative position. Thereafter a new housing shaft and ink roll assembly can be installed. This may be accomplished by reengaging the projections 540 and 542 with the coupling 552 and engaging the projection 534 in the slot of biasing tab 536. During such positioning the positioning projections are also extended in the ears 546 of the housing, to locate the housing and reliably position the ink roll.

It should further be understood that although only one ink roll is shown in the exemplary embodiment, alternative embodiments may include multiple ink rolls or multiple stamper printers which operate to print indicia on checks. Such arrangements may be used for purposes of printing varied types of information on various types of documents. For example in some situations it may be desirable to return a document that has been processed through operation of the device to the user. In such circumstances a stamper printer may print appropriate indicia on the document such as a "void" stamp or other appropriate marking. Of course the type of printing that is conducted may vary as is appropriate for purposes of the particular type of document that is being processed. In other embodiments alternative approaches may be used.

Figure 29:
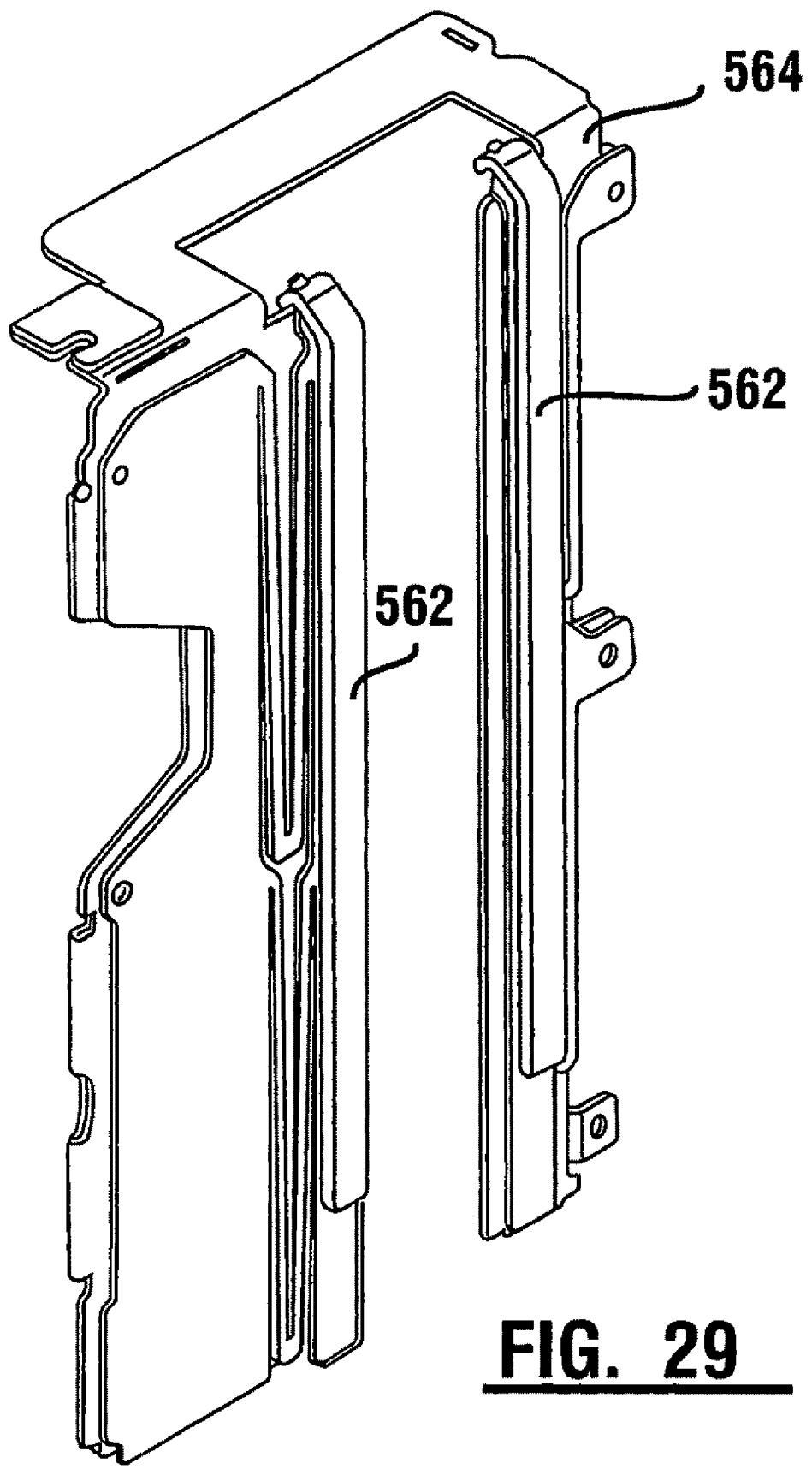
FIG. 29 is an isometric view of the guide of the vertically extending transport that extends in the storage area.
Figure 30:
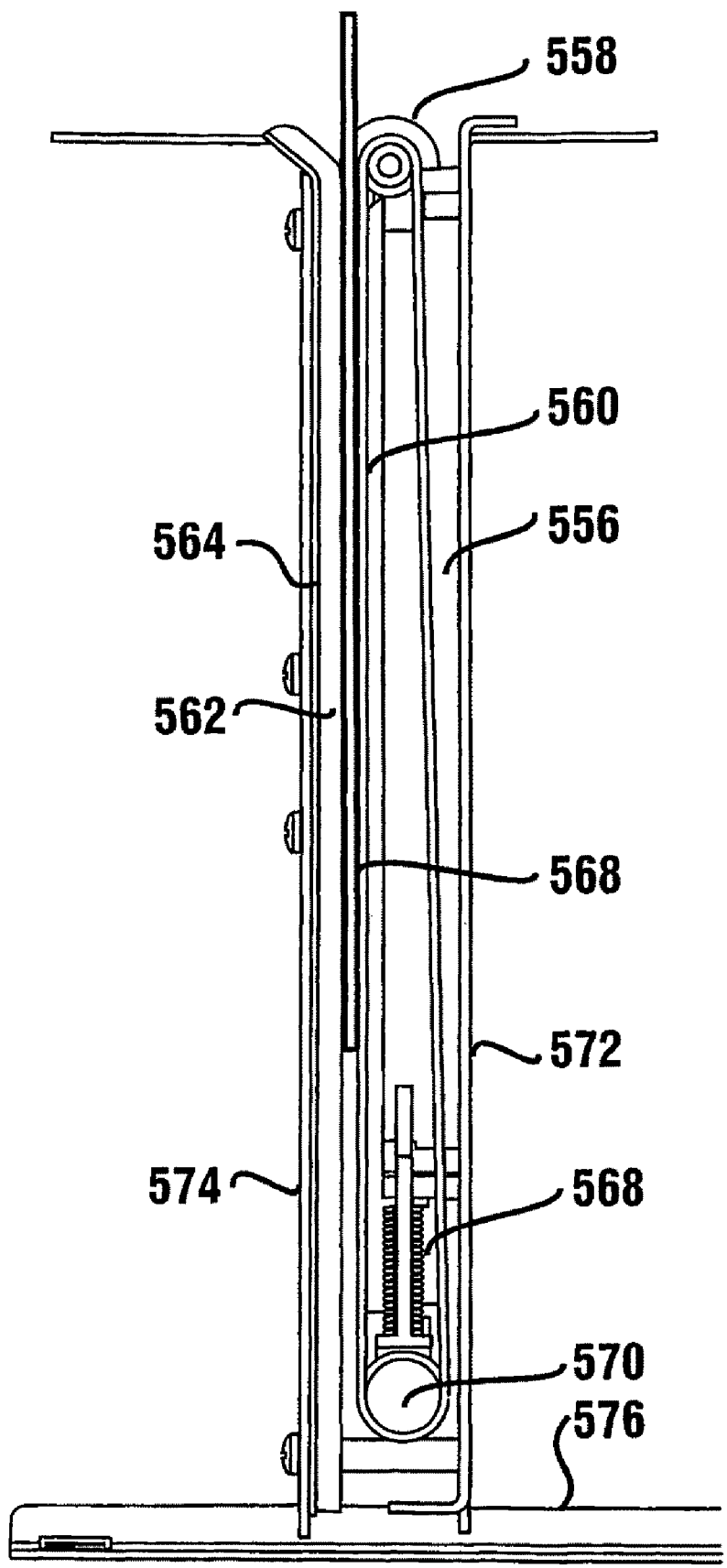
FIG. 30 is a side view of the vertically extending transport that extends in the storage area of the exemplary deposit accepting apparatus.
Figure 31:
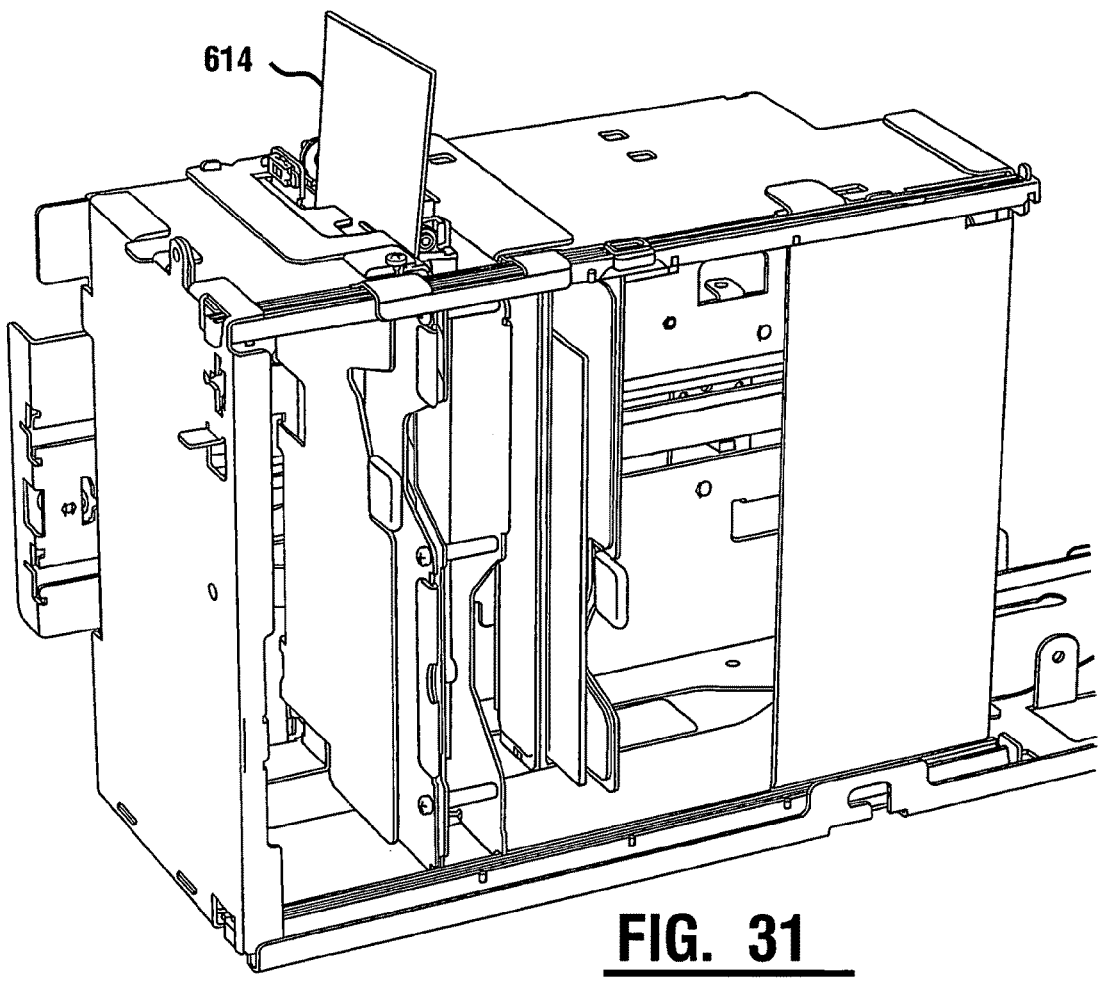
FIG. 31 is an isometric view of the apparatus shown accepting a document into the vertically extending transport.

In the exemplary embodiment a document that is to be moved from the escrow area can be more permanently stored in the machine by moving the document to a storage area 430. Documents are moved from the escrow area toward the storage area by moving the document in engagement with belt flight 508 so that the document engages a curved deflector 554. Deflector 554 causes the document to engage a vertical transport 556 that extends in the storage area 430. As best shown in FIG. 30 vertical transport 556 includes two continuous belts that are driven by a drive 558. The transport 556 includes a pair of disposed belts, each of which has a belt flight 560. Each belt flight 560 extends in generally opposed relation of a corresponding rail 562 of a vertical guide 564. As shown in FIG. 29 guide 564 of the exemplary embodiment is constructed so that the rails 562 are biased toward the belt flights by a resilient material. This helps to assure the document can be moved between the belt flights and the rails in sandwiched relation. Such a document 568 is shown moving between the rails and the belt flights in FIG. 30. Alternatively in some embodiments a single belt flight, rollers or other sheet moving members may be used.

It should also be noted that in the exemplary embodiment the drive 558 includes a spring biasing mechanism 568. The biasing mechanism acts on lower rolls 570 to assure proper tension is maintained in the belt flights 560.

Further in the exemplary embodiment the transport belts are housed within a housing which includes a pair of spaced back walls 572. As later discussed, back walls 572 serve as support surfaces for stacks of documents that may be stored in a first section or location of the storage area of the device. Similarly guide 564 includes a pair of transversely disposed wall surfaces 574. Wall surfaces 574 provide support for a stack of documents disposed in a second section or location of the storage area. Also as shown in FIG. 30, the vertical transport 556 moves documents to adjacent a lower surface 576 which bounds the interior of the storage area. Document sensing devices are provided along the path of the vertical transport so that the drive 558 can be stopped through operation of at least one processor once the document has reached the lower surface. This helps to assure that documents are not damaged by movement in the drive. Of course these approaches are exemplary and in other embodiments other approaches may be used.

In the exemplary embodiment when at least some documents are moved from the escrow area into the vertical transport, the device operates to print indicia thereon. This may be indicia of various types as described herein, as would be appropriate for the types of documents being processed. In the exemplary embodiment printing on the documents is carried out through operation of an inkjet printer 578. The inkjet printer includes a removably mounted printhead that is adjacent to documents as they are moved in the vertical transport portion of the sheet path. The inkjet printer includes nozzles which are operative to selectively expel ink therefrom toward the sheet path and shoot ink onto the adjacent surface of the document. The nozzles of the inkjet printer operate in accordance with the programming of a processor which is operative to drive the inkjet printer to expel ink selectively therefrom to produce various forms of characters on the documents as may be desired. For example in an exemplary embodiment the printer may be operative to print indica on checks so as to indicate transaction information and/or the cancellation of such checks. In the exemplary embodiment the print head is releasibly mounted through moveable members to enable ready installation and removal.

The exemplary embodiment further includes an ink catching mechanism 580 which is alternatively referred to herein as an ink catcher. In the exemplary embodiment the ink catching mechanism is operative to capture ink that may be discharged from the printhead at times when no document is present. This may occur for example if a document is misaligned in the transport or if the machine malfunctions so that it attempts printing when no document is present. Alternatively the inkjet printer may be operated responsive to at least one processor at times when documents are not present for purposes of conducting head cleaning activities or other appropriate activities for assuring the reliability of the inkjet printer. Further the exemplary embodiment of the ink catcher mechanism is operative to tend the printhead by wiping the nozzles so as to further facilitate reliable operation. Of course it should be understood that the exemplary ink catcher shown and described is only one of many ink catcher configurations that may be used.

Figure 23:
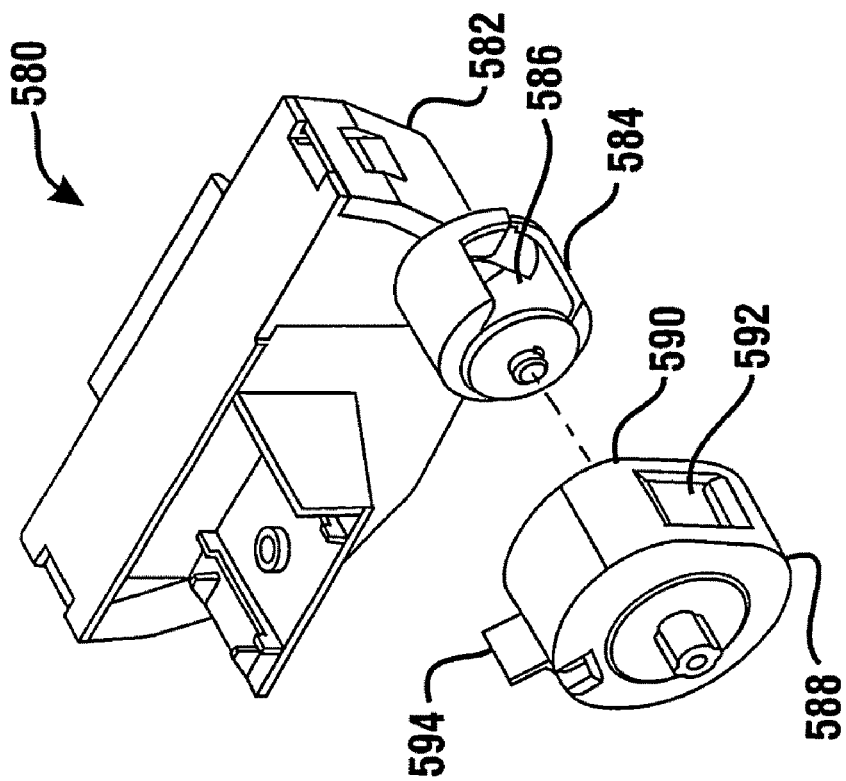
FIG. 23 is a partially exploded view showing the movable head disposed from the body of the ink catcher.
Figure 22:
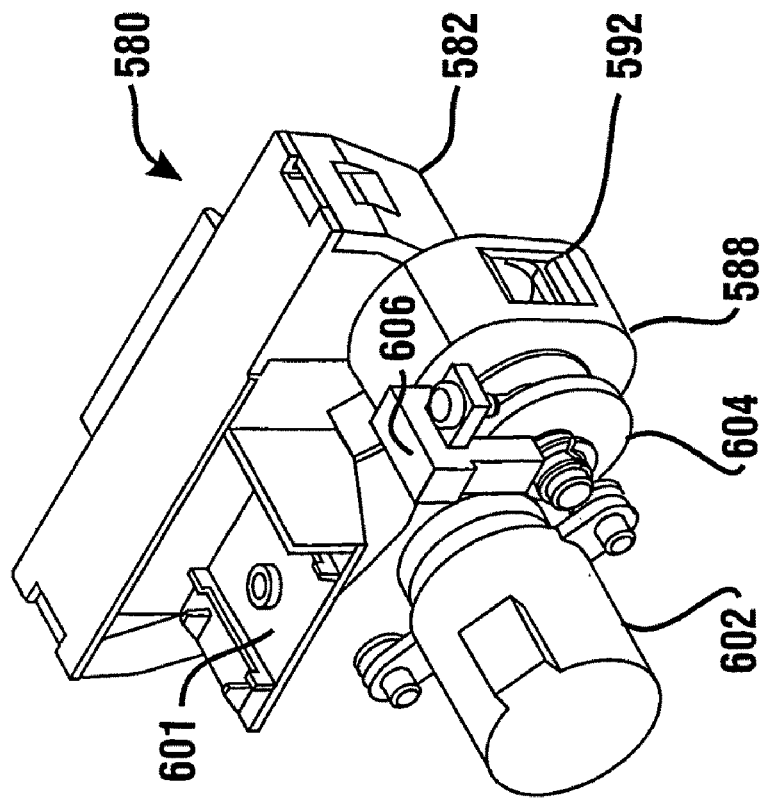
FIG. 22 is an isometric view showing an ink catcher mechanism of an exemplary embodiment.
Figure 24:
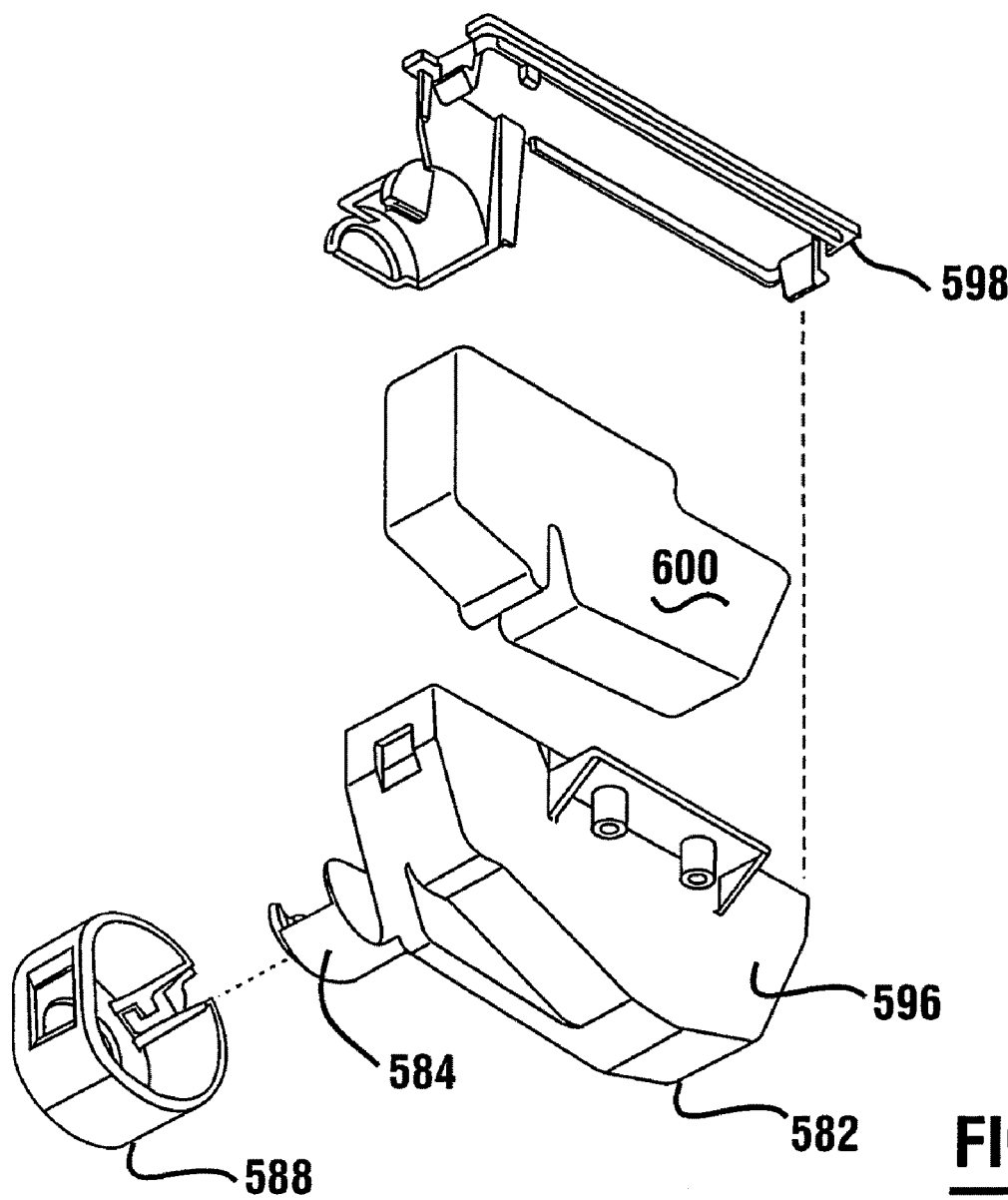
FIG. 24 is an exploded isometric view showing the body of the ink catcher of FIG. 22.

An exemplary form of the ink catching mechanism is shown in FIGS. 22 through 24. The ink catching mechanism includes an ink holding body 582 with an ink holding area therein. Body 582 has thereon an annular projecting portion 584. Projecting portion 584 has an opening 586 therein. Opening 586 of the projecting portion is in fluid communication with the ink holding interior area of the main portion of the body. Of course this body configuration is merely exemplary.

A head portion 588 is comprised of a body portion configured to extend in overlying relation of the projecting portion 584. Head portion 588 of the exemplary embodiment comprises a generally annular body member that includes a flattened area 590 which has an opening 592 therein. Head portion 588 also has in supporting connection therewith a resilient wiper member 594 extending radially outward therefrom in an area disposed angularly away from the opening 592.

As shown in FIG. 24 the exemplary embodiment of body 582 is of a generally clamshell construction and includes a lower portion 596 and an upper portion 598. The upper and lower portions fit together as shown to form the body, including the annular projecting portion. Also housed within the interior of the exemplary embodiment of the body is an ink absorbing member 600. The ink absorbing member is operative to absorb ink which passes into the interior of the body through opening 586. The body is releasably mounted in the machine through a mounting portion 601 which accepts suitable fasteners or other holding devices.

In the operative condition the head portion 588 extends in overlying generally surrounding relation of the projecting portion 584. The head portion is enabled to be selectively rotated through operation of a drive 602 that is operatively connected therewith. A disk member 604 and sensor 606 are operative to sense at least one rotational position of the head portion 588.

In operation of the exemplary form of the device, the head portion 588 is generally positioned as shown in FIG. 22 with the opening 592 of the head portion in aligned relation with the opening 586 in the projecting portion of the body. The projecting portion extends within an interior area of the rotatable head portion. In this position ink expelled from the inkjet printhead which does not strike a document, passes into the interior of the body through the aligned openings. Thus for example if the programming of the machine calls for the machine to periodically conduct a head cleaning operation in which the nozzles of the inkjet printhead are fired, the ink can be transmitted through sheet path in the area of the transport where documents are normally present and into the body of the ink catcher mechanism. Thereafter or periodically in accordance with the programming of the machine, a processor in operative connection with the drive is operative to cause the drive 602 to rotate the head portion 588. Rotation of the head portion is operative to cause the flexible wiper member 594 to engage the print head and wipe over the openings of the inkjet nozzles. This avoids the buildup of ink which can prevent the efficient operation of the inkjet printer. Once the wiper has moved across the nozzles the head returns to the position so that excess ink is accepted within the body. This is done in the exemplary embodiment by having the head portion rotate in a first rotational direction about a full rotation. In this way the head portion rotates from the position where the openings in the head portion and projecting portion are aligned with the print head. The head portion is rotated so the openings are no longer aligned and the flexible wiper member engages the print head and wipes across the nozzles thereof. The head portion continues to rotate until the openings are again aligned.

In the exemplary embodiment the drive operates responsive to the at least one processor to rotate the head portion in the first rotational direction about 360 degrees and then stops. In other embodiments the drive may reverse direction and/or operate the head portion to undergo multiple rotations. In other embodiments the movable member may include multiple openings and wiper members and may move as appropriate based on the configuration thereof. In other embodiments the movable member may include multiple openings and wiper members and may move as appropriate based on the configuration thereof.

In some embodiments the at least one processor may operate the print head periodically to clean or test the print head, and may operate the ink catcher to wipe the nozzles only after such cleaning or test. In some alternative embodiments wiping action may be done after every print head operation or after a set number of documents have been printed upon. Various approaches may be taken in various embodiments.

In exemplary embodiments suitable detectors are used to determine when the print head needs to be replaced. At least one processor in operative connection with the print head may operate to provide an indication when the print cartridge should be changed. Such an indication may be given remotely in some embodiments, by the machine sending at least one message to a remote computer. In the exemplary embodiment a servicer may readily remove an existing print cartridge such as by moving one or more fasteners, tabs, clips or other members. A replacement cartridge may then be installed, and secured in the machine by engaging it with the appropriate members. In the exemplary embodiment electrical contacts for the print head are positioned so that when the cartridge is in the operative position the necessary electrical connections for operating the print head are made. The new cartridge is installed with the print head thereof positioned in aligned relation with the opening in the head portion of the ink catcher so that ink from the print head will pass into the ink catcher and be held therein if there is no document in the sheet path between the print head and the ink catcher at the time ink is expelled therefrom.

In the exemplary embodiment after a new ink cartridge has been installed, a servicer may test the operation of the printer. This is accomplished by providing appropriate inputs to the machine. A servicer moves a sheet into the sheet path. This may be done in some cases manually and in other cases by providing and moving a sheet in the sheet path through one or more transports. One or more inputs from the servicer to input devices of the machine cause the processor to operate the printer to expel ink from the print head toward the sheet path. If the sheet is present ink impacts the sheet to print thereon. In some cases the processor operates the print head to print an appropriate pattern such as one that tests that all the nozzles are working. In other embodiments other indicia may be printed. Of course if no sheet is present in the sheet path, the ink from the print head passes into the body of the ink catcher through the opening in the head portion. Of course this approach is exemplary, and in other embodiments other approaches and processes may be used.

In some embodiments after printing is conducted the machine may operate to wipe the nozzles of the print head. This may be done in response to the programming associated with the processor and/or in response to an input from a servicer. In such a situation the drive operates to rotate the head portion 588 about the projecting portion 584 so that the flexible wiper member engages the print head. In the exemplary embodiment the wiper member wipes across the print head as the head portion of the ink catcher makes about one rotation from its initial position. The head portion rotates responsive to the drive until the head portion is again sensed as having the opening therein aligned with the print head. This is sensed by the sensor 606 sensing the rotational position of the disk member 604. In response to sensing that one head portion is in the position for capturing ink from the print head, the processor is operative to cause the drive to cease operation. Of course these approaches are exemplary and in other embodiments other approaches may be used.

In an exemplary embodiment when the ink catching mechanism has become filled with ink it is possible to replace the body by disengaging one or more fasteners that hold it in position and install a new one in the operative position. Alternatively in some embodiments the body may be opened and the ink absorbing member 600 removed and replaced with a new member.

In the exemplary embodiment the body is disengaged from the machine by disengaging the one or more fasteners or other devices that hold the mounting portion 601 to the adjacent housing structure of the document accepting device. Once this is done, the body 580 is moved so that the projecting portion 584 no longer extends within the interior area of the movable head portion 588. Once this is done, the body can be discarded. Alternatively, the body may be opened, the ink absorbing member 600 removed, a new ink absorbing member installed and the body again closed.

A new body or one with a new ink absorbing member is installed by extending the projection portion 584 thereof within the interior area of the head portion 588. The body is then fastened in place through the mounting portion. In response to appropriate inputs to an input device of the machine from a servicer, the processor operates to cause the drive 602 to rotate the head portion 588. The processor may operate in accordance with its programming to rotate the head portion 588 only as necessary to align the opening 592 with the print head. Alternatively the processor may operate the drive to make one or more rotations before stopping the rotation of the head portion. In some embodiments the processor may operate the printer to test its operation as previously discussed, and may then rotate the head portion to wipe the nozzles of the print head. Of course these approaches are exemplary and in other embodiments other approaches may be used.

Thus as can be appreciated the exemplary embodiment of the ink catching mechanism provides an effective way for the printer to be operated so as to avoid the deposition of excess ink within the ATM as well as to enable the print nozzles to be maintained in a suitable operating condition so that printing may be reliably conducted.

In the exemplary embodiment documents such as checks are moved into the storage area 430 through the vertical transport 556. Such documents are held initially between the rails 562 of the guide 564 and the belt flights 560 of the vertical transport. In the exemplary embodiment such documents may be selectively stored in one of two available sections (alternatively referred to herein as locations) of the storage area. These include a first storage location 608 positioned on a first side of the vertical transport and a second storage location 610 positioned on an opposed transverse side of the vertical transport. Selective positioning of documents into the storage locations is accomplished through use of a movable plunger member 612 which operates responsive to one or more processors to disengage documents from the vertical transport and move the documents into either the first storage location or second storage location of the storage area.

Figure 32:
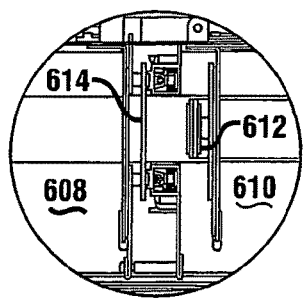
FIGS. 32 through 35 show the sequential movement of an exemplary plunger member as it operates to move a document held in the vertically extending transport into a storage location positioned on the left side of the storage mechanism as shown.

FIGS. 31 through 35 show the operation of the exemplary plunger member to move a document 614 into storage location 608. As shown in FIG. 32 when the document 614 has moved downward into the storage area, the plunger 612 has been positioned to the right of the document as shown in storage location 610. In the exemplary embodiment movement of the plunger member is accomplished through use of a suitable drive and movement mechanism such as a rack drive, worm drive, tape drive or other suitable movement device. Such a drive is represented schematically by drive 616 in FIG. 3.

Figure 33:
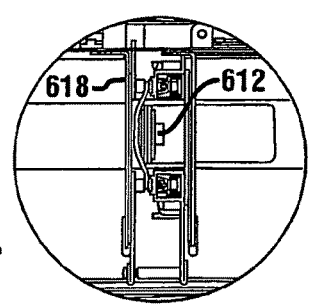
Figure 34:
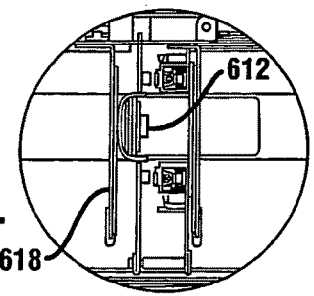

Once the document has been moved to the proper position and the vertical transport is stopped, the plunger 612 moves from the position shown in FIG. 32 to the left so as to engage the document. Such engagement with the document deforms the contour of the document as shown and begins to pull the document transversely away from engagement with the belt flights and the guide rails or other document moving structures. A spring biased backing plate 618 which may have additional documents in supporting connection therewith, is moved by the action of the plunger as shown in FIGS. 33 and 34. Backing plate 618 is biased by a spring or other suitable device so that documents in supporting connection with the backing plate are generally trapped between the backing plate and the wall surfaces 574 of the guide.

Figure 35:
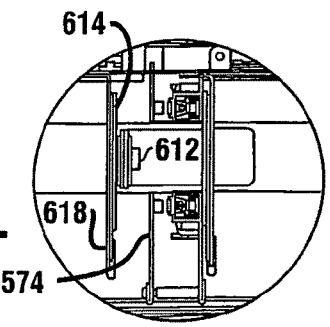
Figure 36:
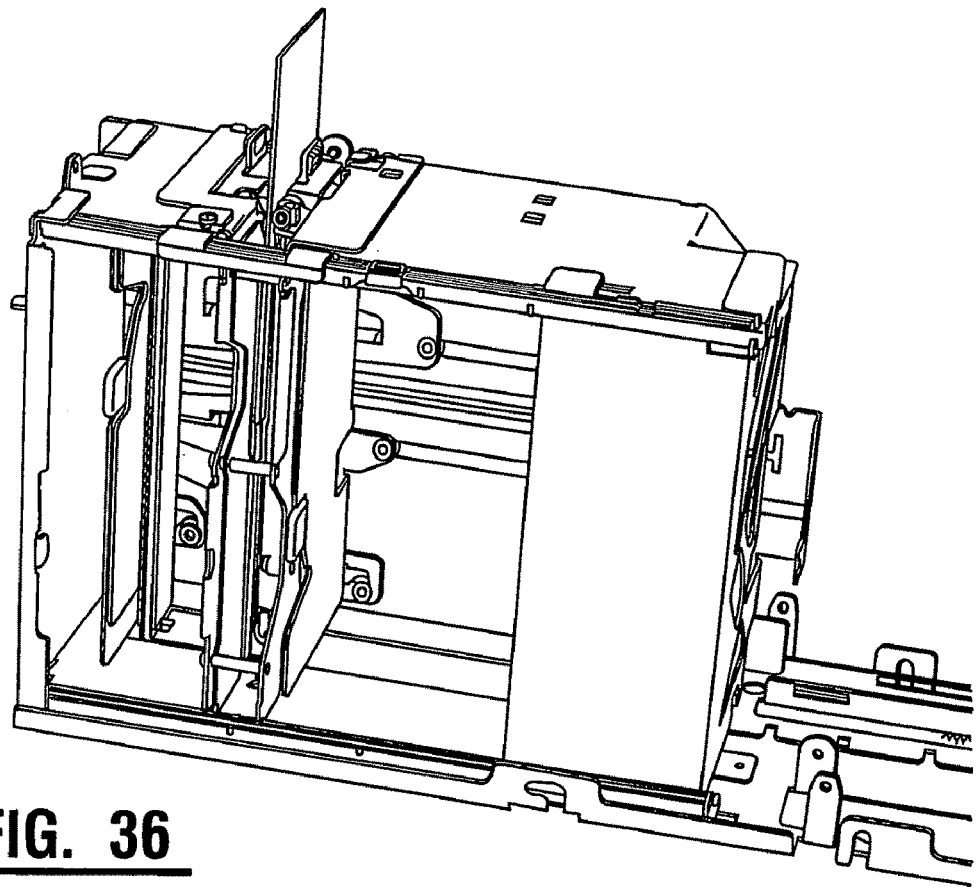
FIG. 36 is an isometric view similar to FIG. 31 showing the vertical transport of the accepting a document therein.

As represented in FIGS. 34 and 35 as the plunger 612 moved further toward the storage location 608, the document disengages from the rails and belts so that the document is eventually held in supported relation with the backing plate 618 by the plunger. Once the document 614 has reached this position as shown in FIG. 35 the plunger may be moved again to the right as shown such that the document 614 is integrated into the document stack supported on backing plate 618. Further as the plunger 612 returns toward its original position, the documents supported on the backing plate are held in sandwiched relation between the wall surfaces 574 of the guide and the backing plate. Thus the document 614 which was moved into the storage area has been selectively moved through operation of the plunger into the storage location 608.

Figure 37:
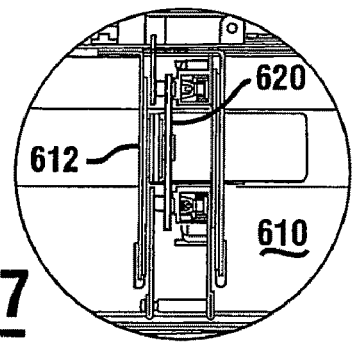
FIGS. 37 through 40 show the sequential movement of the exemplary plunger member to move a document in the vertical transport to a storage location on the right side of the vertical transport as shown.
Figure 39:
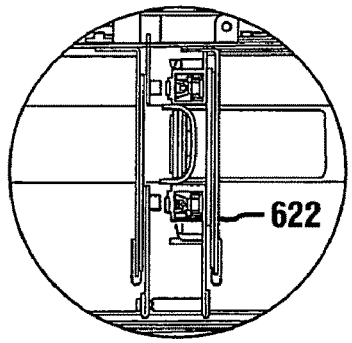
Figure 38:
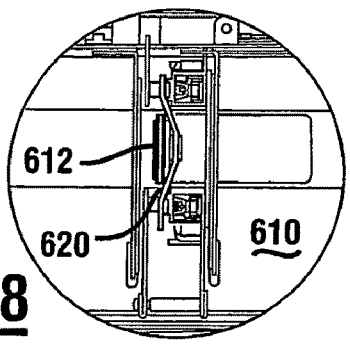
Figure 40:
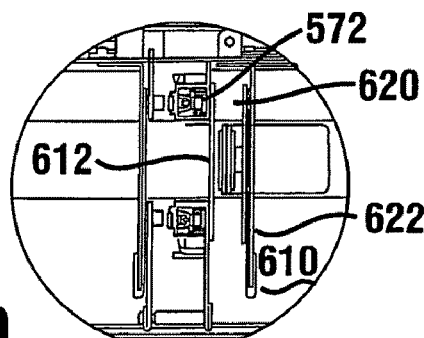

FIGS. 36 through 40 show operation of the plunger member to store a document in storage location 610. As shown in FIG. 37 a document 620 is moved into the vertical transport and because this document is to be stored in storage location 610 the plunger member 612 is positioned responsive to operation of the processor to the left of the document as shown. As shown in FIGS. 38 and 39 movement of the plunger member 612 toward the right as shown disengages the document from the transport and brings it into supporting connection with a spring loaded backing plate 622. Backing plate 622 is biased by a spring or other suitable biasing mechanism toward the left as shown in FIGS. 39 and 40.

Movement of the plunger 612 to the extent shown in FIG. 40 causes the document 620 to be supported in a stack on the backing plate 622. In this position the plunger may be again moved to the left such that the documents in the stack in storage location 610 are held in sandwiched relation between the back walls 572 of the vertical transport and the backing plate.

As can be appreciated in the exemplary embodiment documents can be selectively stored in a storage location of the device by positioning and moving the plunger so that the document is stored in the storage location as desired. This enables documents to be segregated into various document types. For example in some embodiments the ATM may be operated such that checks that are drawn on the particular institution operating the machine are stored in one storage location of the storage area 430 while others that are not drawn on that institution are stored in the other storage location. Alternatively in some embodiments where the mechanism is used to accept checks and currency bills, bills which have been validated may be stored in one storage location while bills that have been determined to be counterfeit or suspect may be stored in another storage section. In still further alternative embodiments where the device is operated to accept checks and bills, currency bills may be stored in one storage location while checks are stored in another. Of course this approach is exemplary.

In alternative embodiments additional provisions may be made. For example in some embodiments one or more aligned vertical transports may be capable of transporting documents through several vertically aligned storage areas. In such situations a document may be moved to the vertical level associated with a storage area that is appropriate for the storage of the document. Once at that level a plunger may move transversely so as to place the document into the appropriate storage location on either side of the vertical transport. In this way numerous types of documents can be accepted and segregated within the ATM.

In still other alternative embodiments the storage mechanism may be integrated with a document picker mechanism such as shown in U.S. Pat. No. 6,331,000 the disclosure of which is incorporated by reference. Thus documents which have been stored such as currency bills may thereafter be automatically removed through operation of the picker mechanism and dispensed to users of the ATM machine. Various approaches may be taken utilizing the principals of the described embodiments.

Figure 2:
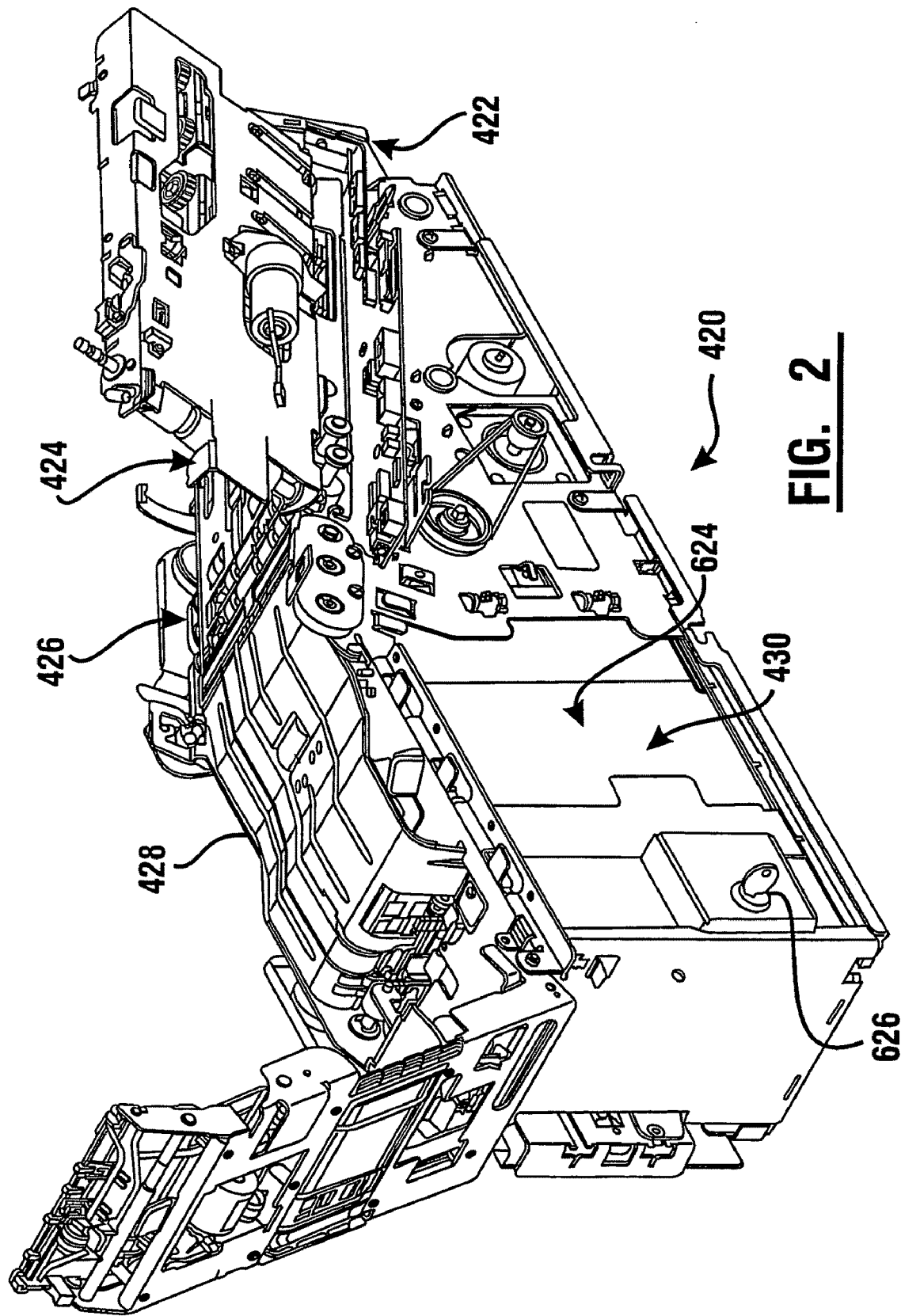
FIG. 2 is an opposite hand isometric view of the deposit accepting apparatus shown in FIG. 1.
Figure 28:
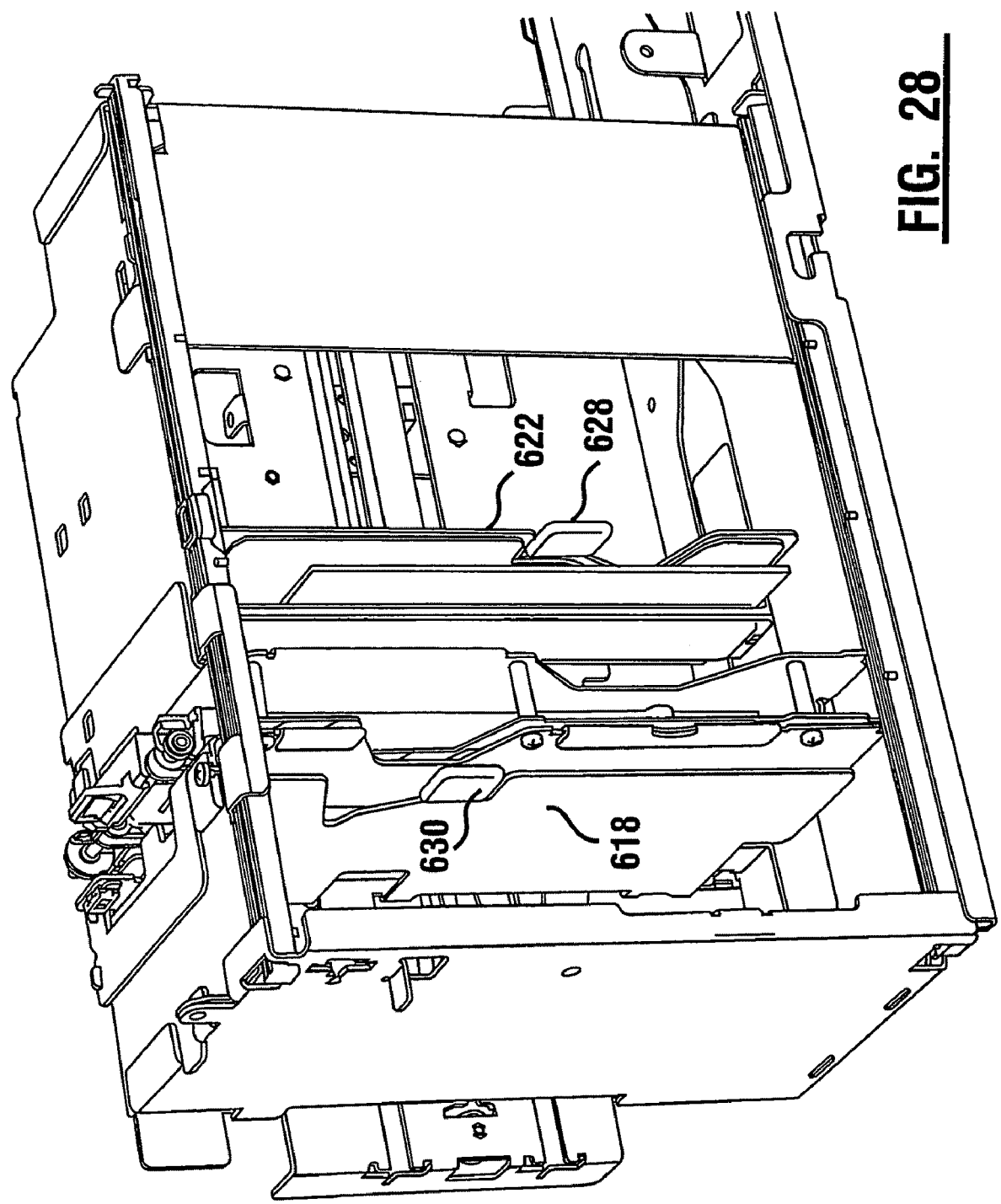
FIG. 28 is an isometric view of the storage compartment of the alternative deposit accepting mechanism shown with the storage compartment having its access door in an open position.

As shown in FIG. 2 exemplary storage area 440 is generally held in a closed position such that the items stored therein are not accessible even to a servicer who has access to the interior of the ATM. This is accomplished through use of a sliding door 624 which in the exemplary embodiment is constructed of collapsible sections. The door is enabled to be moved such that access to documents stored in the storage area can be accessed such as is shown in FIG. 28. In an exemplary embodiment the ability to open door 624 is controlled by a lock 626. In the exemplary embodiment lock 626 comprises a key lock such that authorized persons may gain access to the interior of the storage area if they possess an appropriate key.

In some exemplary embodiments the deposit accepting device may be mounted in movable supporting connection with structures in the interior of the housing of the banking machine. This may be done in the manner shown in U.S. Pat. No. 6,010,065 the disclosure of which is incorporated herein by reference. In some exemplary embodiments a servicer may access the interior of the banking machine housing by opening one or more external doors. Such doors may require the opening of one or more locks before the interior of the housing may be accessed. With such a door open the servicer may move the deposit accepting device 420 while supported by the housing so that the storage area of the device extends outside the housing. This may make it easier in some embodiments to remove documents from the storage area.

In the exemplary embodiment persons authorized to remove documents from the storage area may open the lock and move the door 624 to an open position so as to gain access to the interior of the storage area. Documents that have been positioned in the storage locations can be removed by moving the backing plates 622 and 618 against the spring biasing force of the respective springs or other biasing mechanisms 617, 619, that holds the stacks of stored documents in sandwiched relation. Manually engageable tabs 628 and 630 are provided in the exemplary embodiment so as to facilitate the servicer's ability to move the backing plates against the respective biasing force. With the respective backing plate moved horizontally away from the vertical transport, the stack of documents between the backing plate and vertical transport can be removed. Each backing plate can be moved to remove document stacks on each horizontal side of the vertical transport. Once the stored documents have been removed, the backing plates can return automatically to the appropriate position to accept more documents due to the biasing force. Likewise the door 624 can be closed and the lock returned to the locked position. If the deposit accepting device is movably mounted so that the storage area is outside the machine, it can be moved back into the interior of the housing. The housing can then be secured by closing the doors and locks thereon. This construction of the exemplary embodiment not only facilitates the removal of checks, currency or other documents, but is also helpful in clearing any jams that may occur within the vertical transport.

The exemplary embodiment also provides advantages in terms of clearing jams within the document alignment, analysis and/or escrow areas. For example as shown in FIGS. 1 and 2, the device may be opened such that the entire transport path for documents up to the point of the vertical transport may be readily accessed. As a result in the event that the document should become jammed therein, a servicer may unlatch a latch which holds a platen in position such as for example latch 632 shown in FIG. 1 and move the platen 448 rotationally and the components supported thereon to the position shown so as to enable exposing the document alignment area and document analysis area. As can be appreciated platen 448 is mounted through hinges which enable the platen to rotate about an axis through the hinges so as to facilitate the opening thereof. Likewise the portions of the platen 449 supporting the mechanisms overlying the escrow area can be opened as shown to expose that area of the document transport path so as to facilitate accessing documents therein. As shown in FIGS. 1 and 2, platen 449 is rotatable about an axis that extends generally perpendicular to the axis about which platen 448 is rotatable. Further in the exemplary embodiment, platens 448 and 449 are configured so that platen 448 must be moved to the open position before platen 449 can be opened. Likewise platen 449 must be closed before platen 448 is closed. This exemplary construction enables the use of a single latch to secure the platens in the operative positions, and to enable unsecuring the single latch so that the platens can both be moved to expose the document alignment, document analysis and escrow areas of the document transport path in the device.

Of course, this approach is exemplary and in other embodiments other approaches may be used.

In servicing the exemplary embodiment of the deposit accepting device 420 which for purposes of this service discussion will be described with regard to checks, a servicer generally begins by opening a door or other access mechanism such as a fascia or panel that enables gaining access to an interior area of the housing of the ATM. In an exemplary embodiment the check accepting device 420 is supported on slides, and after unlatching a mechanism that normally holds the device in operative position, the device can be moved, while supported by the housing to extend outside the ATM. Of course in some situations and depending on the type of service to be performed, it may not be necessary to extend the device outside the ATM housing. Alternatively in some situations a servicer may extend the device outside the housing and then remove the device from supporting connection with the ATM housing completely. This may be done for example, when the entire device is to be replaced with a different device.

The servicer may disengage the latch 632 and rotate platen 448 about the axis of its hinges. This exposes the areas of the transport path through the device in the document alignment area 424 and document analysis area 426. It should be noted that when the platen 448 is moved to the open position the toothed contoured edges 456,458 shown in FIG. 4, are moved apart.

With the platen 448 moved to expose the document alignment and document analysis areas, any checks which have become caught or jammed therein can be removed by the servicer. The servicer can also conduct other activities such as cleaning the scanning sensors or the magnetic read head. Such cleaning may be done using suitable solvents, swabs or other materials. The servicer may also clean, align, repair or replace other items in the exposed areas of the transport path.

Figure 3:
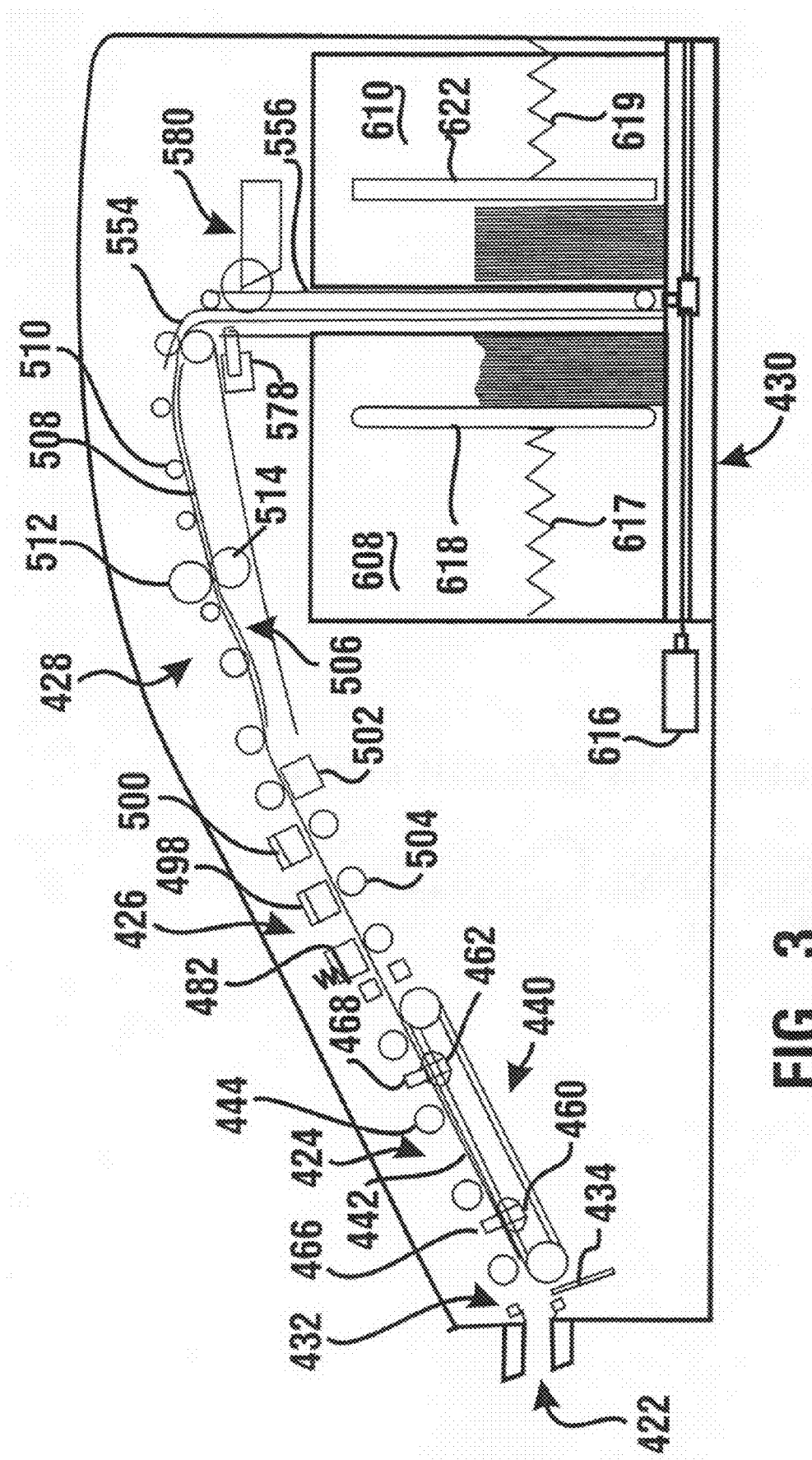
FIG. 3 is a schematic view of the devices included in the deposit accepting apparatus.

With platen 448 in the open position a servicer may also move platen 449 from the closed position to the open position shown in FIGS. 2 and 3. Rotating platen 449 about the axis of its supports to the open position, exposes the escrow area 428 of the transport path. A servicer may then clear any jammed documents from the escrow area. The servicer may also clean, align, repair or replace other components that are exposed or otherwise accessible in the escrow area.

Upon completion of service the platen 449 is rotated to the closed position. Thereafter the platen 448 is rotated to the closed position. This brings the contoured edges 456, 458 back into adjacent alignment. With platen 448 in the closed position the latch 632 is secured to hold both platens in the closed positions, the check accepting device can then be moved back into the operating position and secured therein. The servicer when done, will then close the door or other device to close the interior of the ATM housing. Of course these approaches are exemplary.

Upon closing the housing the ATM may be returned to service. This may include passing a test document through the transport path through the deposit accepting device 420 and/or reading indicia of various types from one or more test documents. It may also include operating the machine to image the document that was jammed in the device to capture the data therefrom so that the transaction that cause the ATM malfunction can be settled by the system. Of course it should be understood that these approaches are exemplary and in other embodiments other approaches may be used.

Figure 41:
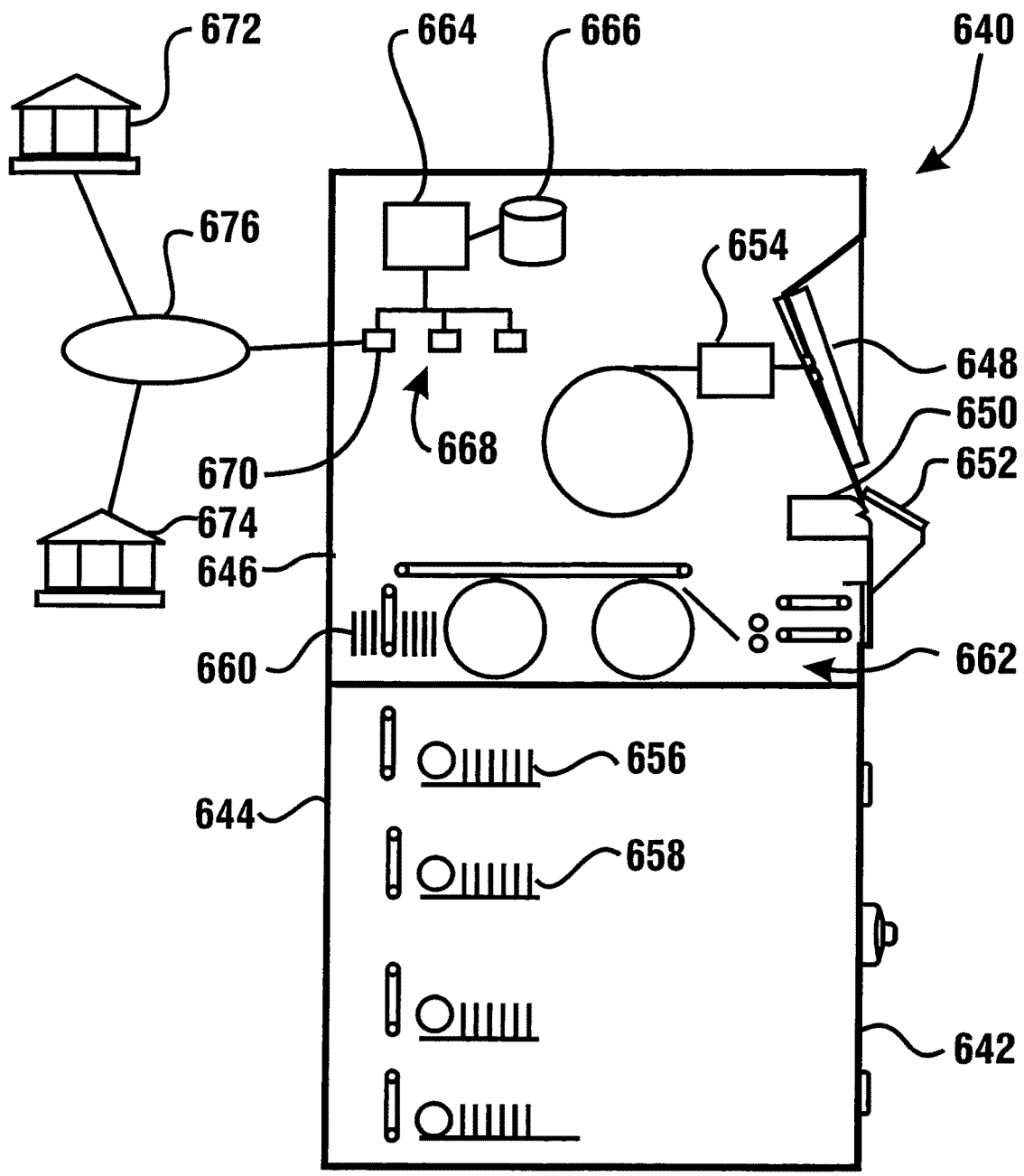
FIG. 41 is a schematic view showing an automated banking machine with an alternative exemplary deposit accepting device.

FIG. 41 shows an alternative exemplary embodiment of an automated banking machine 640. Banking machine 640 includes a housing 642. Housing 642 of the machine includes a chest portion 644 and an upper housing portion 646. Chest portion 644 provides a secure storage area in an interior portion thereof. The interior of the chest portion may be used for example to store valuable sheets such as currency notes, travelers checks, scrip, checks, tickets or other valuable sheets that have been received by and/or that are to be dispensed from the machine. The chest portion includes a suitable chest door and lock for providing authorized access thereto. The upper housing portion 646 of the exemplary embodiment also includes suitable access doors or other mechanisms to enable authorized persons to obtain access to items therein. Examples of chest portions are shown in U.S. Pat. No. 7,000,830 and U.S. Application No. 60/519,079, the disclosures of which are incorporated herein by reference.

The exemplary automated banking machine 640 includes output devices including a display 648. Other output devices may include for example speakers, touchpads, touchscreens or other items that can provide user receivable outputs. The outputs may include outputs of various types including for example, instructions related to operation of the machine. The exemplary automated banking machine further includes input devices. These may include for example a card reader 650. The card reader may be operative to read indicia included on cards that are associated with a user and/or a user's account. Card readers may be operative to read indicia for example, indicia encoded on a magnetic stripe, data stored in an electronic memory on the card, radiation transmitted from an item on the card such as a radio frequency identification (RFID) chip or other suitable indicia. User cards represent one of a plurality of types of data bearing records that may be used in connection with activating the operation of exemplary machines. In other embodiments other types of data bearing records such as cards, tokens, tags, sheets or other types of devices that include data that is readable therefrom, may be used.

In exemplary embodiments data is read from a card through operation of a card reader. The card reader may include features such as those disclosed in U.S. Pat. No. 7,118,031 the disclosure of which is incorporated herein by reference. The exemplary automated banking machine is operative responsive to at least one processor in the machine to use data read from the card to activate or allow operation of the machine by authorized users so as to enable such users to carry out at least one transaction. For example the machine may operate to cause data read from the card and/or data resolved from card data and other inputs or data from the machine, to be compared to data corresponding to authorized users. This may be done for example by comparing data including data read from the card to data stored in or resolved from data stored in at least one data store in the machine. Alternatively or in addition, the automated banking machine may operate to send one or more messages including data read from the card or data resolved therefrom, to a remote computer. The remote computer may operate to cause the data received from the machine to be compared to data corresponding to authorized users based on data stored in connection with one or more remote computers. In response to the positive determination that the user presenting the card is an authorized user, one or more messages may be sent from the remote computer to the automated banking machine so as to enable operation of features thereof. This may be accomplished in some exemplary embodiments through features such as those described in U.S. Pat. Nos. 7,284,695 and/or 7,266,526 the disclosures of each of which are incorporated herein by reference. Of course these approaches are exemplary and in other embodiments other approaches may be used.

The exemplary automated banking machine further includes a keypad 652. Keypad 652 provides a user input device which includes a plurality of keys that are selectively actuatable by a user. Keypad 652 may be used in exemplary embodiments to enable a user to provide a personal identification number (PIN). The PIN data may be used to identify authorized users of the machine in conjunction with data read from cards so as to assure that machine operation is only carried out for authorized users. Of course the input devices discussed herein are exemplary of numerous types of input devices that may be used in connection with automated banking machines.

The exemplary automated banking machine further includes other transaction function devices. These may include for example, a printer 654. In the exemplary embodiment 654 is operative to print receipts for transactions conducted by users of the machine. Other embodiments of automated banking machines may include other types of printing devices such as those suitable for printing statements, tickets or other types of documents. The exemplary automated banking machine further includes a plurality of other devices. These may include for example, a sheet dispensing device 656. Such a device may be operative to serve as part of a cash dispenser device which selectively dispenses sheets such as currency notes from storage. It should be understood that for purposes of this disclosure, a cash dispenser device, is one or more devices that can operate to cause currency stored in the machine to be dispensed from the machine. Other devices may include a recycling device 658. The recycling device may be operative to receive sheets into a storage location and then to selectively dispense sheets therefrom. The recycling device may be of a type shown in U.S. Pat. Nos. 6,302,393 and 6,131,809, the disclosures of which are incorporated herein by reference. It should be understood that a recycling device may operate to recycle currency notes and may in some embodiments, a cash dispenser may include the recycler device. Further the exemplary embodiment may include sheet storage devices 660 of the type previously described herein which are operative to selectively store sheets in compartments.

The exemplary ATM 640 includes a deposit accepting device 662 which is described in greater detail hereafter. The deposit accepting device of an exemplary embodiment is operative to receive and analyze sheets received from a machine user. The exemplary deposit accepting device is also operative to deliver sheets from the machine to machine users. It should be understood that in other embodiments additional or different deposit accepting devices may be used. Further for purposes of this disclosure a deposit accepting device may alternatively be referred to as a sheet processing device.

The exemplary automated banking machine 640 further includes at least one processor schematically indicated 664. The at least one processor is in operative connection with at least one data store schematically indicated 666. The processor and data store are operative to execute instructions which control and cause the operation of the automated banking machine. It should be understood that although one processor and data store are shown, embodiments of automated banking machines may include a plurality of processors and data stores which operate to control and cause operation of the devices of the machine.

The at least one processor 664 is shown in operative connection with numerous transaction function devices schematically indicated 668. Transaction function devices include devices in the machine that the at least one processor is operative to cause to operate. These may include devices of the type previously discussed such as the card reader, printer, keypad, deposit accepting device, sheet dispenser, recycler and other devices in or that are a part of the machine.

In the exemplary embodiment the at least one processor is also in operative connection with at least one communication device 670. The at least one communication device is operative to enable the automated banking machine to communicate with one or more remote servers 672, 674 through at least one network 676. It should be understood that the at least one communication device 670 may include various types of network interfaces suitable for communication through one or more types of public and/or private networks so as to enable the automated banking machine to communicate with a server and to enable ATM users to carry out transactions. Of course it should be understood that this automated banking machine is exemplary and that automated banking machines may have numerous other types of configurations and capabilities.

Figure 42:
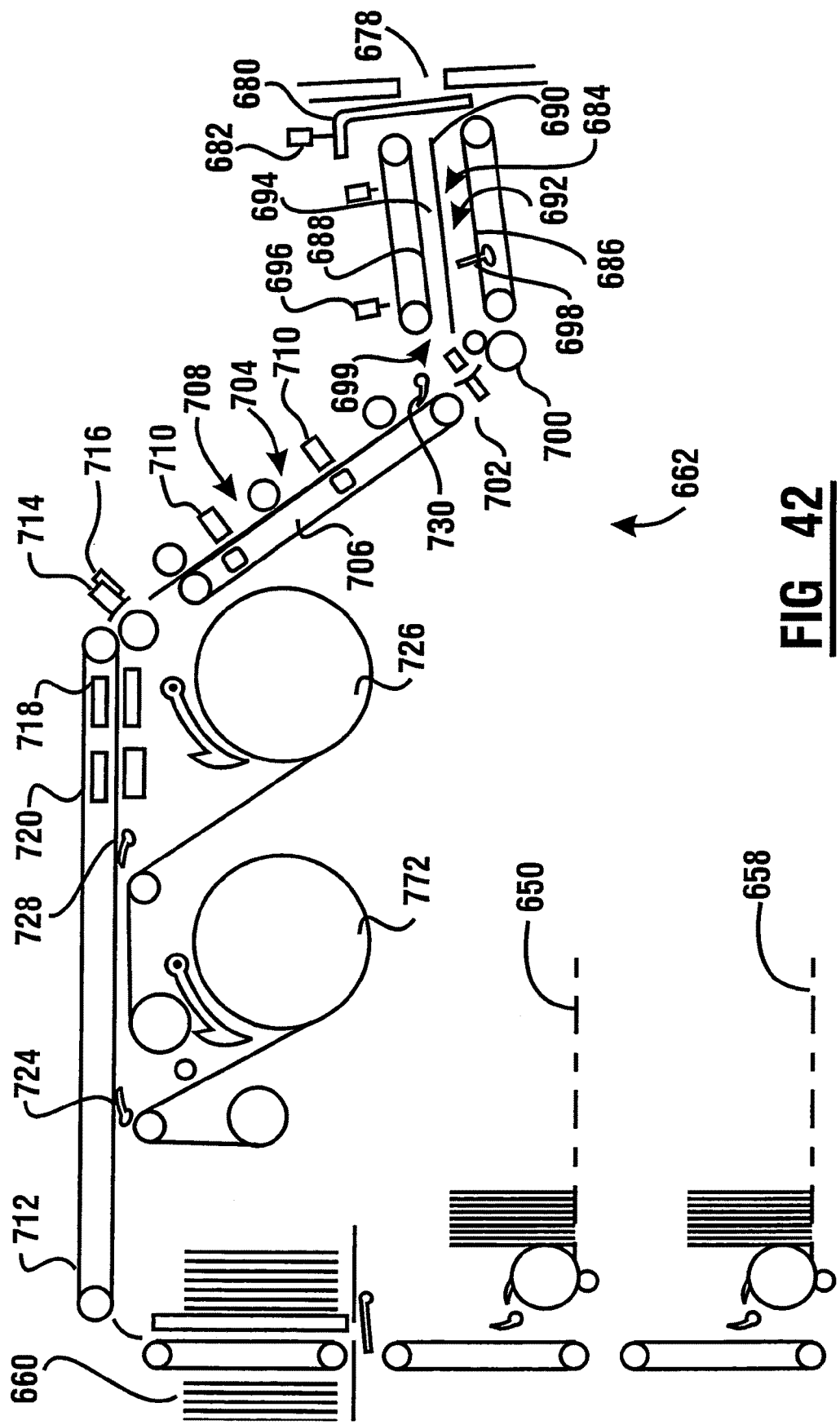
FIG. 42 is a schematic view of an exemplary deposit accepting device of the type shown in the automated banking machine of FIG. 41.

FIG. 42 shows in greater detail the exemplary deposit accepting device 662. The exemplary deposit accepting device is in operative connection with a sheet opening 678 that extends through the housing of the machine. In the exemplary embodiment the sheet opening is configured to enable the sheets to be provided thereto into the machine from users, as well as to deliver sheets from the machine to users. Access through the sheet opening is controlled in the exemplary embodiment by a movable gate 680. Gate 680 is selectively moved between the opened and closed positions by a drive 682. The drive 682 selectively opens and closes the gate responsive to operation of the at least one processor 664. Therefore in operation of the exemplary automated banking machine the gate is moved to the open position at appropriate times during transactions such as when sheets are to be received into the machine from users and when sheets are to be delivered from the machine to users.

The exemplary device further includes a sheet access area generally indicated 684. The exemplary sheet access area is an area in which sheets are received in as well as delivered from the machine. The exemplary sheet access area includes a first sheet driver member 686. The exemplary sheet driver member 686 includes a belt flight of a continuous belt that is selectively driven by a drive (not separately shown). The drive operates responsive to operation of the at least one processor. The sheet access area is further bounded upwardly by a sheet driver member 688 which in the exemplary embodiment also comprises a belt flight of a continuous belt. In the exemplary embodiment the lower belt flight which comprises the sheet driver member 688 is vertically movable relative to the upper belt flight which comprises sheet driver member 686 such that a distance between them may be selectively varied. It should be understood however that although the exemplary embodiment uses belt flights as the sheet driver members, in other embodiments rollers, tracks, compressed air jets or other devices suitable for engaging and moving sheets may be used. In the exemplary embodiment a single upper belt flight and lower belt flight are used to move sheets in the sheet access area. However, it should be understood that in other embodiments other numbers and configurations of sheet driving members may be used.

The exemplary sheet access area includes a divider plate 690. The exemplary divider plate comprises a pair of divider plate portions with an opening therebetween. The opening extends parallel to the belt flights and enables the belt flights to engage sheets therethrough. Of course this approach is exemplary. The exemplary divider plate divides the sheet access area into a first side 692 which is below the plate in the exemplary embodiment, and a second side 694 which is above the divider plate. It should be understood that although in the exemplary embodiment only one split divider plate is used, in other embodiments a plurality of divider plates may be employed so as to divide an area into multiple subcompartments.

In the exemplary embodiment the divider plate 690 and upper sheet driving member 688 are selectively relatively movable vertically with respect to the lower sheet driving member 686. This is done in a manner later explained so as to selectively enable the sheet driving members to engage and move sheets in either the first side or the second side. This is done through operation of drives schematically indicated 696. Such drives can include suitable motor, levers, solenoids, lead screws and other suitable structures to impart the movement described herein. The drives operate responsive to instructions executed by the at least one processor. It should further be understood that although in the exemplary embodiment the lower sheet driving member is generally in fixed vertical position relative to the housing, in other embodiments the lower sheet driving member may be movable and other components may be fixed.

In the exemplary embodiment the sheet access area further includes a movable stop 698. The stop is operative to extend at appropriate times to limit the inward insertion of documents into the sheet access area by a user. The stop operates to generally positively position inserted sheets that are going to be received and processed by the deposit accepting device. The stop is selectively movable by at least one drive (not separately shown) which moves the stop in response to operation of the at least one processor. The inner ends of sheet driver members 686 and 688 bound an opening 699 through which sheets can move either inwardly or outwardly in the deposit accepting device 662.

The exemplary sheet access area is operatively connected to a picker 700. The picker is operative to separate individual sheets from a stack in the sheet access area. In the exemplary embodiment the picker may operate in a manner like that described in U.S. Pat. Nos. 6,634,636; 6,874,682; and/or 7,261,236 the disclosures of which are incorporated herein by reference. The picker operates generally to separate each sheet from the inserted stack of sheets. At least one sensor 702 operates in the exemplary embodiment to sense thickness and enable at least one processor to determine if the picker has failed to properly separate each individual sheet. In response to sensing of a double or other multiple sheet in the area beyond the picker, the at least one processor operates in accordance with its programming to reverse the picking function so as to return the sensed multiple sheets to the stack. Thereafter the picker may attempt to pick a single sheet and may make repeated attempts until a single sheet is successfully picked. Further as later explained, in the exemplary embodiment the picker is operative to pick sheets that may be located in either the first side 692 or the second side 694 of the divider plate in the sheet access area.

In the exemplary embodiment the picker 700 is operative to deliver individual sheets that have been separated from the stack to a sheet path indicated 704. Sheets are moved in the sheet path through operation of a transport 706 which engages the sheets. It should be understood that although a single transport of a belt type is shown, in other embodiments other numbers and types of transports may be employed for moving sheets.

In the exemplary embodiment the area of the sheet path includes a document alignment area which may operate in the manner similar to that previously described or in other suitable ways, to align sheets relative to the direction that sheets are moved along the transport path. For example in the exemplary embodiment the transverse transport includes transverse transport rolls 710 that operate in a manner like that previously discussed to engage a sheet and move it into alignment with the transport path by sensing an edge of the sheet with a plurality of spaced sensors which form a "virtual wall." The transverse movement of the sheet by the transverse transport is operative to align the sheet relative to the movement of sheets along sheet path in the device. As discussed in more detail below, in this exemplary embodiment the alignment area includes devices operative to align the sheet as well as to determine a width dimension associated with the sheet so as to facilitate the analysis of magnetic indicia thereon.

In some embodiments it may be desirable to use sheet transports that move sheets in sandwiched relation between a driving member such as a roll or belt flight, and a follower member that extends on an opposed side of the sheet from the driving member. The follower member may be operative to assure engagement of the sheet with the driving member to assure sheet movement therewith. In some embodiments movable rolls or belts may operate as suitable follower members. However, in some embodiments it may be desirable to use stationary resilient members as biasing members. This may include, for example, a resilient member with a low friction sheet engaging surface to facilitate sheet movement thereon. For example such a suitable member may comprise a compressible resilient foam body with a low friction plastic cover. Such a foam member can be used to provide biasing force to achieve sheet engagement with a driving member. In still other embodiments the foam body may be operatively supported on a further resilient member, such a leaf spring which can provide a further biasing force. Such a structure for a follower member may be useful in sheet transports in providing more uniform force distribution on moving sheets to minimize the risk of sheet damage. Further such a sheet follower structure may be useful in providing the follower function for one or more transports that move sheets in multiple directions, at least some of which are transverse to one another in a particular sheet transport area. As a result such follower structures may be used in the area in which sheets are aligned. Of course this approach is exemplary.

In the exemplary embodiment the transport 706 is operative to move sheets to engage a further transport schematically indicated 712. The transport is also operative to move sheets past magnetic indicia reading devices 714, 716 which are alternatively referred to herein as magnetic read heads. The exemplary embodiment further includes analysis devices for analyzing documents. These include for example, an imager 718. Imager 718 may be of the type previously discussed that is operative to generate data corresponding to the visual image of each side of the sheet. Further in the exemplary embodiment an analysis device includes a currency validator 720 is used to analyze properties of notes. For example in some embodiments currency validators employing the principles described in U.S. Pat. No. 5,923,413 which is incorporated herein by reference may be used for purposes of determining whether sheets have one or more property associated with valid notes. The at least one processor may be operative to determine whether notes received are likely valid, invalid and/or of suspect authenticity. Other devices may be included which sense for other properties or data which can be used to analyze sheets for properties that are associated with authenticity. Based on determining whether sheets have at least one property, the exemplary automated banking machine is operative to store, return or otherwise process notes in a manner that is later described. Of course it should be understood that some of the principles may be used by the at least one processor to make a determination if at least one property associated with checks analyzed through devices in the machine, have one or more properties that suggest that they are valid or invalid checks. Similarly analysis devices in a machine may be used to assess validity of other types of sheets.

In the exemplary embodiment the deposit accepting device includes a sheet storage and retrieval device 722. In the exemplary embodiment the sheet storage and retrieval device includes a belt recycler. The belt recycler may be of the type shown in U.S. Pat. No. 6,270,010 the disclosure of which is incorporated herein by reference. The sheet storage and retrieval device is selectively operative to store sheets that are directed thereto from the transport 712 by a diverter 724. The diverter is selectively operated responsive to a drive which moves responsive to instructions from the at least one processor to cause sheets to be directed for storage in the sheet storage and retrieval device 722.

In the exemplary embodiment the sheet accepting device further includes a sheet storage and retrieval device 726. The sheet storage and retrieval device 726 of the exemplary embodiment may be similar to device 722. Sheets are directed to the sheet storage and retrieval device 726 from the transport 712 through selective operation of a diverter 728. It should be understood that although in the exemplary embodiment the sheet storage and retrieval devices include belt recyclers, other forms of devices that are operative to accept and deliver sheets may be used.

In exemplary embodiments the transports 712 and 706 are selectively operated responsive to respective drives. The drives operate responsive to operation of the at least one processor to move sheets therein. The transports of the exemplary embodiment are operative to move sheets both away from and toward the sheet access area. Further in the exemplary embodiment a diverter 730 is positioned adjacent to the sheet access area. The diverter 730 operates in the manner later described to direct sheets moving toward the sheet access area onto the second side of the diverter plate. Of course this approach is exemplary.

Further in the exemplary embodiment the automated banking machine includes a plurality of transports as shown, which enable sheets to be selectively moved to and from the storage area 660, the sheet dispenser device 656, the recycling device 658 and other devices or areas, to or from which sheets may be delivered and/or received. Further in the exemplary embodiment appropriate gates, diverters and/or other devices may be positioned adjacent to the transports so as to selectively control the movement of sheets as desired within the machine. It should be understood that the configuration shown is exemplary and in other embodiments other approaches may be used.

Figure 43:
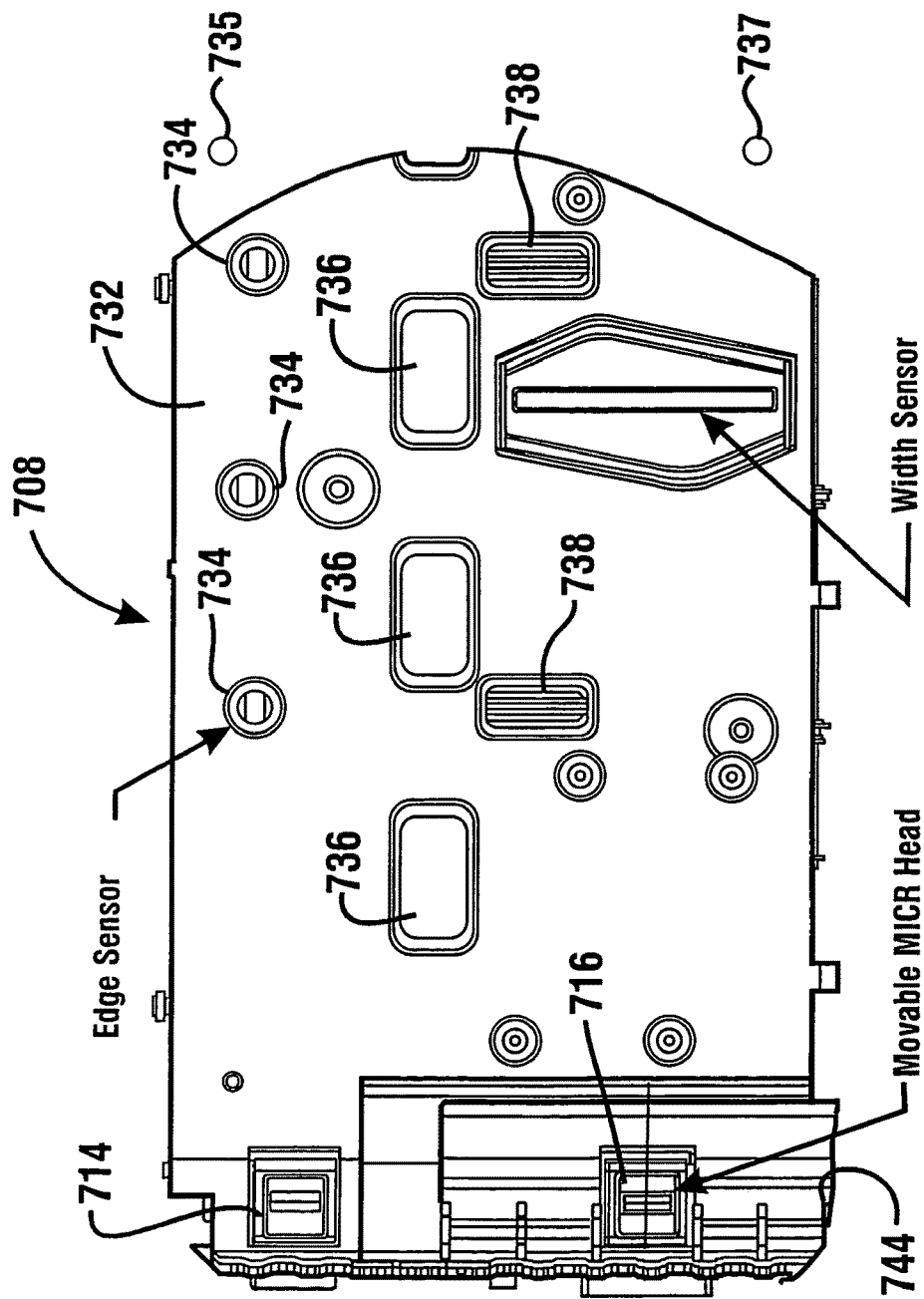
FIG. 43 is a plan view of an exemplary platen in a document alignment area of the alternative deposit accepting device.

FIG. 43 shows an alternative exemplary embodiment of a document alignment area 708. The document alignment area includes a platen 732. The platen includes a plurality of document alignment sensors 734. The document alignment sensors 734 are similar to alignment sensors 474 previously discussed. As with the prior embodiment three document alignment sensors extend in spaced relation along the direction of sheet movement in the transport path. A plurality of rollers 736 operate in a manner similar to rollers 444 and are operative to move the sheet in the direction of the transport path. A transverse transport that is operative to move sheets in a direction generally perpendicular to the transport path includes transverse follower rolls 738. As in the case with the prior described embodiment, the transverse transport includes transverse rolls on an opposed side of the transport from the platen 732. As in the previously described embodiment the rollers 736 generally engage a sheet between the rollers and other driving members such as a belt. To align the sheet, the rollers 736 move away from the sheet and the transverse follower rolls 738 that were previously disposed away from the sheet move toward the sheet to engage the sheet in sandwiched relation between the transverse transport roll and a corresponding follower roll. The sheet is moved transversely until it is aligned with the direction of movement of sheets in the transport path based on the document alignment sensors 734. This is done in a manner like that previously discussed. The transverse transport rollers are then moved to disengage the sheet while the rollers 736 move to engage the sheet so that it now can be moved in its aligned condition in the transport path. Of course instead of rollers other types of sheet moving members may be used.

The exemplary deposit accepting device includes magnetic read heads 714 and 716. Magnetic read heads 714 may be mounted in a manner like that previously discussed. In the exemplary embodiment, magnetic read head 714 is in a fixed transverse position relative to the sheet path. Magnetic read head 714 is generally positioned in the exemplary embodiment relative to the sheet path so that a check that has been aligned in the document alignment area will generally have the micr line indicia on the check pass adjacent to the magnetic read head 714. This is true for two of the four possible facing positions of a check as it passes through the device. This is represented by the exemplary check segments 740 and 742 shown in FIG. 44.

Figure 45:
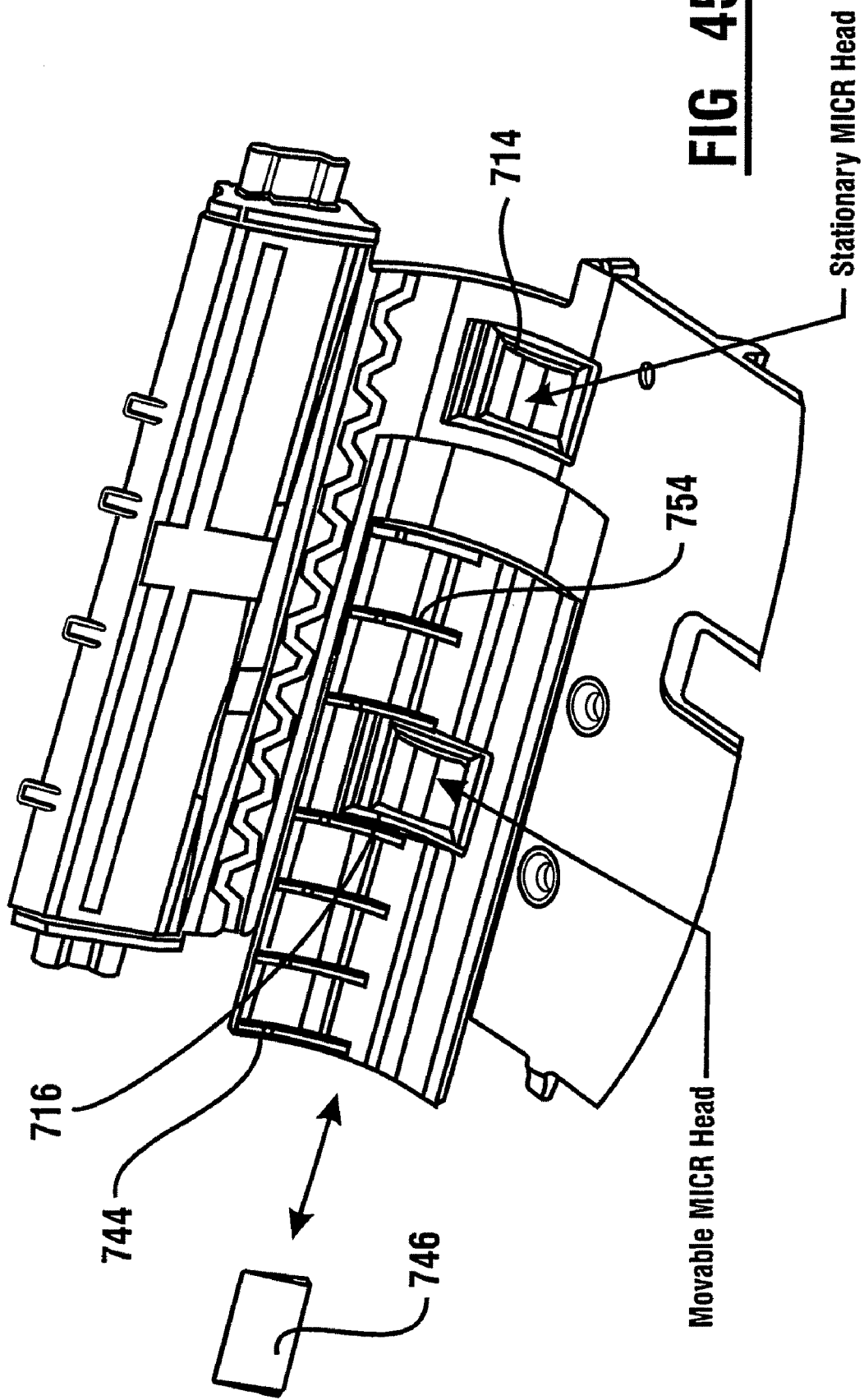
FIG. 45 is an isometric view showing an exemplary movable micr read head.

Magnetic read head 716 is mounted in operatively supported connection with a mount 744. Mount 744 is movable transversely to the sheet path as represented by arrow M in FIG. 45. The position of read head 716 transversely relative to the sheet path is changeable through operation of a positioning device 746. The positioning device may include any number of movement devices such as a motor, solenoid, cylinder, shape memory alloy element or other suitable element that is operative to selectively position read head 716 relative to the sheet path.

Figure 44:
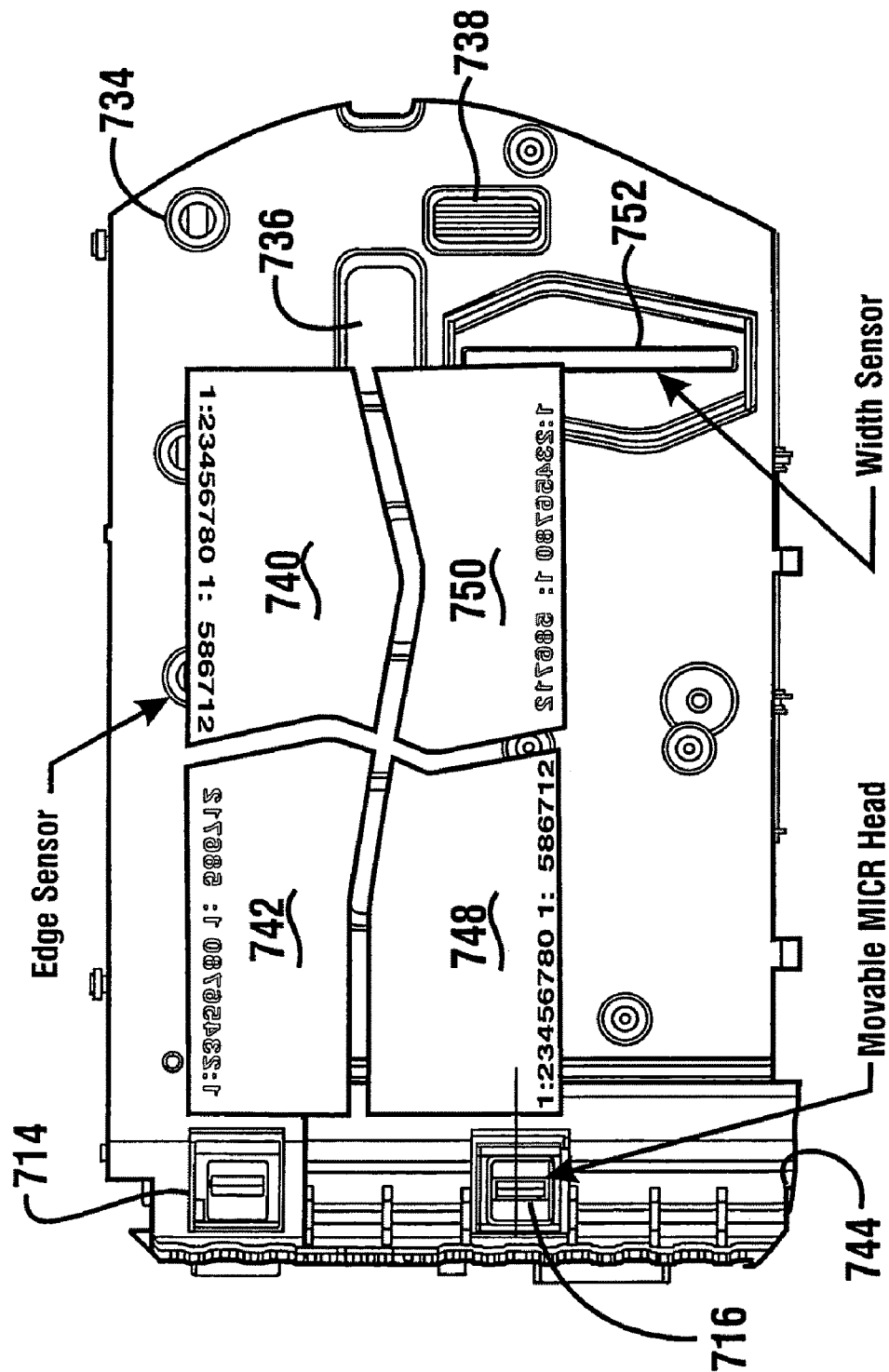
FIG. 44 is a view similar to FIG. 43 but including portions of a check therein showing the location of the indicia included in the micr line in the four possible orientations of a check in the document alignment area.

As can be appreciated from FIG. 44, read head 716 may be selectively positioned transversely so that when a check is in the two orientations where the micr line data would not pass adjacent to read head 714, such micr line indicia would pass adjacent to read head 716. This is represented by exemplary check segments 748 and 750 in FIG. 44.

In the exemplary embodiment the document alignment area includes a width sensor 752. Width sensor 752 may include in some embodiments a plurality of aligned sensors, a linear array charge couple device (CCD) sensors or other sensor or groups of sensors that are operative to sense at least one dimension or property which corresponds to a width associated with a check. In the exemplary embodiment this is done once the check has been aligned with the transport path and the document alignment sensors 734. This capability of determining using signals from the sensor 752, the width of the aligned document enables at least one processor in the machine to cause the positioning device 746 to move the read head 716 to the appropriate transverse position for reading the micr line indicia on the check in the event that the check is in one of the two positions wherein the micr indicia is disposed on the opposite of the check from read head 714.

The at least one processor has associated programming in at least one data store that enables determination of the proper position for the read head 716 because check printing standards specify the location of the micr line indicia relative to a longitudinal edge of the check. As a result for a given check that has been aligned in the document alignment area, the at least one processor is operative to determine a width associated with the check responsive to signals from sensor 752.

The width signals thereafter enable the processor to cause the read head 716 to be positioned in an appropriate transverse position for reading the micr data if the check is in two of the four possible check orientations.

It should be noted that as represented in FIG. 44 the read heads are operative to read the micr indicia regardless of whether the indicia is on the check immediately adjacent to the read head or on an opposed side of the check from the read head. This is because the magnetic characters which comprise the micr indicia can be sensed through the paper. Further in the exemplary embodiment the magnetic read heads are positioned in a curved area of the transport path. This generally helps to assure in the exemplary embodiment that the check is in contact or at least very close proximity with the read head. Further the exemplary embodiment of the mount 744 includes a plurality of vanes 754. Vanes 754 are curved and are operative to help guide the sheet through the area of the magnetic read heads without snagging. In an exemplary embodiment the vanes 754 are operative to reduce surface tension so as to facilitate movement of sheets thereon. Of course it should be understood that these structures are exemplary and in other embodiments other approaches may be used.

In exemplary embodiments each of the read heads is a part of magnetic sensor circuitry that is operative to determine magnetic indicia included on checks. Such magnetic indicia generally includes micr line data. The micr line data is generally usable to identify the check as well as the account on which the check is drawn. Such magnetic sensing circuitry may be of the type described in U.S. patent application Ser. No. 11/371,330 filed Mar. 8, 2006, the disclosure of which is incorporated herein by reference. Of course it should be understood that this magnetic sensing circuitry is exemplary and in other embodiments other forms of sensing circuitry may be used. Alternatively or in addition magnetic sensing circuitry may be operative to sense and read other forms of magnetic indicia other than or in addition to micr line characters. Further other embodiments may be operative to read magnetic indicia on types of documents other than checks. This may include for example magnetic indicia included on currency bills, money orders, vouchers, gaming materials or other types of documents.

In some exemplary embodiments the automated banking machine is operative to sense the operability of the magnetic sensing circuitry which includes the magnetic read heads. This is done by operating a source that serves as an emitter of electromagnetic radiation within the machine and determining the capability of the magnetic sensing circuitry to sense radiation from this source. In exemplary embodiments this source may include an electric motor or other device that can be selectively operated in the machine. In some exemplary embodiments the electric motor may be associated with a transaction function device such as a sheet transport that can be operated during transactions to move sheets within the machine. Alternatively in some embodiments the electromagnetic radiation source may include an actuator or other type of device that produces radiation that can be picked up by the magnetic sensing circuitry which also normally operates in the machine to read magnetic indicia in checks and/or other documents.

FIGS. 70 through 74 schematically represent the logic flow associated with computer executable instructions that can be carried out by at least one processor in an automated banking machine. This logic flow is operative to determine whether the magnetic sensing circuitry in the machine has experienced a malfunction or other condition that suggests that check reading transactions should no longer be carried out. Likewise such logic flow may also be operative to determine conditions which necessitate servicing of the machine by a service provider. In accordance with the logic represented, the at least one processor operates to cause the machine to provide such a notification to a remote computer that may be associated with a third party servicer. Of course this approach is exemplary.

Figure 70:
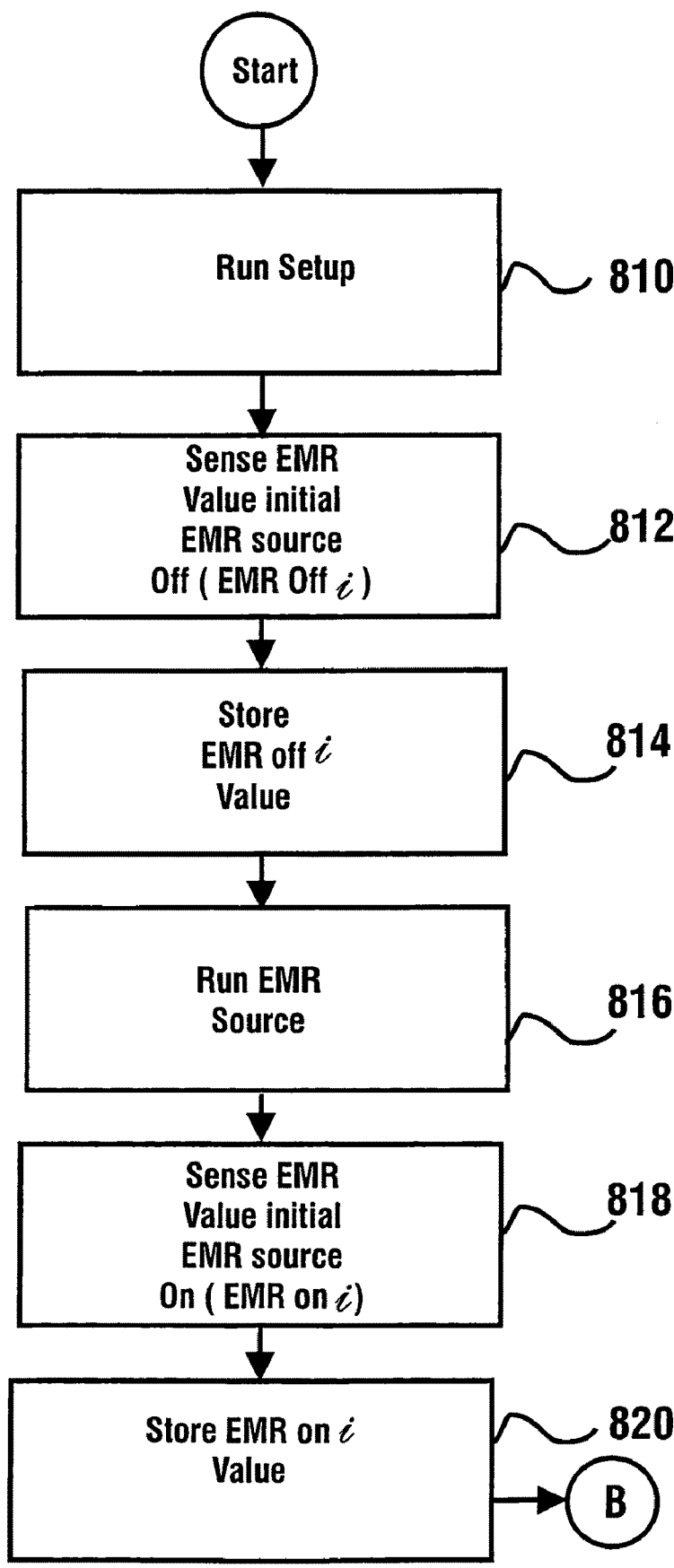
FIGS. 70 through 74 are a schematic representation of the exemplary logic carried out through operation of at least one processor for determining the condition of magnetic sensing components used in an exemplary embodiment.

Referring to FIG. 70 the exemplary logic begins with a step 810 in which the at least one processor operates in accordance with associated programmed instructions to initiate a setup routine. In exemplary embodiments a setup routine is operative when an ATM is first placed into service or at other times when initial settings are to be gathered for purposes of evaluating whether the machine has undergone a change in conditions that may represent a malfunction. Such times may include for example, when the machine has been taken out of service for purposes of conducting maintenance or other activities that are intended to ensure that the machine is operating properly. Of course these are merely examples of when such a setup routine may be implemented.

In an exemplary embodiment at least one processor of the automated banking machine has associated programming that enables decoding the micr line data regardless of the facing position of the check as it is moved past the magnetic read heads. As can be appreciated depending on the facing position of the check the micr data may be moving in any of the forward direction or the backward direction and right side up or upside down as it passes in proximity to the one adjacent magnetic read head. Signals are generated by the magnetic read head responsive to the magnetic indicia which makes up the micr line data. The programming of the at least one processor is operative to receive and record these signals, and to determine the micr line characters that correspond thereto. In the exemplary embodiment this includes comparing the data for at least some of the characters that correspond to the micr line, to data corresponding to one or more micr line characters so that it can be determined the orientation in which the micr line data has been read. The at least one processor may operate in accordance with its programming to conduct pattern matching of the sensed signals to signals corresponding to known micr characters to determine the probable micr characters to which the signals correspond. This may be done for one or multiple characters to determine a probable orientation of the check data. This probable orientation may then be checked by comparing the data as read from the magnetic read head, to other data which corresponds to the micr data initially determined orientation. If the orientation corresponds to an appropriate micr line character then it probable that the orientation has been properly determined. If however the sensed data does not correspond appropriately to characters in the initially determined orientation, then it is probable that the orientation determined is incorrect. In some embodiments the at least one processor may operate to compare signals corresponding to the magnetic indicia read from the check to data corresponding to micr line characters in multiple possible orientations. The results may then be compared to determine the number of unidentifiable characters in each of the orientations. Generally in at least one orientation which corresponds to the actual orientation of the check, the at least one processor will determine that all of the characters correspond to identifiable micr line characters.

In still other embodiments character recognition analysis software routines may be operative to identify micr line characters in each of the possible orientations which a degree of confidence. This degree of confidence would hopefully be much higher for one particular orientation which then indicates the facing position of the check as well as the micr line characters to which the data corresponds. In still other alternative embodiments other approaches may be used to determine the facing position of the check. This may include for example analysis of optical features to determine that the check is in a particular orientation. The information on a facing position as determined from optical features may then be used to analyze or, as a factor in the analysis, of the magnetic indicia on the check as carried out by at least one processor.

Of course it should be understood that while the discussion of the exemplary embodiment has included a discussion of micr line data associated with a check, in other embodiments other types of magnetic indicia may be analyzed and used. Further it should be understood that checks and other items which include magnetic indicia thereon serve as coded records on which magnetic data is encoded. Alternative approaches may also be used in other embodiments for reading of magnetic recoded indicia on such records, and the magnetic read heads described in connection with this particular embodiment are exemplary. Further it should be understood that while the coded records in the form of checks have the micr line data offset from the center line of the record and generally in a defined location relative to one or more edges of the document, other embodiments may operate to have magnetic indicia in other locations. Further some exemplary embodiments may also include provisions for sensing magnetic indicia on records in various locations and determining the nature of such indicia in various locations based on signals produced from sensing the record. Of course these approaches are exemplary and in other embodiments other approaches may be used.

In the exemplary embodiment when the at least one processor executes the setup routine the at least one processor is operative to cause an initial value corresponding to radiation sensed by the magnetic sensing circuitry to be stored. This is represented by a step 812 in which the at least one processor operates to cause at least one value associated with at least one property of electromagnetic radiation value currently being sensed through operation of the magnetic sensing circuitry, to be recorded. In some embodiments this may be various types of values such as an instantaneous value, an average value over a period of time, a weighted value, an average value of radiation sensed by multiple reading heads or another one or more values that are sensed through operation of the magnetic sensing circuitry. These one or more initial values are captured at a time when the electromagnetic radiation source in the machine is in a condition in which it is not operating to generate radiation. The at least one processor operates to store in at least one data store the at least one value corresponding to the level of electromagnetic radiation sensed by the magnetic sensing circuitry in this condition. This is represented by step 814. These one or more initial values are stored in at least one data store through operation of the at least one processor executing suitable program steps that store such value.

After the initial one or more values is stored, the at least one processor is operative to cause the electromagnetic radiation source to operate. This is represented in a step 816. In the exemplary embodiment the electromagnetic radiation source includes an electric motor within the machine. This electric motor in some exemplary embodiments may be operative to drive a sheet transport in the machine. During the condition represented in step 816 the at least one processor is operative to cause the motor to operate at a time when no transactions are being performed and sheets are not moved as a consequence of the operation of the motor. Of course this approach is exemplary.

The at least one processor is operative during at least a portion of the time when the motor is caused to operate to sense through operation of the magnetic sensing circuitry, at least one level of radiation from the source that is sensed. This is represented in FIG. 70 by a step 818. The level of radiation sensed from the radiation source can correspond to an intensity of the radiation that is detected through operation of the magnetic read head which is part of the magnetic sensing circuitry. The amplification and signal conditioning elements of such circuitry in the exemplary embodiment are operative to enable the electromagnetic radiation generated by operation of the motor to be detected. This enables the electromagnetic radiation from the source to be used to verify the proper operation of the circuitry. As can be appreciated, the sensed radiation signals in other embodiments may be one of several different types and may include for example instantaneous values, averages over time, sample values, average values between multiple read heads, or other values that are useful in producing data that is representative of at least one level of at least one property of radiation that can be sensed through a magnetic read head and the associated circuitry from the electromagnetic radiation source.

The at least one processor is operative in a step 820 to store one or more values in a data store corresponding to the radiation sensed in step 818. In the exemplary embodiment these stored values correspond to the initial values of radiation that are sensed from the electromagnetic radiation source and serve as a baseline for determining changes that are indicative of a malfunction or other undesirable conditions.

In the exemplary embodiment once the initial values have been stored, the operation of the electromagnetic radiation source is stopped. This is represented in a step 822. Step 822 completes the initialization process in the exemplary embodiment. Of course in other embodiments other approaches may be used.

Figure 71:
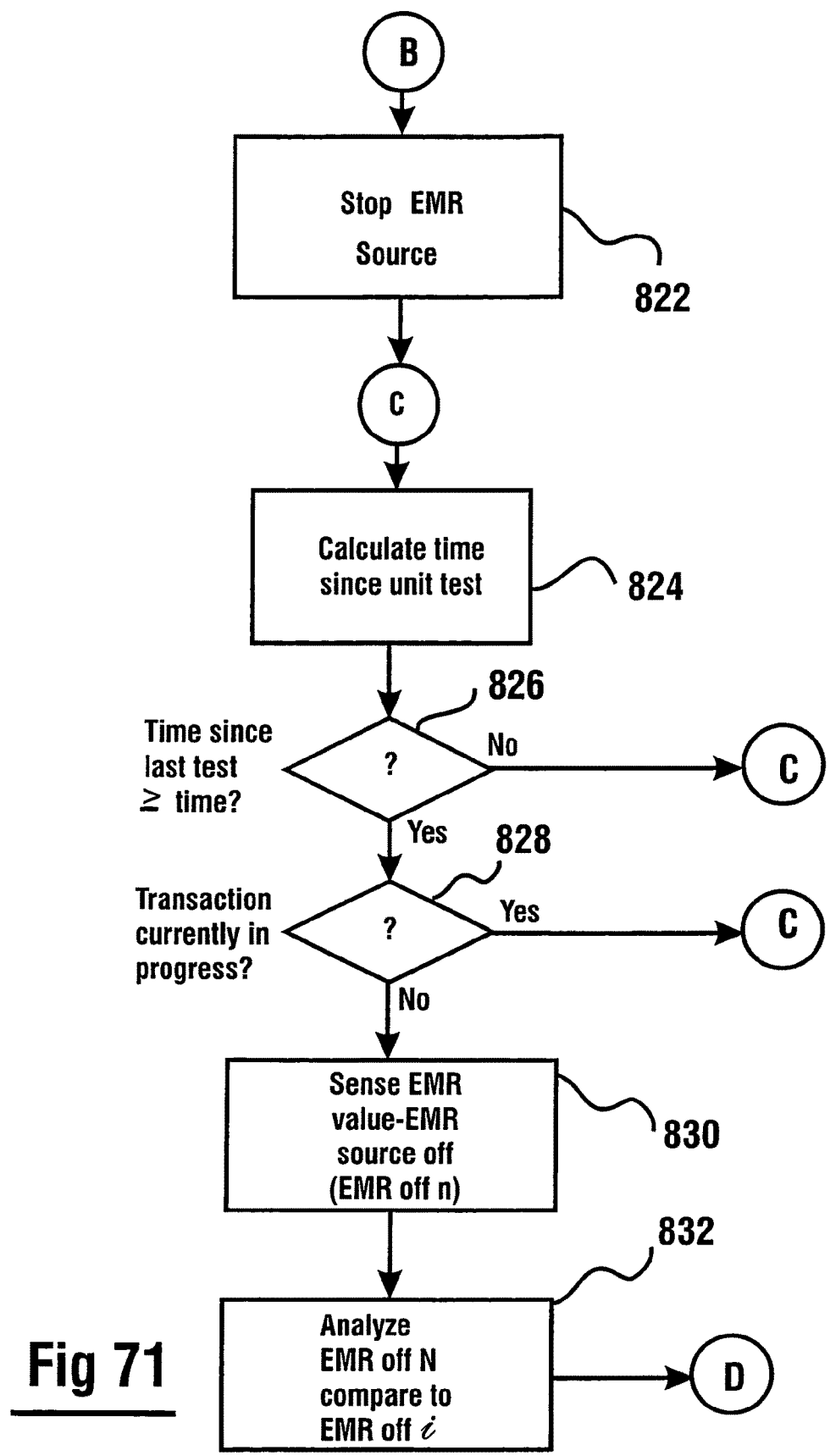

The at least one processor operates in accordance with the exemplary logic flow to periodically test the ability of the magnetic sensing circuitry to detect radiation emitted from the radiation source. If a change is detected which suggests a malfunction of the magnetic sensing circuitry or other adverse conditions, the at least one processor adjusts machine operation and/or provides at least one indication of a potential problem. In the exemplary embodiment the at least one processor executes a timing function to determine the period of time since the last test of the magnetic sensing circuitry. This is schematically represented in FIG. 71 by step 824. Step 825 in the logic flow corresponds to the process of determining if the time period since the last test has reached or exceeded a particular time limit. If the limit is not determined to have been reached in step 826, the machine continues to wait until an appropriate time. If however a set time period has been reached, the logic flow moves to a step 828.

In the exemplary embodiment it is desired to avoid attempting to sense the operation of the magnetic sensing circuitry during times that the machine is operating to carry out transactions. There are several reasons for this including that during transactions multiple sources of electromagnetic radiation may be operating within the machine. Further conducting testing during transactions is generally not possible as such testing may interfere with or delay processing the transaction. In step 828 the logic associated with the at least one processor determines if an ATM transaction is currently in progress on the machine. If so the machine will wait until such time as a transaction is not being conducted to execute the testing.

If however in step 828 it is determined that the ATM is currently not engaged in carrying out a transaction the processor logic moves to step 830. In step 830 the at least one processor is operative to determine the at least one level of radiation sensed by the magnetic sensing circuitry when the electromagnetic radiation source is in a condition in which it is not operating to produce radiation. In the exemplary embodiment this is a time when the particular motor which serves as the radiation source is not being operated. The at least one processor is operative to cause to be obtained from the radiation sensing circuitry, one or more values which correspond to radiation sensed during this condition. In step 832 the at least one processor is operative to compare the values obtained in step 830 with the reference values previously obtained in step 812. This comparison may include evaluating discrete values, the averages of such values, the median of such values or other single or multiple comparisons to analyze how the value or values currently sensed compare to those previously obtained when the electromagnetic radiation source is in the nonoperating condition.

Figure 72:
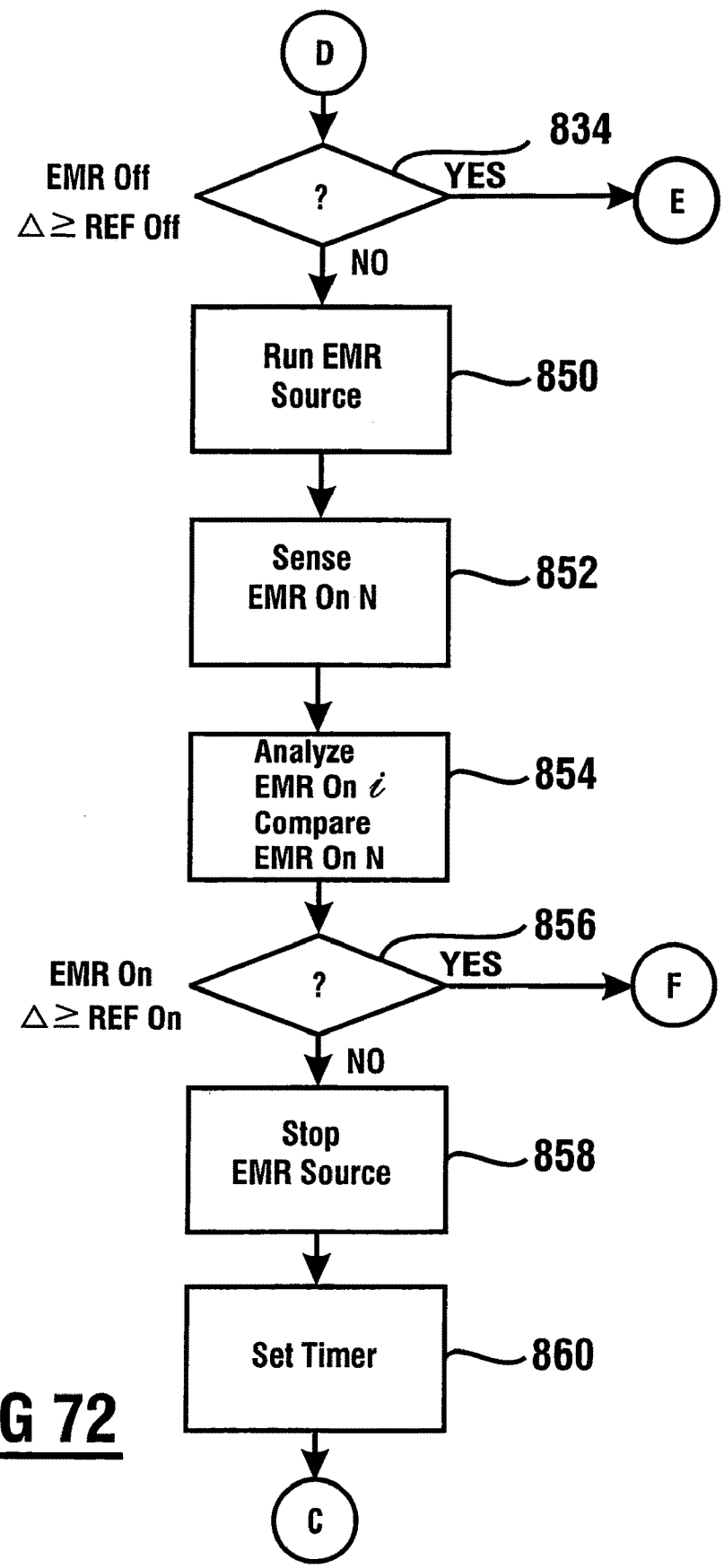
Figure 73:
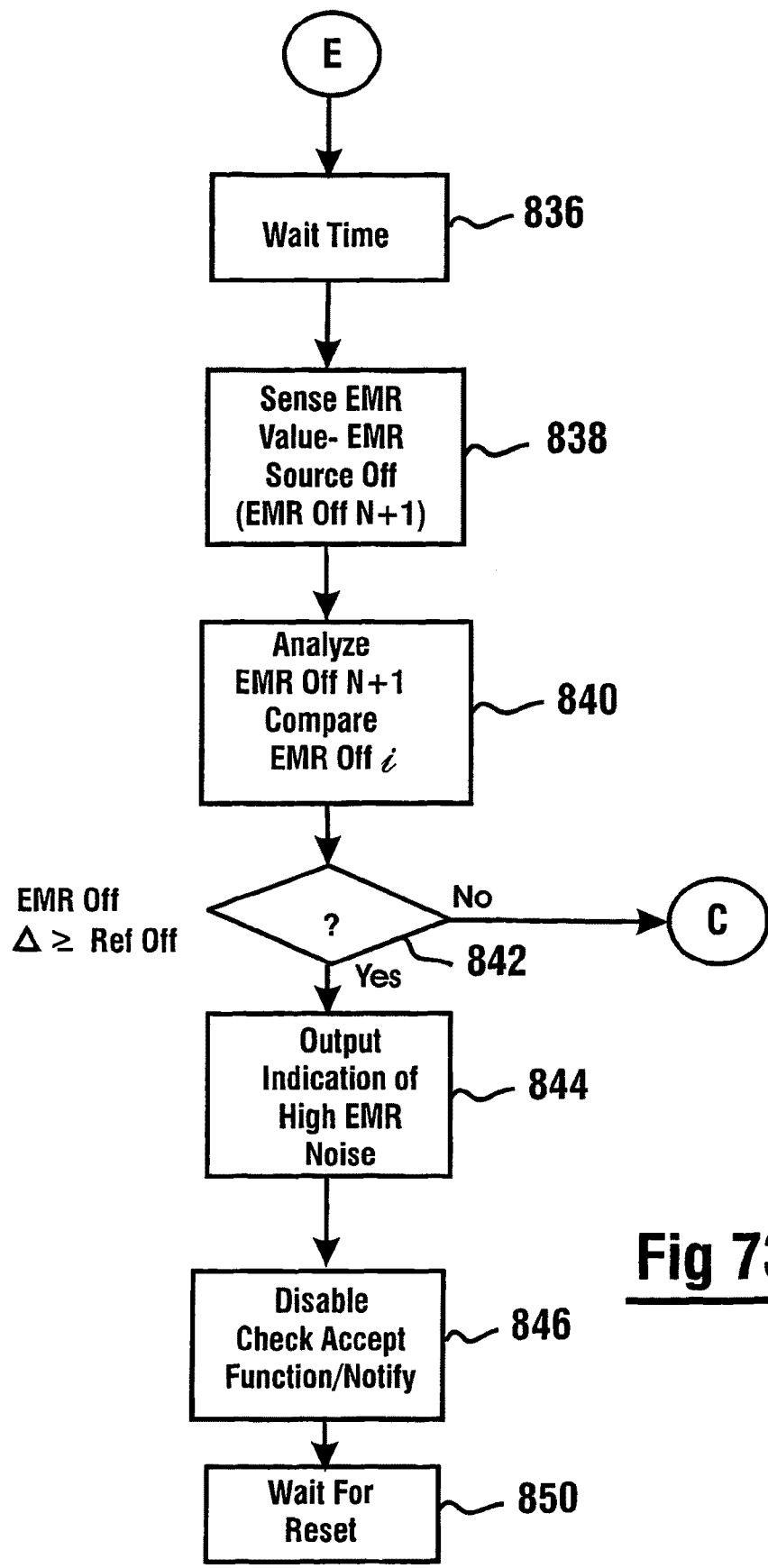

In the exemplary embodiment the at least one processor is operative to determine that the absolute value of the differences between the one or more values previously stored and the current values exceed a reference. In exemplary embodiments this may include a single preset reference or multiple references. In addition such references may also be adjusted based on various factors. This comparison of the stored values to the recently obtained values is represented in FIG. 72 by a step 834. If the difference between the currently obtained values and the reference values exceeds a threshold, the logic proceeds as indicated to execute the steps represented in FIG. 73. In these circumstances the at least one processor operates in accordance with its programmed instructions to wait for a preset time period as represented in a step 836. This is done to try to avoid giving an indication of a problem when the machine has been exposed to a transient radiation source which has caused an anomalous reading. Such a source may include for example an adjacent radio transmitter in a nearby vehicle, static generated by a vehicle or other machinery, or the operation of appliances or other devices which use electric motors. Such transient radiation sources will generally move away from the machine within a relatively short time period and the exemplary logic operates to allow such time for such sources to leave the vicinity of the machine.

As represented schematically by step 838, after the time period a further value from the magnetic sensing circuitry with the motor in the nonoperating position is captured through operation of the at least one processor. Again this may include single or multiple values of the type previously discussed. In step 840 the at least one processor is operative to cause an analysis of the one or more values sensed in step 838 with the initial values previously captured in step 812.

Step 842 represents logic executed by the processor in determining if the comparison of the recently sensed values and stored values has an absolute difference that exceeds one or more threshold values. Of course as previously discussed, this comparison may be of multiple values, single values, calculated weighted values or other comparisons. If in step 842 the difference does not exceed the one or more thresholds, the logic returns to step 824. If however the analysis indicates that there are differences between the originally sensed values and the current values which may correspond to a malfunction, the logic proceeds to a step 844. In step 844 the at least one processor is operative to resolve that the magnetic sensing circuitry is sensing a high radiation condition which is not appropriate to the current status of the machine. In step 846 the at least one processor is operative in accordance with its programming to execute steps that disable the machine from carrying out functions in which the magnetic sensing circuitry is required to operate. This may include for example adjusting the operation of the machine so that it no longer carries out transactions that involve imaging checks and/or reading magnetic indicia on documents. Alternatively in other embodiments the at least one processor may operate to cause the machine to cease carrying out user transactions. Of course these approaches are exemplary and will depend on the programming of the particular machine.

Further in the exemplary embodiment in step 846 the at least one processor is operative to cause at least one signal to be sent from the machine indicative of a potentially problematic condition. This may include for example, the machine communicating with at least one host computer or other remote computer to indicate the problem or malfunction. This may include for example, a computer that is operative to notify a third party servicer of the need to conduct a servicing activity to repair the machine. Thereafter in accordance with the exemplary logic the machine is operative in a step 850 to note the condition and to maintain its status data stored in memory until such time as the machine is reset. This may be done through service activities by a servicer at the machine. Alternatively in some embodiments this may be accomplished remotely by messages sent to the machine that operate to diagnose and/or correct conditions and to place the machine back in service. Of course these approaches are exemplary.

If however it is determined in step 834 that the current background radiation does not differ from the previously stored values by more than the one or more thresholds, the at least one processor causes the radiation source to operate. This is represented in a step 850. In an exemplary embodiment the radiation source includes a motor that operates to drive a sheet transport within the automated banking machine. This may be a sheet transport within the housing of the machine that operates during transactions to move sheets such as currency bills, checks, receipts or other items. In the exemplary embodiment because the radiation source is operated by the processor during a time period when no transaction is being conducted, the sheet transport does not cause movement of sheets. Of course this approach is exemplary and in other embodiments other types of radiation sources, transaction function devices or approaches may be used.

The at least one processor operates in conjunction with the magnetic sensing circuitry to determine one or more values that correspond to the radiation from the source that is detected through the magnetic read heads and magnetic sensing circuitry. This is represented by a step 852. Again such sensing may be on a continuous basis, periodic basis, average basis, time weighted basis or other basis for purposes capturing one or more values that are suitable for comparison to the previously stored one or more values that correspond to the radiation source in an operative condition. The at least one processor operates in the exemplary embodiment to analyze these values and compare them to the prior stored values. This is represented by a step 854.

The analysis in step 854 causes the processor to make a determination as to whether the comparison of the various values that have been previously stored and the currently sensed values, indicate a difference that exceeds one or more thresholds. Again the analysis carried out through operation of the at least one processor will depend on the type of values that are recorded and stored in the operation of the system. The at least one processor of the exemplary embodiment operates to determine if this analysis results in a difference between one or more currently sensed values and one or more previously stored values that exceeds one or more thresholds. This is represented by a step 856. If the comparison does not show a significant deviation between the sensed and the previously stored values, it is indicative in the exemplary embodiment that the magnetic read heads and the associated magnetic sensor circuitry are operating properly. In response to resolving this condition the at least one processor operates to stop the radiation source, changing its condition from the operative condition in which the motor runs to an inoperative condition in which the motor is off. This is represented by step 858.

The at least one processor then acts to reset the timing function so that the periodic check of the magnetic sensing circuitry is carried out again after a period of time. This is represented by a step 860. The logic then returns to carrying out the timing function until it is appropriate to carry out the next test. It should be understood, however, that although the passage of time is indicated as the basis for period testing in this exemplary embodiment, in other embodiments other measures for conducting testing may be used. This may include for example testing on the basis of the number of transactions conducted by the machine. Alternatively in some embodiments such testing may be conducted based on the number of checks or other sheets that have been sensed through operation of the magnetic sensing circuitry since the prior test. In still other embodiments other parameters may be used as the basis for conducting the testing.

Figure 74:
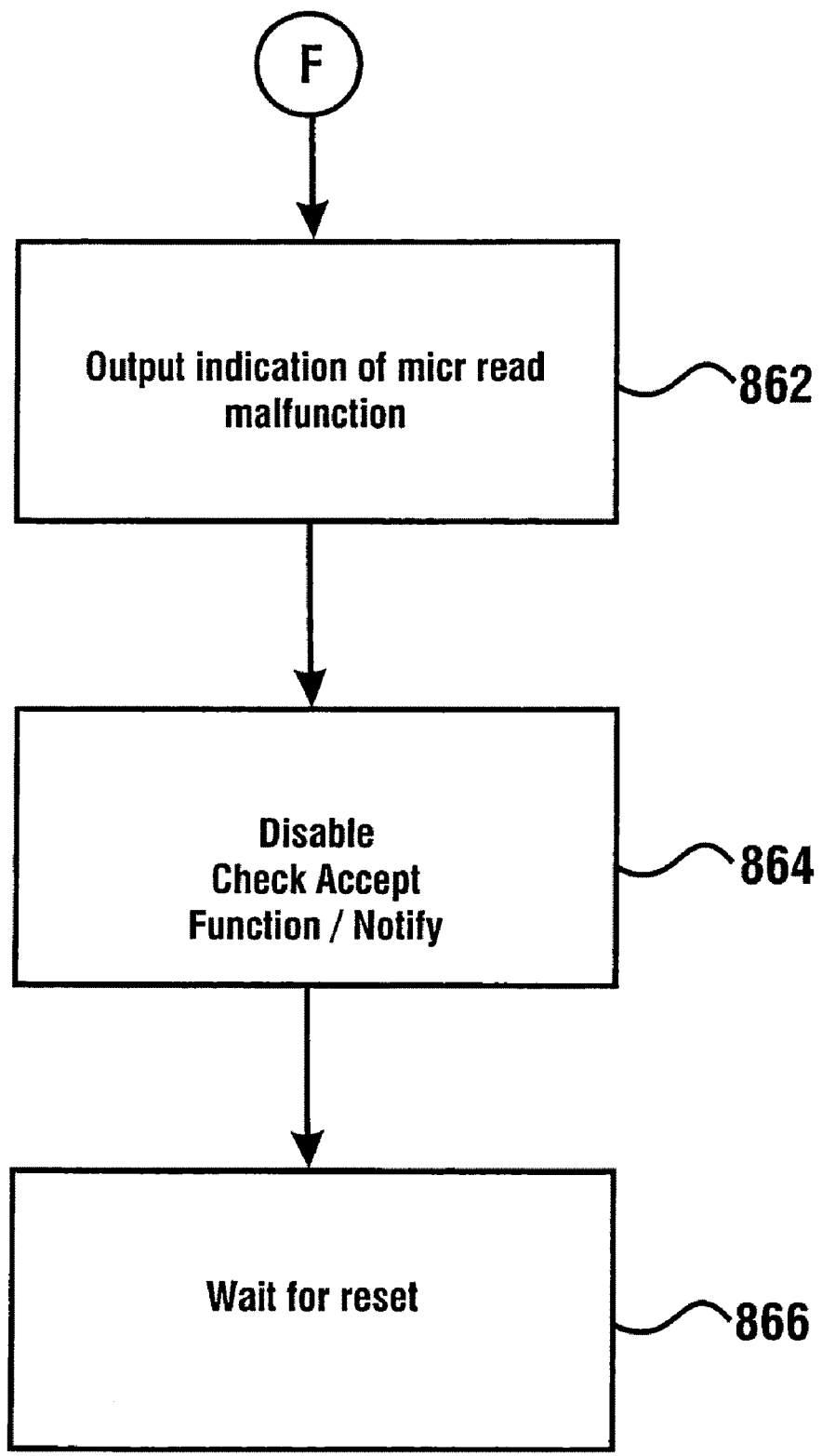

In the exemplary embodiment if it is determined in step 856 that there is a deviation in the currently sensed one or more values relative to the prior sensed values, then the at least one processor executes further instructions that are represented by a step 862 in FIG. 74. In this exemplary embodiment the at least one processor is operative to cause the output of at least one signal that indicates a malfunction of the magnetic sensing circuitry. The at least one processor is also operative in the exemplary embodiment to cause the functions that require the reading of magnetic indicia to be disabled. This may include for example, changing operation of the automated banking machine so that it no longer carries out transactions including the acceptance of checks or other documents including the magnetic indicia. In still other embodiments the at least one processor or may operate to disable further operation of the machine to carry out any transactions. Of course these approaches are exemplary.

Also in the exemplary logic flow the at least one processor is operative to cause the automated banking machine to send at least one message from the machine to a remote computer. The at least one message is operative to notify a remote servicer or other entity of the malfunction which has apparently occurred at the machine. This notification may for example cause a servicer to be dispatched to the machine. Alternatively or in addition the at least one processor may attempt to execute further diagnostic or corrective functions in order to identify and/or correct the problem. In the exemplary embodiment the at least one processor is operative to notify the at least one remote computer of a probable malfunction, maintains a waiting state in which the automated banking machine waits to be repaired either by a servicer at the machine or through signals sent remotely to the machine. This is represented in a step 866. Of course it should be understood that this logic flow is exemplary and in other embodiments other approaches may be used.

It should further be understood that various approaches may be taken in determining whether the electromagnetic radiation sensed from the source is varied in ways that necessitate some remedial action at the automated banking machine. For example in some exemplary embodiments the magnetic sensing circuitry associated with each read head may provide an output indicative of the radiation level sensed from the electromagnetic radiation emitting device. This output may be averaged over a set period of time and this average value can then be compared to a stored value. In still other exemplary embodiments such sensing may involve review of maximum levels of radiation, minimum levels of radiation, median values or numerous additional values that are then compared to one or more stored values. In still other exemplary embodiments selective sensing at different the frequencies may be conducted and/or compared. Such analysis may also be done for each read head and associated circuitry individually. Alternatively the analysis may be conducted for signals that result from a combination or comparison of what is sensed by each read head and the associated circuitry. Alternatively or in addition the at least one processor may be operative to cause the operation of multiple electromagnetic radiation sources within the machine. The parameters associated with the radiation sensed from each of these sources operating individually and/or the combined effect of both operating simultaneously may be analyzed and compared. Alternatively or in addition, the at least one processor may execute instructions that are operative to account for background radiation. Thus for example, the level of radiation sensed when the radiation emitting device(s) in the machine are not operating may be accounted for in the calculation for purposes of determining whether the magnetic sensing circuitry is operating properly. Of course these approaches are exemplary.

It should further be understood that the computer executable instructions carried out by the processor in conducting the analysis may be stored in various forms of media that can be accessed and from which the instructions can be executed by the at least one processor. These may include for example, firmware memory, magnetic memory, flash memory or memory stored on another form of article in operative connection with the at least one processor. Of course these approaches are exemplary.

The operation of an exemplary embodiment is now explained with reference to FIGS. 46 through 67. The exemplary automated banking machine is operated by a customer to perform at least one transaction involving acceptance of sheets. This may include for example, the user providing inputs to identify themself or their account, as well as to indicate a transaction that they wish to conduct through operation of the machine. This may be done in response to instructions output through the display. The user indicates that they wish to conduct a sheet accepting transaction. The sheet accepting transaction may include in some embodiments, acceptance of checks, and other embodiments the sheets to be accepted may include notes. In still other embodiments the sheets to be accepted may include mixed notes from checks. In still other embodiments other types of sheets or items may be accepted depending on the capabilities of the machine.

Figure 46:
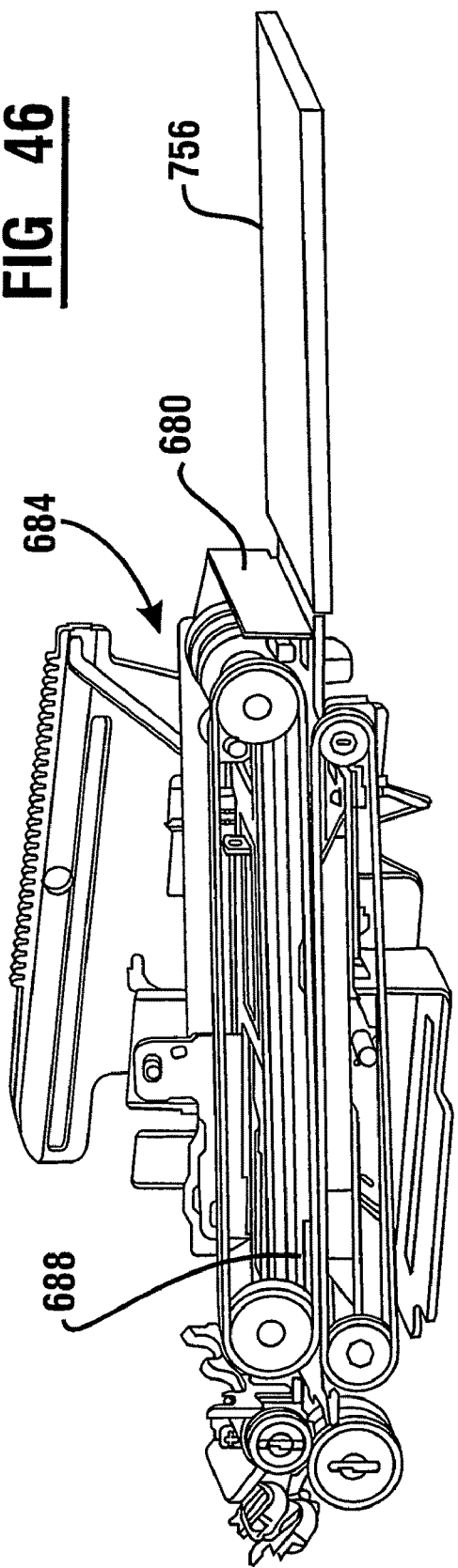
FIGS. 46 and 47 are schematic views of an exemplary sheet access area in a position prior to accepting a stack of sheets.
Figure 47:
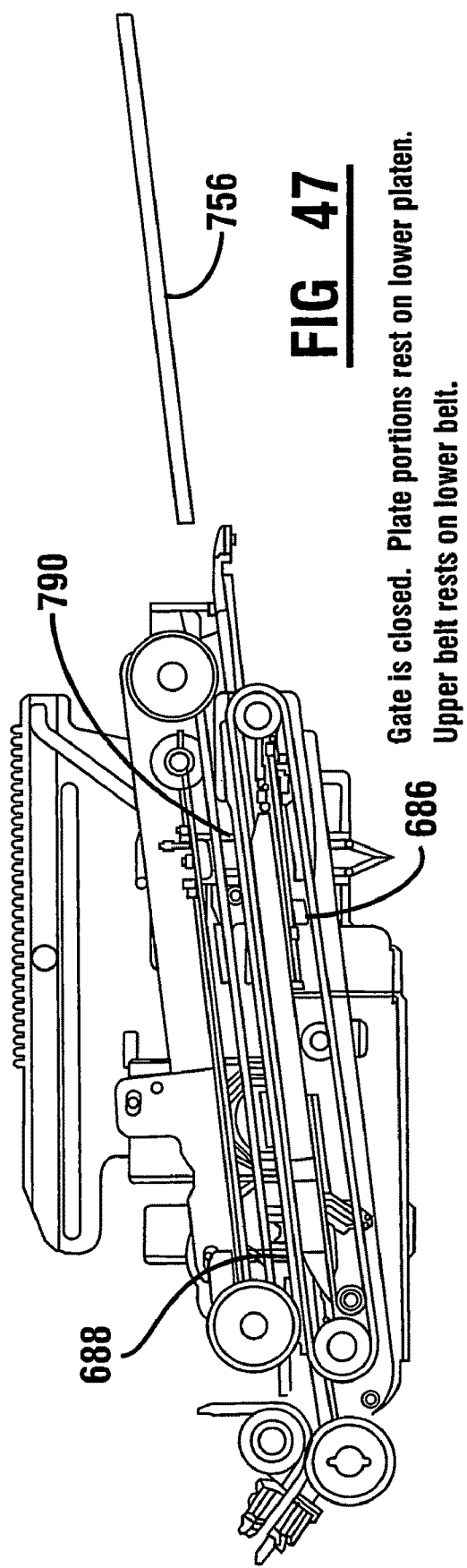

With reference to FIG. 46, in the conduct of an exemplary transaction the sheet access area 684 initially has external access thereto blocked by the gate 680. The user prepares a stack 756 comprising a plurality of sheets for receipt by the machine through the sheet opening 678. It should be noted that in the initial position the divider plate 690 and the belt flight 688 are disposed downward and are in generally supporting connection with the belt flight 686. Of course it should be appreciated that as shown in FIGS. 46 through 67, the structures in the sheet acceptance area are shown in a sectional view taken through the middle of the sheet acceptance area.

Figure 48:
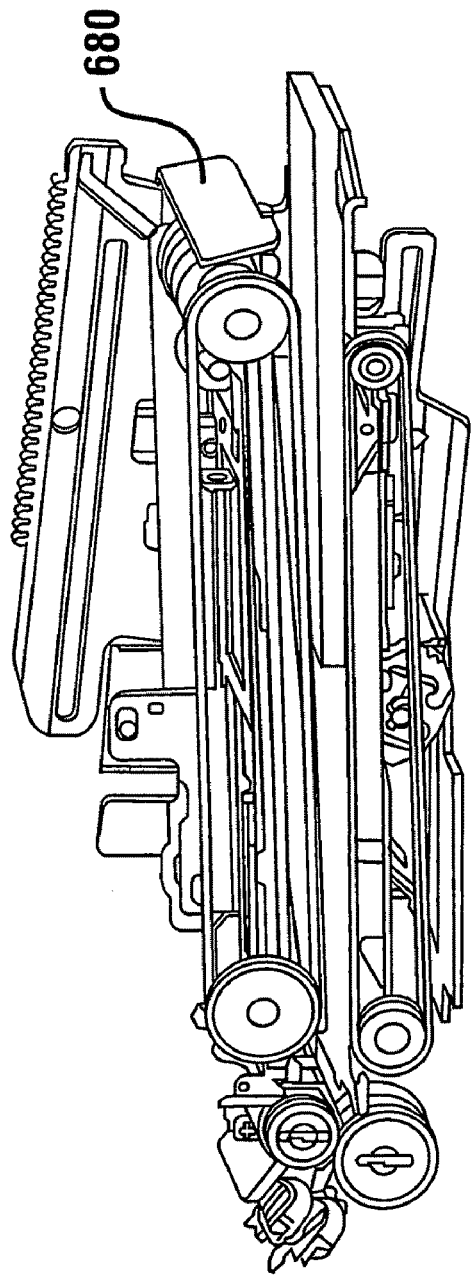
FIGS. 48 and 49 are views of the sheet access area receiving the stack of sheets.
Figure 49:
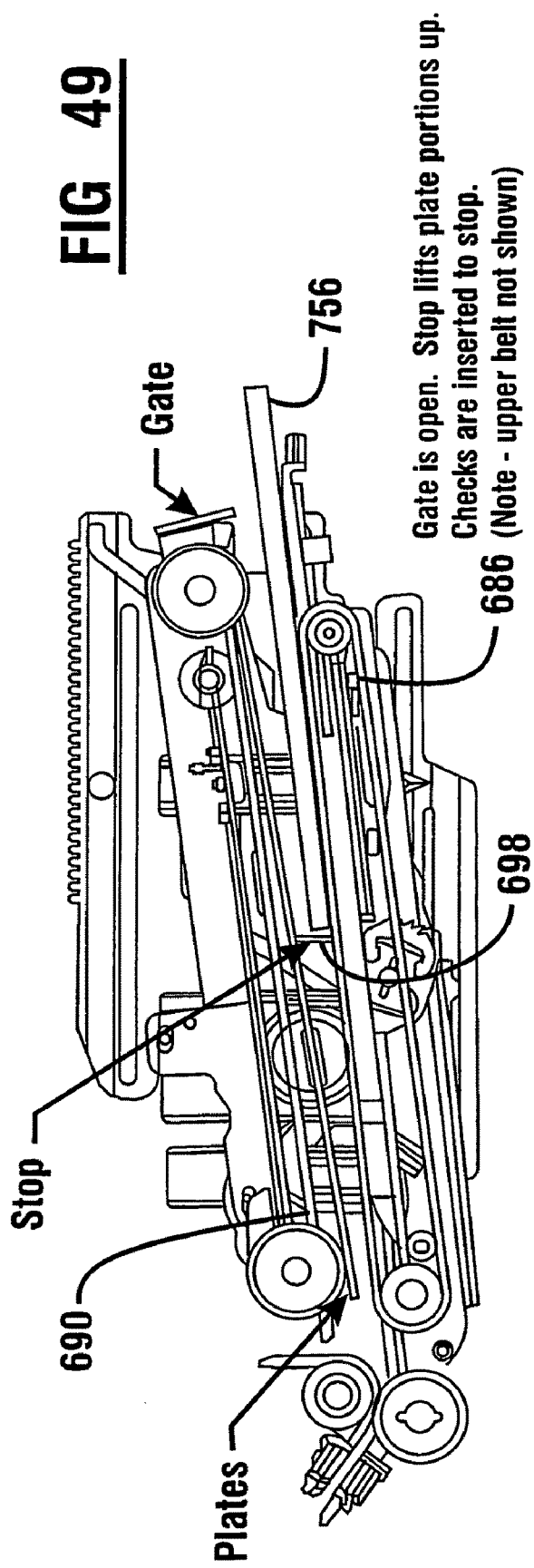

Responsive to the at least one processor in the machine operating to cause the machine to carry out a sheet accepting transaction, the at least one processor is operative to cause the gate 680 to open as shown in FIG. 48. The at least one processor is also operative to cause the stop 698 to move to a raised position. The processor is also operative to cause the divider plate and upper transport including the upper sheet driver member, to be disposed a greater distance away from the belt flight 686. This enables the user to insert the stack 756 inwardly into the area between the belt flight 768 and the divider plate 690, until the stack is in abutting relation with the stop. As shown in FIGS. 50 and 51 the at least one processor is thereafter operative to retract the stop 698 and to cause the belt flight 688 and divider plate 690 to be lowered. This provides for the stack 756 to be in sandwiched relation between the belt flight 686, belt flight 688 and divider plate 690. It should be remembered that the exemplary divider plate includes a pair of horizontally disposed plate portions including the central opening that extends parallel to each belt flight belt. This enables each of the belt flights to operatively engage the sheets in the stack. The divider plate is also movably mounted relative to the housing such that each divider plate portion can be moved vertically, responsive to at least one drive, and can also move angularly to maintain engagement with sheets. In the exemplary embodiment each of the portions of the divider plate are enabled to pivot generally about a horizontal axis that extends near the transverse center thereof. In the exemplary embodiment the extent that each portion of the divider plate is enabled to pivot is generally limited to a relatively small angle. This ability of the divider plate to pivot as well as to move vertically generally in the area of the axis about which the portion can pivot, facilitates the exemplary embodiment's capabilities to deliver and receive sheets from users as well as to deliver and receive sheets to and from the opening of the deposit accepting device.

Figure 52:
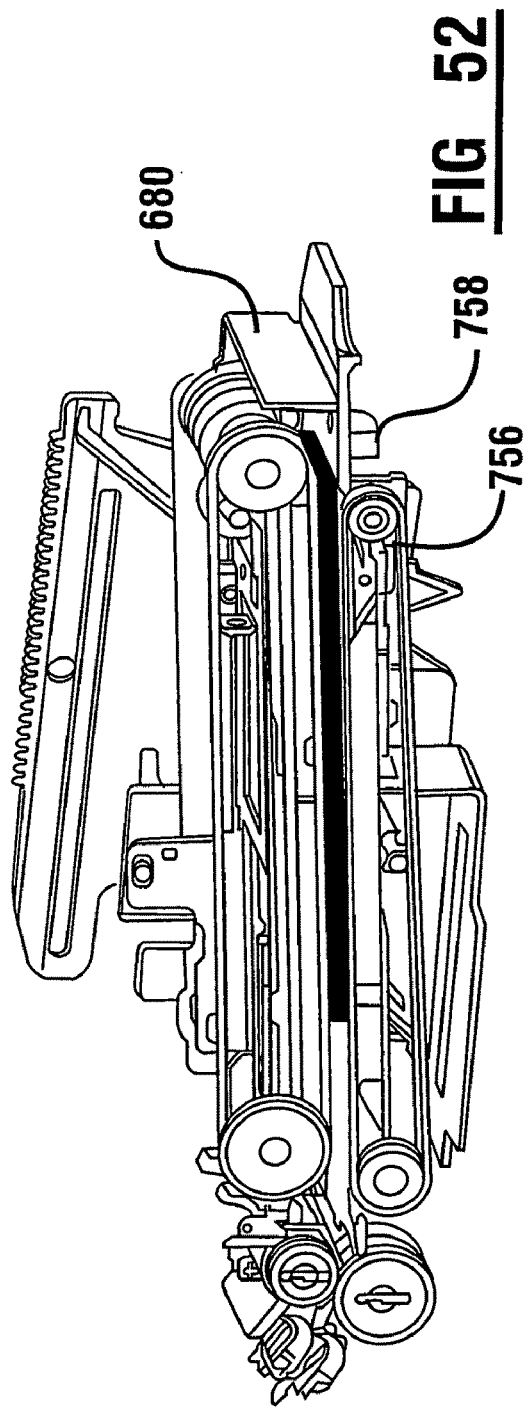
FIGS. 52 and 53 show the sheet access area after the stack of sheets is accepted therein and a gate mechanism is closed.
Figure 53:
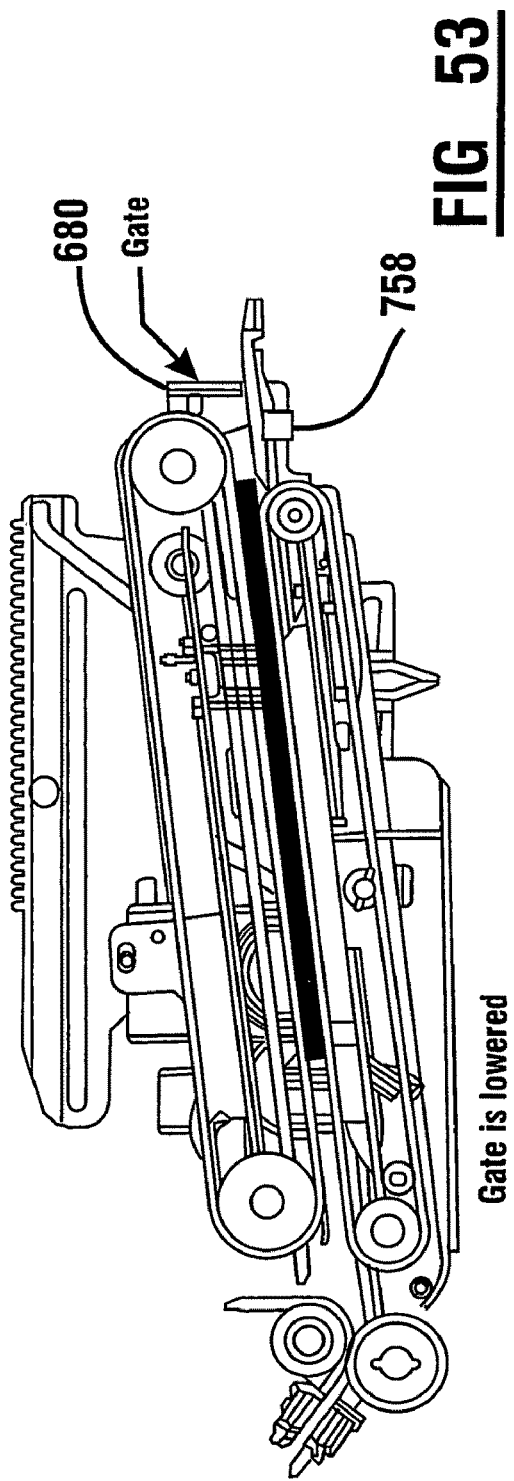
Figure 54:
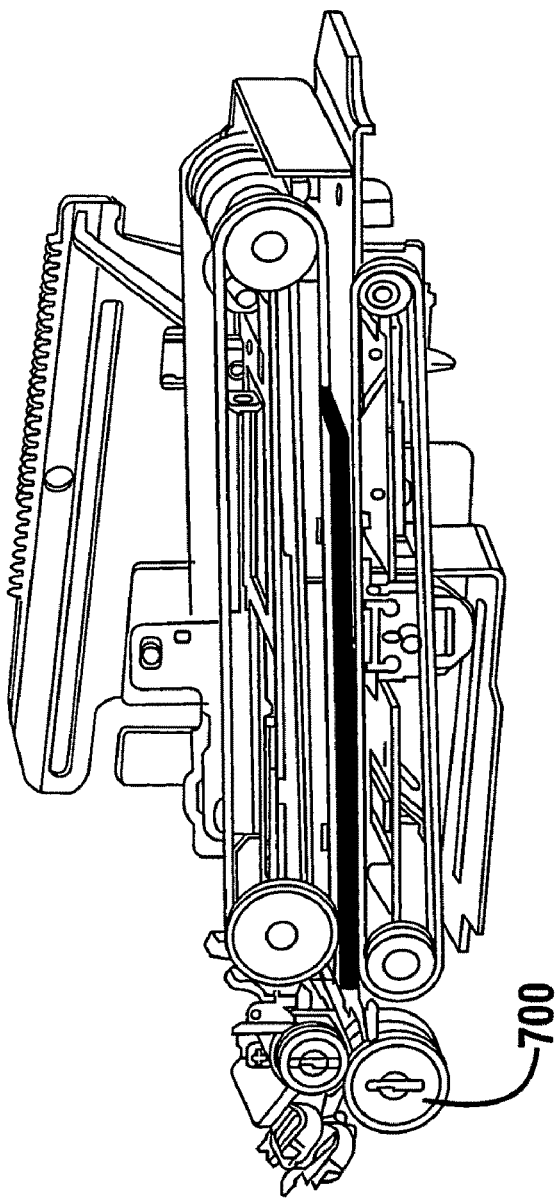
FIGS. 54 and 55 show the stack of documents while the stack is moving into a position adjacent the picker.

The at least one processor causes at least one drive to move the belt flights so that the stack 756 moves inwardly from the sheet access area such that the ends of the sheet move inwardly past the gate 680. As shown in FIGS. 54 and 53 sensors 758 are positioned to sense the stack in the sheet access area. Responsive to the end of the stack having moved inward between the belt flights, the at least one processor is operative to cause the gate 680 to close as shown in FIGS. 52 and 53. The closing of the gate prevents persons who have deposited a stack of sheets from further accessing such sheets after they have moved in the machine.

Figure 55:
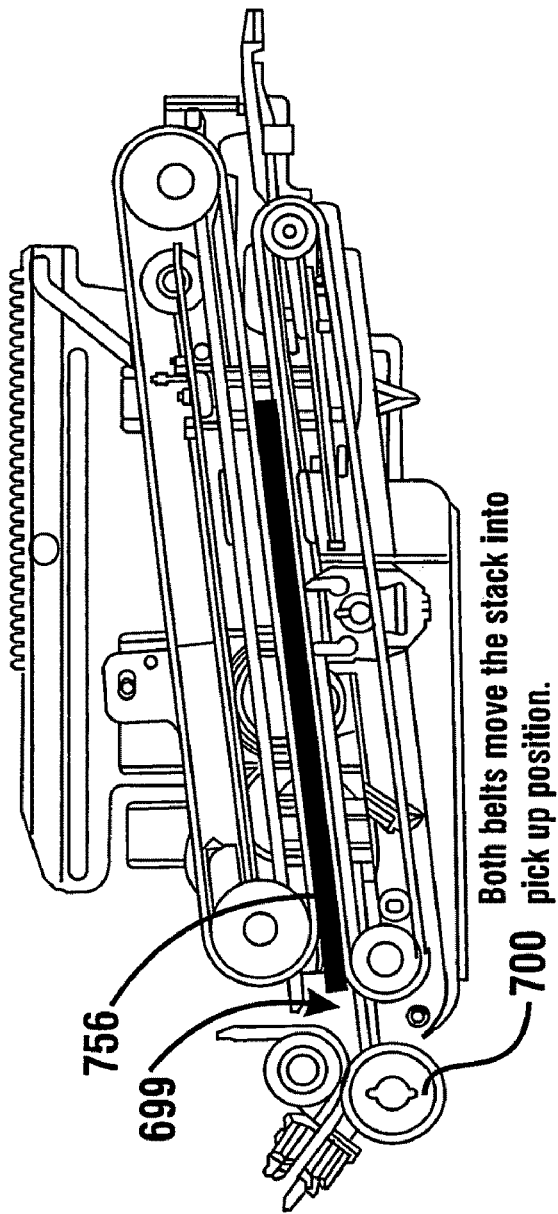

As represented in FIGS. 54 and 55 the sheets are moved inwardly through operation of the belt flights so that the sheets move in the opening 699 past the inward end of the divider plate and into contact with the picker 700.

As shown in FIGS. 56 and 57 the processor then operates to cause the upper belt flight 688 to move upwardly and away from the lower belt flight 686. The divider plate 690 remains disposed above and in contact with the stack 756. In this position the leading edge of the stack extends inward in the machine beyond the inward edge of the divider plate and the stack moves adjacent to the picker 700. The picker then operates generally in the manner of the incorporated disclosures to pick sheets one at a time to separate them from the stack.

In the exemplary embodiment the divider plate acts to hold the stack positioned against the driver member 686 and adjacent a registration plate portion 687 to facilitate reliable picking of sheets by the picker. During picking, a thumper member 764 also acts on the bottom sheet in the stack to urge the bottom sheet to move toward the picker. The thumper member 764 moves rotationally responsive to a drive and also provides an upward and inward directed force on the bottom sheet. The downward force applied on the top of the stack by the divider plate increases the effective force applied by the thumper member urging the sheet at the bottom of the stack to move toward the picker. Of course this approach is exemplary and in other embodiments other approaches may be used.

In the operation of the exemplary embodiment the deposit accepting device operates in accordance with the programming of the at least one processor, to move the sheets into the document alignment area 708. Each picked sheet is aligned in the manner discussed, and moved in the sheet path past the analysis devices such as the magnetic read heads 714, 716; imager 718; currency validator 720; and/or other sheet analysis devices. Of course it should be understood that in some embodiments other or different sheet analysis devices may be present. For example in a device which only accepts checks, a currency validator and associated sensors may not be present. Likewise depending on the nature of the sheets being accepted, other or additional analysis devices may be included.

In the exemplary embodiment sheets that have been moved past the analysis devices are moved in the transport 712 and are directed through operation of the diverter 724 for storage in the sheet storage and retrieval device 722. In the exemplary embodiment the at least one processor is operative responsive to the signals regarding each sheet from the analysis devices to analyze each sheet for at least one characteristic or property. These may include image properties, magnetic properties, color properties, patterns, watermarks, data or other characteristics that are usable to identify a sheet as an acceptable sheet for acceptance by the machine.

In some embodiments for example, the at least one processor of the machine may operate responsive to data received from the analysis devices to determine that sheets input to the machine include valid currency notes of a given denomination or type. The at least one processor may operate responsive to determining that such valid currency notes have been input to cause the automated banking machine to operate to cause an account associated with the user whose card data was read by a machine to be credited for an amount corresponding to such valid notes. This may be done by the at least one processor causing the automated banking machine to communicate with one or more remote computers that have data stores which include data corresponding to a user's account and the funds allocated thereto. In still other embodiments the at least one processor may operate in the case of received documents which are checks, to determine whether such checks appear to be valid and a user is authorized to be given credit for such checks. This may include for example analyzing the checks in accordance with the incorporated disclosure of U.S. Pat. No. 7,284,695 for example. The automated banking machine may operate using data read from the checks such as the micr line data, image data and/or other data, to cause the automated banking machine to determine that the user of the machine is to be provided value for one or more checks received by the machine. Of course the at least one processor may operate in other embodiments to analyze data read by analysis devices from other types of items which have been received by the machine and make determinations as to whether such items are acceptable and/or whether a user is to be provided with credit therefor.

Further, in some embodiments it should be understood that the at least one processor may also operate to identify certain items as unacceptable to the machine. These may include for example items which cannot be identified as valid currency notes, checks or other items that the machine is programmed to accept. The at least one processor in the machine may operate in accordance with its programming and/or data received by communication with remote computers to determine that the items the user has input cannot be accepted by the machine. Of course these approaches are exemplary.

In an exemplary embodiment after sheets have been received in the machine the at least one processor is then operative to cause the sheet storage and retrieval device 722 to deliver the sheets one by one to the transport 712. The transport operates to move each of the sheets toward the sheet access area. The diverter 724 is operative to direct the sheets as appropriate toward the sheet access area. As each of the sheets move in the transport 712, the diverter 728 is operative to selectively direct sheets that have been determined to include the at least one property associated with acceptable sheets, to the sheet storage and retrieval device 726. Device 726 is operative to store acceptable sheets while the unacceptable sheets continue in the sheet path toward the sheet access area. In the transport 706 sheets are engaged by the diverter 730 and are directed through the opening 699 onto the second side 794 of the sheet access area. The rejected sheets which are positioned on the second side of the divider plate 690 can be delivered to the machine user in a manner later discussed.

In operation of the exemplary embodiment, the at least one processor is then operative to cause the sheet storage and retrieval device 726 to deliver the acceptable sheets therefrom. The transport 712 is operative to move each sheet to an appropriate storage area in the machine. For example sheets which are checks may be stored in the storage device 660. Sheets which are notes may be stored in connection with the sheet recycler device 658 or in another suitable sheet storage area. It should be understood that a plurality of different types of sheet storage areas may be included in the machine for storage of one or more types of sheets.

Although in the exemplary embodiment sheets received in the machine are aligned with the sheet path before being analyzed and stored on the sheet storage and retrieval device 722, there is a risk that sheets may be come misaligned as they are attempted to be moved out of the machine and through the opening 699 to the user. The exemplary embodiment includes features operative to minimize the risk of sheets becoming jammed or otherwise rendering the deposit accepting device inoperative because of such misalignment. The exemplary embodiment includes sheet sensors 735 and 737 as schematically represented in FIG. 43. The sheet sensors 735 and 737 are disposed in a first direction inwardly relative to the opening 699 through which sheets pass in and out of the machine. Each of the sensors 735 and 737 are disposed transversely relative to the area where sheets normally move in the sheet path. Each of these sensors is also in operative connection with at least one processor through appropriate interfaces.

If during operation of the machine, when sheets are being returned to the sheet access area, a sheet is sensed by one of the sensors, it is an indication to the at least one processor that a sheet is substantially out of alignment with the opening 699 and may present a problem if it is continued to be moved toward the sheet access area. In the exemplary embodiment responsive to the sensing of the sheet by either sensor 735 or 737, the at least one processor is operative to cause the transport to stop the movement of the sheet in the outward direction toward the opening. The at least one processor then operates to cause the transport to move the sheet into the sheet alignment area. This is done by moving the sheet inward into the machine from the area of the sensor 735 or 737 which sensed the sheet. The at least one processor then causes the devices in the sheet alignment area to engage the sheet and align it with the transport path. This is done in a manner like that previously described by moving the sheet transversely such that an edge of the sheet is aligned with the virtual wall formed by sensors 734. Once the sheet is aligned the at least one processor then causes the sheet to be reengaged with the transport which attempts to move the sheet outward through the opening 699 and into the sheet access area. In the exemplary embodiment the fact that the sheet has been aligned and is in a proper orientation is determined responsive to the fact that the sheet is not sensed by either of sensors 735 or 737. Of course it should be understood that this approach is exemplary and in other embodiments other approaches may be used. This may include for example having a plurality of sensors spaced transversely or in other locations in the sheet path which can be used to determine the location and/or orientation of the document.

Further in the exemplary embodiment if an attempt is made to align a sheet with the sheet path so it can be returned through the opening, and despite this effort the sheet is again sensed as out of alignment, the at least one processor will operate in accordance with its programming to make a further attempt to align the sheet with the sheet path. This second attempt in the exemplary embodiment again involves engaging the sheet with the transverse transports and aligning it with the sheet path. If after this second attempt when the machine operates to try to return the sheet to the sheet access area and there is again sensed an indication that the sheet is misaligned, the at least one processor will thereafter operate in accordance with its programming to cause at least one message to be sent from the automated banking machine to a remote computer to indicate that there is a probable jam and malfunction of the deposit accepting device. Alternatively or in addition in some embodiments the at least one processor may operate to take other remedial actions. These may include for example attempting to realign the sheet additional times. Alternatively or in addition the at least one processor may operate to again accept the sheet into a storage device in the machine, or the at least one processor may cause the sheet to move the sheet in the transport to a location in the machine for such sheets that cannot be processed. Of course these approaches are exemplary and in other embodiments other approaches may be used.

Figure 66:
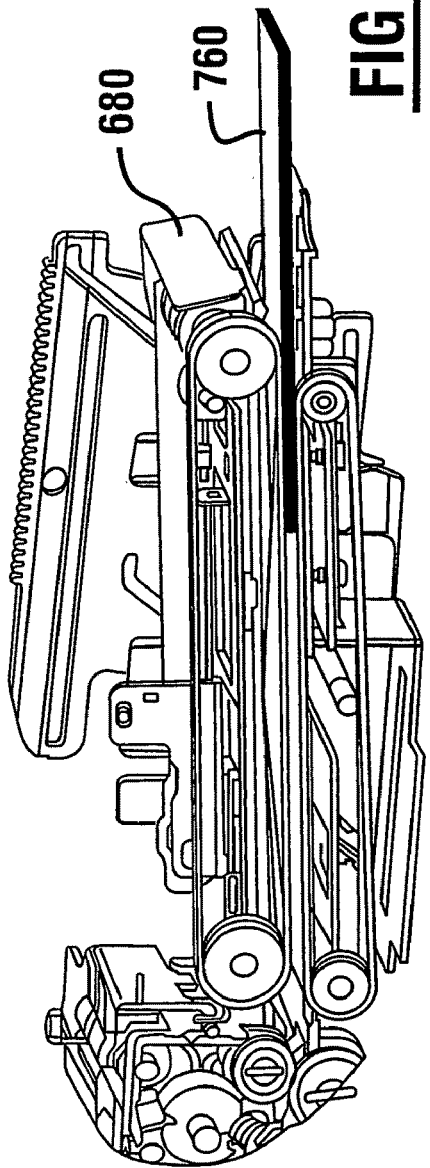
FIGS. 66 and 67 show the sheet access area operating to deliver a stack of sheets to a user such as a stack of rejected checks.
Figure 67:
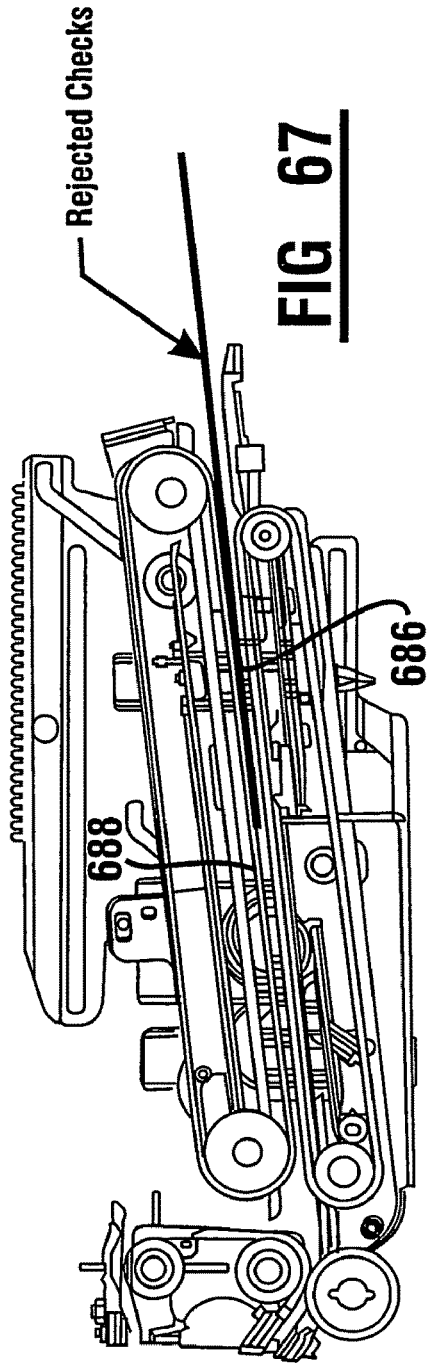

Rejected sheets that have been moved to the second side of the divider plate are returned to the banking machine user in a manner shown in FIGS. 66 and 67. The rejected sheets 760 are held in a stack on the upper side of the divider plate. The at least one processor is operative to cause belt flight 688 and divider plate 690 to move downward such that the rejected sheets are in sandwiched relation between belt flight 688 and belt flight 686. The at least one processor is then operative to open the gate 680. The processor operates to cause at least one drive to move the belts so as to extend the sheets in the stack 670 outward through the opening in the housing of the machine.

It should be understood that in exemplary embodiments the rejected sheets may be returned to the user while the accepted sheets are being moved to other storage locations in the machine. Alternatively in some embodiments the user may be given the option by the banking machine to have all of the sheets that they have deposited, returned. This may be accomplished in the exemplary embodiment by the sheets in the sheet storage and retrieval device 726 being moved through the sheet path to the sheet access area. Alternatively or in addition, in some embodiments the user may be offered the opportunity to retry the unacceptable sheets. In still other embodiments the machine may operate to hold in storage unacceptable sheets which the at least one processor has determined may be associated with the user attempting to perpetrate a fraud. Of course these approaches are exemplary and in other embodiments other approaches may be used.

Figure 58:
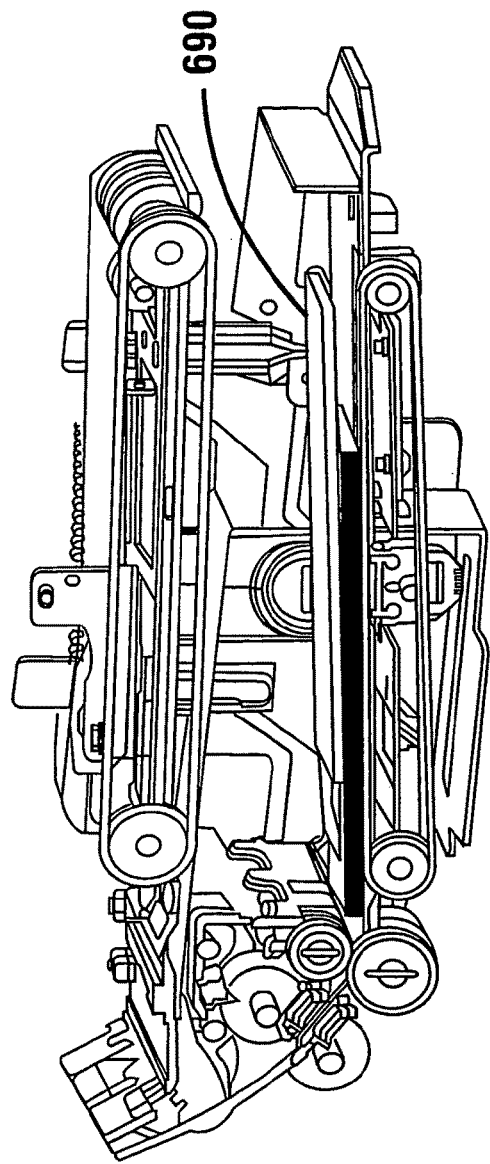
FIGS. 58 and 59 show the sheet access area receiving a rejected sheet while still holding some sheets from the original input stack.
Figure 59:
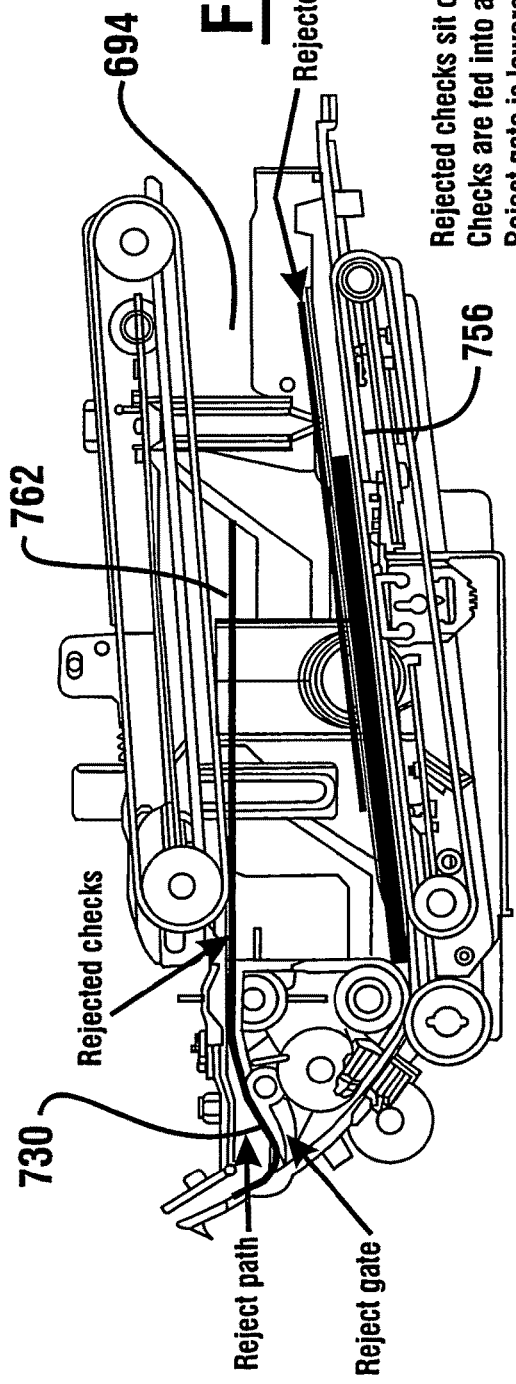

In still other alternative embodiments sheets may be determined as unacceptable relatively quickly, and may be identified as sheets that should be returned to a user before all of the sheets in the stack input by the user to the sheet access area have been picked. Alternatively or in addition a user may provide one or more inputs indicating that they wish to abort a transaction prior to all of the sheets in the input stack being picked. These situations may be associated with the configurations of the exemplary deposit accepting device shown in FIGS. 58 and 59. For example a rejected sheet 762 may be returned to the sheet access area prior to all the sheets from the sheet stack having been picked. This may be the result of the rejected sheet 762, having been analyzed and determined to be unacceptable. Alternatively in some embodiments the rejected sheet may be the result of the user indicating that they wish to abort the transaction. As shown in FIGS. 58 and 59, such a rejected sheet is diverted through operation of the diverter 730 into the second side 694 such that the sheet is supported on the upper side of the divider plate 690.

Figure 60:
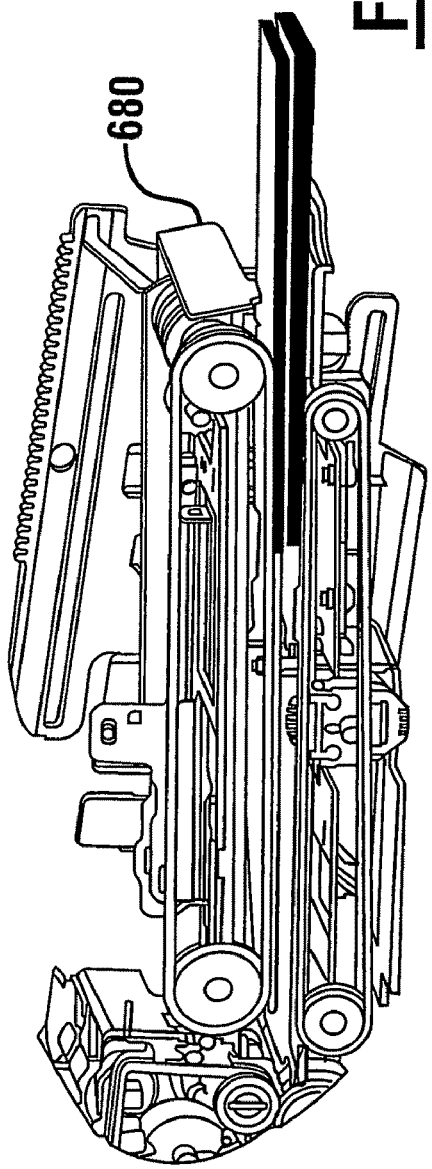
FIGS. 60 and 61 show the sheet driver members operating to move sheets out of the sheet access area in which the sheets are positioned on both sides of the divider plate.
Figure 61:
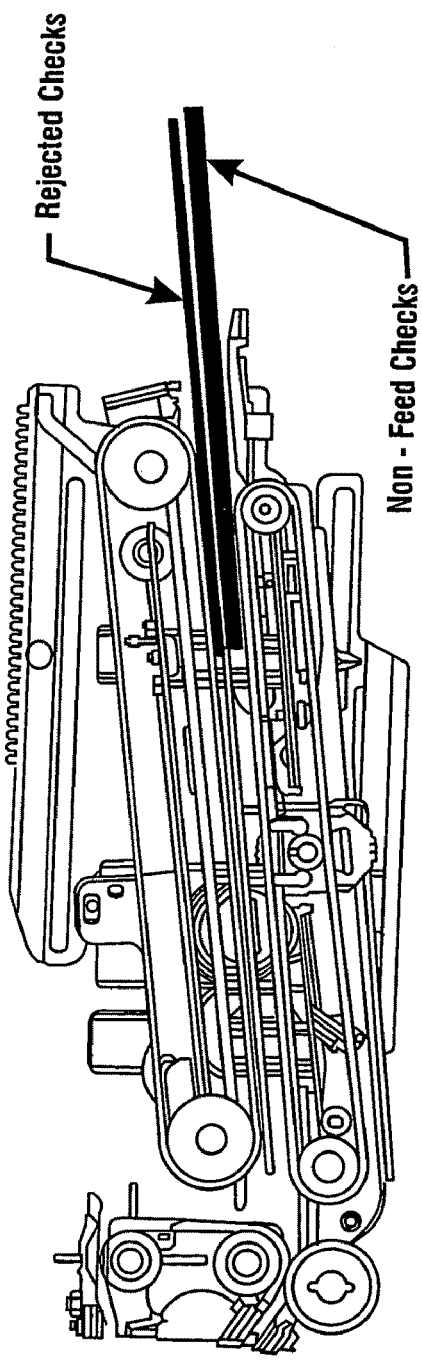

The return of sheets to the banking machine user is represented in FIGS. 60 and 61. The at least one processor is operative to cause the divider plate 690 and belt flight 688 to move downward such that the sheets which are on each side of the divider plate are in sandwiched relation between the belt flights 686 and 688. The at least one processor is operative to open the gate 680 and to move the belt flights as shown such that the sheets on each side of the divider plate are moved outward through the opening 678 in the housing. The user may then take the sheets from the machine.

Figure 62:
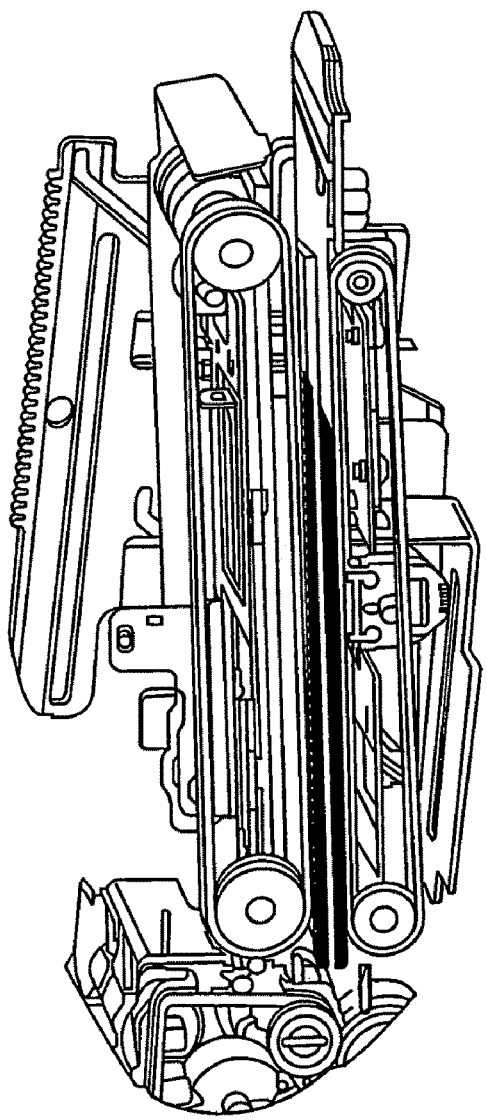
FIGS. 62 and 63 show sheets on each side of the divider plate that have been presented to the customer in a position being returned into the machine, which may be done for example in response to the machine user not taking the sheets.
Figure 63:
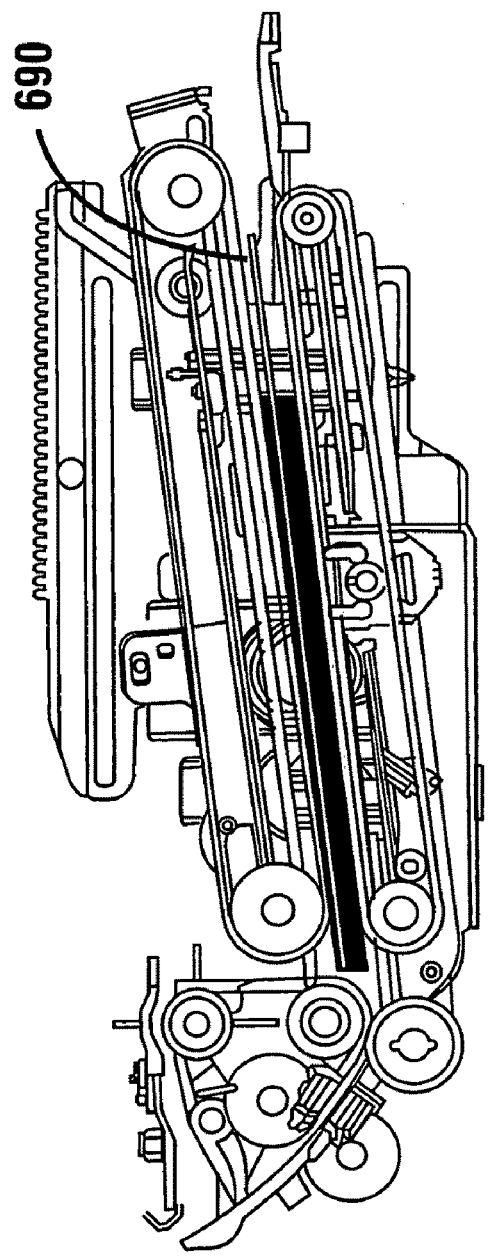

FIGS. 62 through 65 represent an exemplary operation that can be carried out by the machine if the user does not take the checks or other sheets that have been presented to the user by the machine. As shown in FIG. 62 the sheets which are positioned on both sides of the diverter plate 690 are moved through operation of the belt flights toward the picker. Upon the stacks of sheets reaching the picker, the gate 680 is closed. The picker 700 is then operated to pick the sheets. The sheets are picked from the area 692 below the diverter plate and then from the side 694 above the diverter plate. This is achieved because in the area adjacent the picker, the sheets regardless of whether they are above or below the diverter plate generally form a continuous sheet stack which enables all the sheets to be picked regardless of whether they are above or below the divider plate.

In the exemplary embodiment the at least one processor is operative to cause the retracted sheets to be stored in a suitable area of the machine. The machine is further operative to record the fact that the user did not take the presented sheets. This enables the sheets to eventually be traced to and/or returned to the particular user. Of course this approach is exemplary and in other embodiments other approaches to operation of the machine may be used. It should be understood however that in this exemplary embodiment the machine operates to clear the sheet access area so that transactions can be conducted for subsequent banking machine users even though a user did not take their presented sheets.

A further aspect of the exemplary embodiment is the use of a thumper member 764 in connection with picking sheets from the stack. In the exemplary embodiment the thumper member 764 is a rotating member including a raised area. It is aligned with the opening in the divider plate. The raised area is operative to displace the sheet and urge the sheet bounding the lower end of the stack to move into engagement with the picker 700. The bouncing movement of the stack of sheets is operative to help break the forces associated with surface tension and to help to separate the lowermost sheet from the stack. As previously discussed, when the divider plate acts on top of a stack of sheets, or a driver member acts on top of a stack of sheets, the force applied by the thumper member to the sheets is enhanced. Of course this approach is exemplary and in other embodiments other approaches may be used.

In a further aspect of an exemplary embodiment, sensors are provided for determining the positions of sheets in this sheet access area. As can be appreciated in the exemplary embodiment one pair of opposed belt flights are operative to operatively engage and move sheets both above and below the divider plate. In operating the exemplary banking machine the at least one processor is operative to determine the location of sheets, and specifically whether sheets are present on the first side 692 below the divider plate 690 or in the second side 694 above the divider plate.

This is accomplished in an exemplary embodiment through an arrangement shown in FIGS. 68 and 69. FIG. 69 shows a plan view of a portion that corresponds to half of the divider plate 690. In the exemplary embodiment the divider plate 690 includes reflective pieces 766 and 768 thereon. In the exemplary embodiment reflective pieces 766 and 768 comprise a piece of tape that is operative to reflect radiation therefrom. In an exemplary embodiment the tape may be an adhesive backed tape although in other embodiments other materials and pieces may be used. Further the exemplary embodiment of the portion of the divider plate 690 includes apertures 770 and 772 therein.

Further in the exemplary embodiment the reflective pieces are angular reflective pieces. This includes in the exemplary embodiment material with angular reflective properties such that radiation striking the reflective piece at an acute angle is reflected from the reflective piece back at the same or almost the same acute angle. This is accomplished in an exemplary embodiment due to the orientation of reflective elements within the reflective piece. Thus for example as shown in FIG. 68 a sensor 774 which includes a radiation emitter and a radiation receiver is enabled to sense whether reflective piece 766 is covered by at least one adjacent sheet. Further the sensor 774 is enabled to sense that reflective piece 766 is covered or uncovered from a position that is laterally disposed from the side 694 in which sheets may be positioned. Likewise a similar sensor 776 is operative to sense whether a sheet is covering reflective piece 768 in a position disposed laterally from the divider plate. As can be appreciated these sensors enable the sensing of whether sheets are present, as well as their position on the second side 694 above the divider plate 690.

Also in this exemplary embodiment the sensor 778 includes emitter 780 and a receiver 782. The emitter 780 and receiver 782 are disposed from one another and aligned with aperture 770. As a result the ability of the receiver 782 to sense radiation from the emitter 780 indicates that sheets are not present either on the first side 692 or the second side 694 in the area of aperture 770. Similarly a sensor 784 which includes an emitter 786 and a receiver 788 is operative to determine if sheets are present either on the first side 692 or on the second side 694 in the area of aperture 772.

Further in an exemplary embodiment, a sheet support plate 790 is positioned in generally parallel relation with belt flight 686 and extends laterally on each transverse side thereof. A reflective piece 792 supported thereon operates in conjunction with the sensor 794. Sensor 794 is of a type similar to sensor 774 and includes an emitter and adjacent receiver. Similarly a reflective piece 796 operates in conjunction with a sensor 798. Such reflective pieces and sensors may be used to independently sense the presence and/or location of sheets on the first side 692. Further as can be appreciated, support plate 790 includes apertures 800 and 802 which are aligned with sensors 788 and 784 respectively. Further in other embodiments a support plate may be positioned adjacent to belt flight 688. Such a support plate may also include apertures and/or reflective elements positioned thereon. Such a support plate may be of the type previously described or may be of a different construction. Further such a support plate may include angular reflective pieces so as to enable the sensing of sheets proximate thereto with a sensor that is positioned transversely of the area in which sheets may be positioned. As can be appreciated this ability to sense the sheets may include the positioning of the sensors transversely from the sheet holding areas and positions as may be convenient and where space is available within the given housing structure of the automated banking machine.

This exemplary arrangement of sensors enables the at least one processor to determine the presence and position of sheets on both the first side and the second side of the divider plate 690. The ability of the exemplary embodiment to sense in such areas through the use of sensors which are laterally disposed away from the area in which sheets must pass, provides benefits in terms of being able to position the sensors in ways that do not interfere with the movement of the device components. It should be understood however that these approaches are exemplary and in other embodiments the use of different types of sensors for the detection of sheets may be used.

It should be understood that in the exemplary embodiment the deposit accepting device may also operate as part of the cash dispenser of the machine. This may be accomplished for example, through operation of the processor which causes currency sheets to be picked from the sheet dispenser device 656 and/or the sheet recycling device 758 for delivery to an ATM user. Such sheets may be moved through the various transports and delivered to the sheet access area. Such sheets may be presented to the user through the opening in the ATM housing in the manner previously discussed. Of course while the exemplary embodiment enables the deposit accepting device to operate as part of the currency dispenser, in other embodiments a separate device may be used for dispensing currency sheets while the deposit accepting device is operative only to accept and store sheets. Of course these approaches are exemplary and in other embodiments other approaches may be used.

In addition it should be understood that although in the exemplary embodiment particular structures are disclosed for the sheet moving devices, divider plate and other sheet handling mechanisms, in other embodiments other structures may be used. This may include for example additional numbers of divider plates and sheet moving devices. Alternatively or in addition rather than using a split divider plate having two portions as in the exemplary embodiment, other embodiments may include divider plates with apertures which can accept rollers, balls or other types of sheet moving devices therein. In addition while the exemplary embodiment is described in connection with sheet handling devices that move belts and the divider plate relatively vertically to one another, and in which the vertical position of the lower belt is fixed, other embodiments may include different arrangements. These arrangements may include transports and divider plates which move horizontally or angularly relative to one another to achieve the delivery and acceptance of sheets from a user. Further additional devices and structures may be combined with or used in lieu of the structures and devices described in connection with the exemplary embodiments herein.

Figure 75:
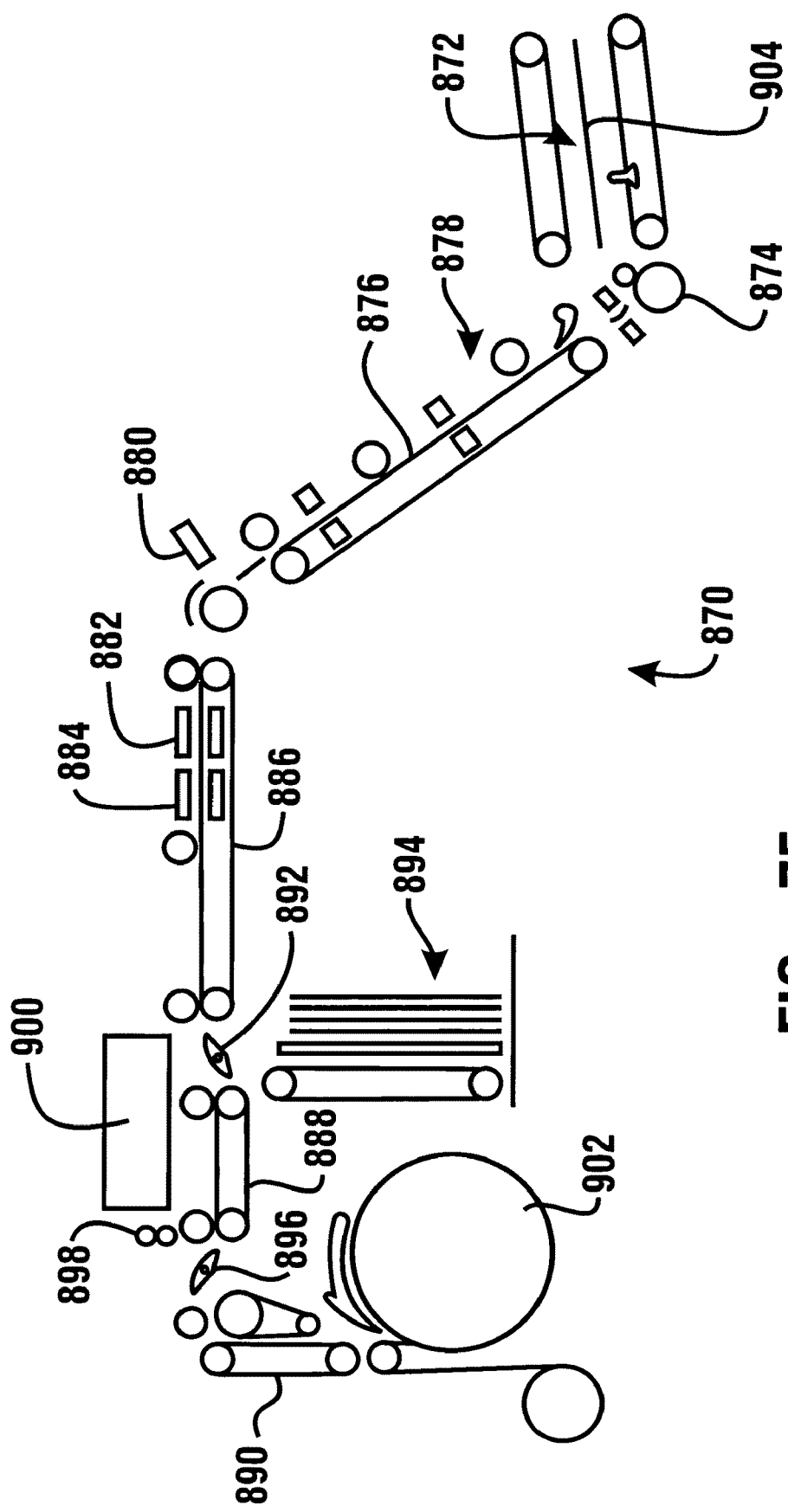
FIG. 75 is a schematic view of an alternative deposit accepting device.

FIG. 75 schematically shows an alternative embodiment of a deposit accepting device generally indicated 870. Deposit accepting device 870 includes many features that are similar to the exemplary deposit accepting device 662 previously described. For example deposit accepting device 870 includes a sheet access area 872 which includes similar structures to sheet access area 684 previously described. Deposit accepting device 870 also includes a picker 874 which is used to separate sheets from stacks in the sheet access area.

Deposit accepting device 870 also has a sheet path 876 therethrough which includes a document alignment area 878 which may be of the type previously described. The exemplary deposit accepting device 870 also includes a plurality of sheet sensors and magnetic read heads of the type described in connection with the previous embodiment. Deposit accepting device 870 also includes analysis devices as is appropriate for the types of sheets being processed. This may include for example, micr line read heads schematically indicated 880, an imager 882, a validator 884 and other appropriate sensors or analysis devices that are usable to verify one or more features associated with the authenticity of the sheets being processed. In the exemplary embodiment the deposit accepting device 870 is operative to process checks. However, as discussed previously, other embodiments may be used to process other types of sheets such as currency notes, tickets, gaming materials or other types of documents.

The exemplary deposit accepting device 870 additionally includes a sheet transport section 886. The deposit accepting device also has a sheet transport section 888 and a sheet transport section 890. A movable diverter gate 892 is operatively positioned between transport sections 886 and 888. Diverter gate 892 is selectively positionable and changes conditions responsive to a drive that is in operative connection with one or more processors of the machine. Diverter gate 892 is selectively operative to direct sheets traveling inward in the machine transport section 886, to transport section 888. In addition in the exemplary embodiment, diverter gate 892 is operative to be positioned to selectively direct sheets traveling in engagement with transport section 888 toward transport section 886 to either transport 886, or a storage device 894. Storage device 894 may in some embodiments be of the type previously described such as storage device 660. Of course in other embodiments other types of storage devices or document recycling devices may be used.

In the exemplary embodiment a diverter gate 896 is operatively positioned between transport section 890 and transport section 888. Diverter gate 896 is also in operative connection with a drive that is controlled responsive to operation of at least one processor. Diverter gate 896 is selectively positionable to direct sheets moving inward in transport section 888 toward transport section 890 to engage with the transport section 890. The exemplary diverter gate 896 is also selectively positionable to direct sheets moving in transport section 890 toward transport section 888 to either engage transport section 888 or to engage rollers 898 which move documents into a storage area 900. Storage area 900 may be used for example, to store sheets that are desired to be segregated from sheets that are stored in the storage device 894. Of course this approach is exemplary.

The exemplary deposit accepting device 870 further includes a sheet storage and retrieval device schematically indicated 902. In the exemplary embodiment the sheet storage and retrieval device is of the belt recycler type which can be used to selectively store and deliver sheets thereon. Of course it should be understood that this device is exemplary and in other embodiments other devices may be used.

In operation of the exemplary deposit accepting device, checks or other sheets are received from the sheet access area 872 in an area below the divider plate 904 in the manner previously described. The sheets such as checks are picked from the stack of sheets received in the machine. Each sheet after being picked is aligned in the document alignment area 878 and analyzed by the document analysis devices. In the exemplary embodiment the micr line data on checks is read through operation of the magnetic read heads 880. The check is imaged through operation of the imager 882. Further in the exemplary embodiment if the check includes other characteristics to indicate validity, the validator 884 may operate to sense for those characteristics.

Each check is moved from the transport section 886 and through the transport sections 888 and 890, and is stored on the sheet storage and retrieval device 892. As discussed in connection with the prior embodiment, the automated banking machine in which the deposit accepting device is included operates responsive to at least one processor that is in operative connection with the deposit accepting device and the associated analysis devices the at least one processor determines which of the sheets and checks processed are acceptable and will be stored in the machine, and which are not acceptable and will be returned to the customer. Further in this exemplary embodiment the at least one processor is operative to determine which of the sheets have properties that suggest that they should be stored in the machine in a segregated manner away from checks that have been accepted.

In the exemplary embodiment the at least one processor operates to cause the sheet storage and retrieval device 902 to deliver the sheets to the transport section 890. The at least one processor operates to position diverter gate 896 as appropriate for each sheet. That is, in cases where the sheets are to be segregated and retained in the machine in storage area 900, the diverter gate operates to direct those sheets to the rollers 898 which move the sheets into the storage area 900. Sheets which are to be stored in the storage device 894 or returned to the customer are directed to the transport section 888 by the selective positioning of the diverter gate 896.

Similarly for each sheet moved outward in transport section 888 the diverter gate 892 is selectively positioned responsive to operation of the processor so that sheets that are to be returned to the customer are directed by positioning the diverter gate to engage transport section 886. Sheets that are to be stored in the storage device 894 are directed by positioning the diverter gate and moved into the storage device.

In this exemplary embodiment sheets that are to be returned to the customer are moved along the transport path back toward the picker and are directed to the sheet access area above the divider plate 904. Such sheets may be handled as previously discussed to either resubmit them to the machine or return them to the customer. Of course these approaches are exemplary.

In the exemplary embodiment of the deposit accepting device 870 provision is made for facilitating the servicing of the deposit accepting device. The features associated with this capability are discussed in connection with FIGS. 76 through 81. In the exemplary embodiment circumstances may arise where a servicer needs to service the deposit accepting device because a check or other sheet has become jammed in the machine. In some cases the jammed sheet may be in the transport path or other transport section. Jammed sheets may also become lodged adjacent to a diverter gate. Alternatively sheets may become misaligned in connection with the sheet storage and retrieval device. In the exemplary embodiment when a sheet has become jammed, it may be advisable for a servicer to remove not only the jammed sheet but all the other sheets which were in the transports and the sheet storage and retrieval device of the machine at the time that the malfunction occurred. A servicer may desire to do this for purposes of clearing the jam. The servicer may also wish to do this so that they can more readily move the sheets to a proper location where they will not cause further problems. In still other circumstances it may be desirable for the servicer to operate the deposit accepting device to run the sheets through the device so that checks can be imaged or otherwise analyzed, and so that the image data and other data corresponding thereto may be transmitted from the automated banking machine into remote computers that can process such data. Of course these approaches are exemplary.

Deposit accepting device 870 incorporates a feature that helps servicers remove sheets from the sheet storage and retrieval device in a way that minimizes the risk of damage to the deposit accepting device. As can be appreciated, devices made to accurately process sheets may have close tolerances and efforts by servicers to manually move components which include sheets may result in damage or changes which place the device out of adjustment. This may be particularly true of a sheet storage and retrieval device which has a flexible web for holding sheets therein. If attempts are made to manually move the web so as to recover sheets therein, damage to the web or other components of the sheet storage and retrieval device might occur.

In exemplary embodiments when a jam is detected as having occurred in the deposit accepting device the automated banking machine operates to give notice of the malfunction. Notice of the malfunction is communicated to a servicer who may repair the machine. The servicer who is to make repairs may access the deposit accepting device of the exemplary embodiment by opening a door on a housing of the automated banking machine. Generally the door supported on the housing of the machine is held in a closed position by a lock. An authorized servicer has the key or combination that is usable to open the lock. The servicer can then open the door on the housing of the automated banking machine so as to provide access to the deposit accepting device. It should be understood that in some embodiments the door on the automated banking machine housing may be a door on the side of the machine away from the customer interface area. In other embodiments the door that is opened may include a fascia or other portion of a customer interface area which is movable to provide service access. Of course these approaches are merely exemplary.

Of course it should be understood that the at least one processor in the machine may provide various types of diagnostic capabilities so as to indicate to the servicer the nature of the problem with the machine as well as with the deposit accepting device. A servicer may utilize the information provided by the machine as well as the servicer's knowledge and skill to locate the source of problems. This may include opening transport sections in a manner like that previously described to inspect the condition of devices, components, sensors and documents.

Figure 76:
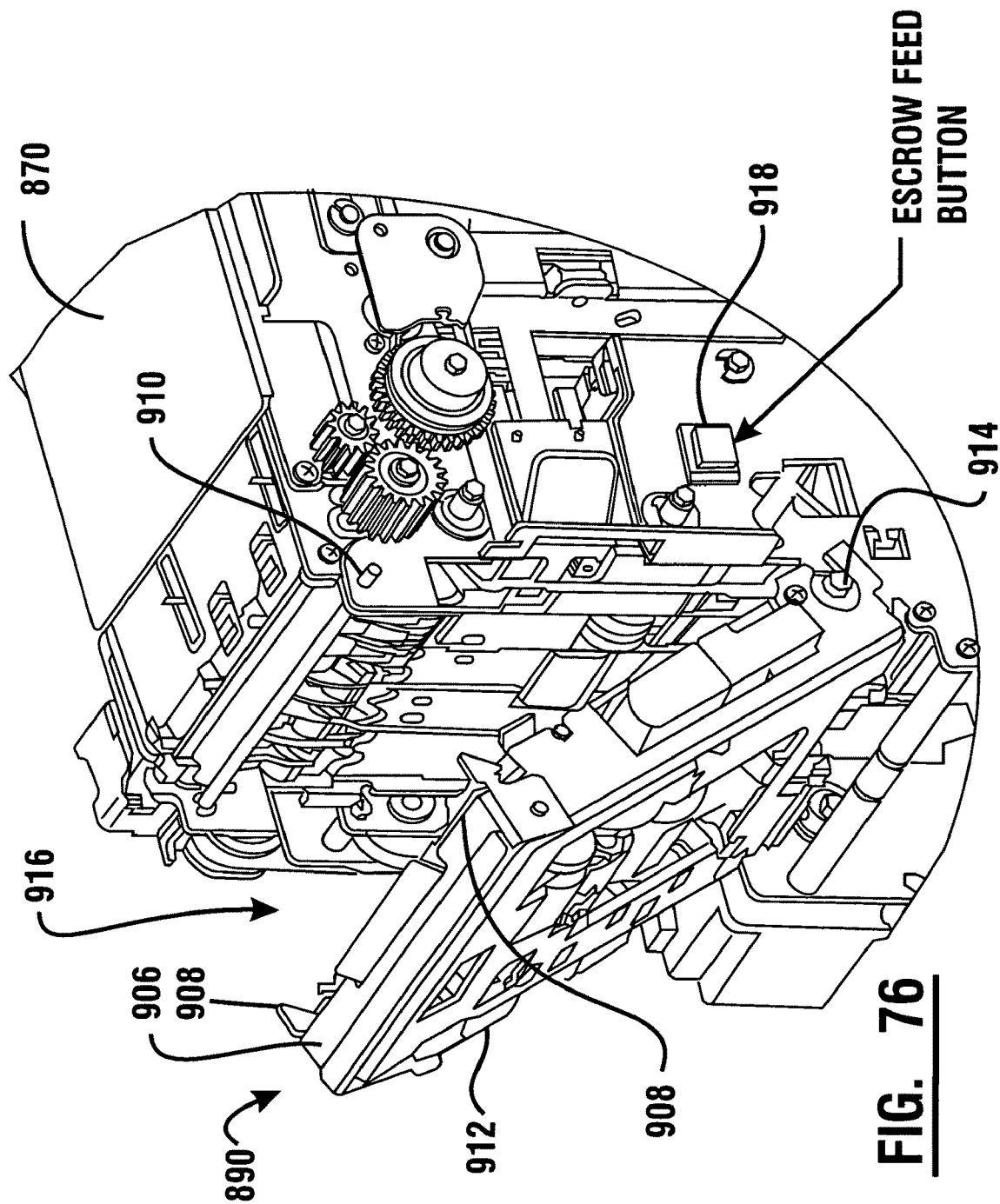
FIG. 76 is an isometric view of a portion of the deposit accepting device shown in FIG. 75 with a sheet transport access cover open.
Figure 80:
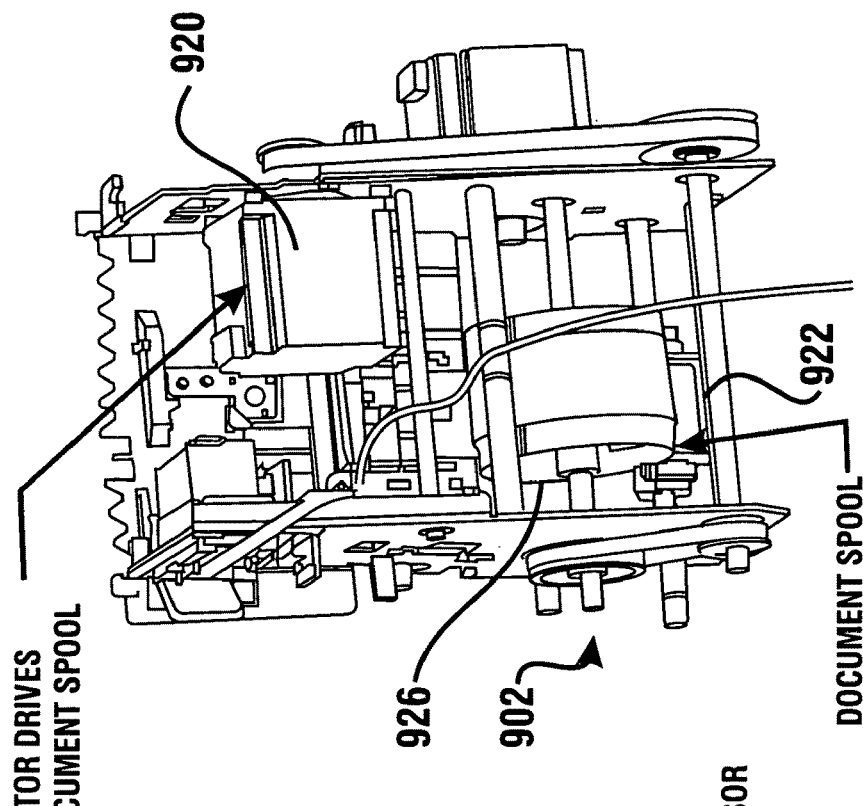
FIG. 80 is a front view of the sheet storage and retrieval device.
Figure 79:
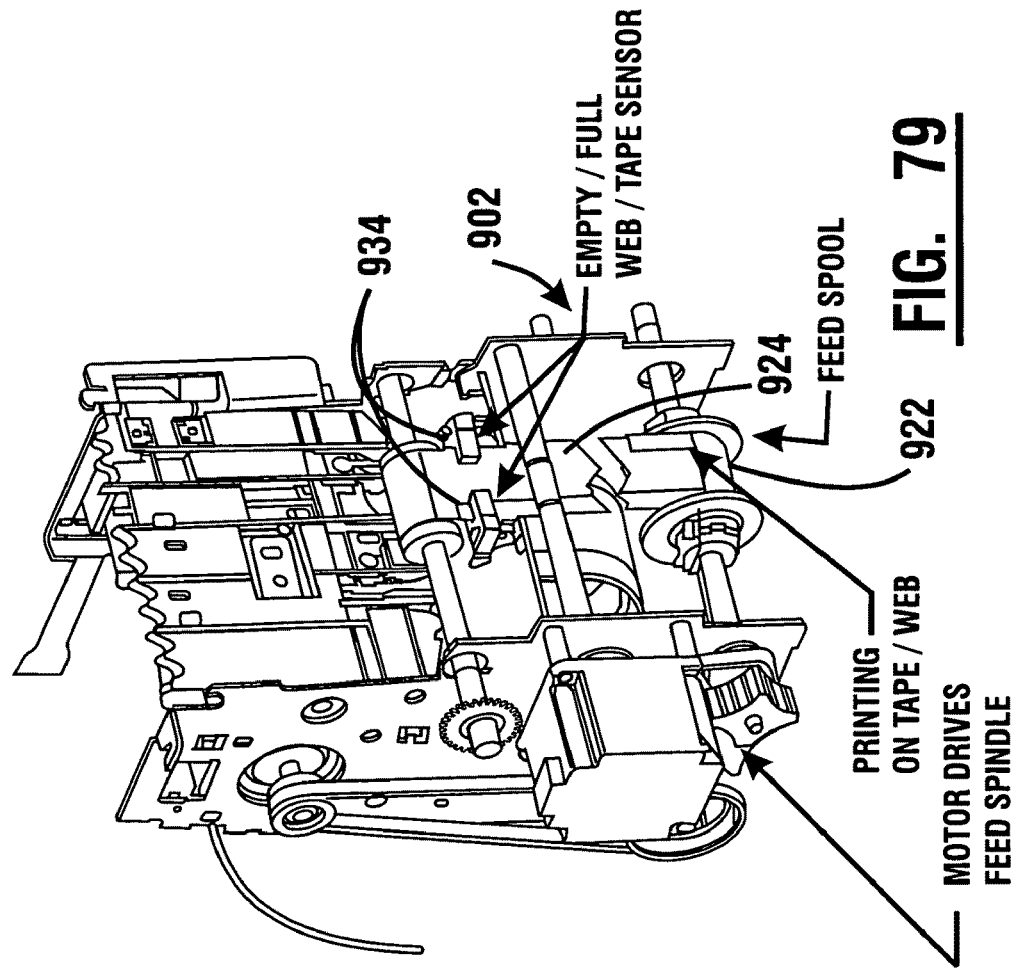
FIG. 79 shows a back view of the sheet storage and retrieval device and transport.

In the exemplary embodiment once the servicer has gained access to the interior area of the housing the servicer may recover any checks or other documents that are stored in the sheet storage and retrieval device by moving transport section 890. As shown in FIG. 76 this is done by manually actuating a latch 906. The manually actuatable latch 906 includes hook portions 908 that operatively engage pins 910 on the deposit accepting device. As can be appreciated when the latch is engaged, transport 890 is in operative position to move sheets to and from the sheet storage and retrieval device 902. Manually disengaging the latch 906 enables a sheet transport access cover 912 to move relative to the deposit accepting device.

In the exemplary embodiment the sheet transport access cover 912 is enabled to move rotationally about a lower end 914 which is disposed of the opposite end of the access cover from the latch 906. Rotationally moving the sheet transport access cover is operative to provide access to an open transport area schematically indicated 916.

As best shown in FIG. 76 the exemplary deposit accepting device includes a button 918. Manually depressing button 918 when the sheet transport access cover is open causes a motor 920 best shown in FIG. 80, to move a feed spool 922 of the sheet storage and retrieval device 902 so that sheets engaged therewith are disengaged from the sheet storage and retrieval device and moved into the open transport area.

This is accomplished in an exemplary embodiment by the motor 920 moving the flexible web 924 of the belt recycler onto the feed spool 922. As this occurs sheets that are stored on the sheet storage and retrieval device on the document spool 926 are moved therefrom into the open transport area 916. By holding the button 918 the servicer is enabled to move some or all of the sheets engaged with the sheet storage and retrieval device into the open transport area. Once the sheets are moved into the open transport area the servicer can manually engage them and remove them for further handling.

Figure 81:
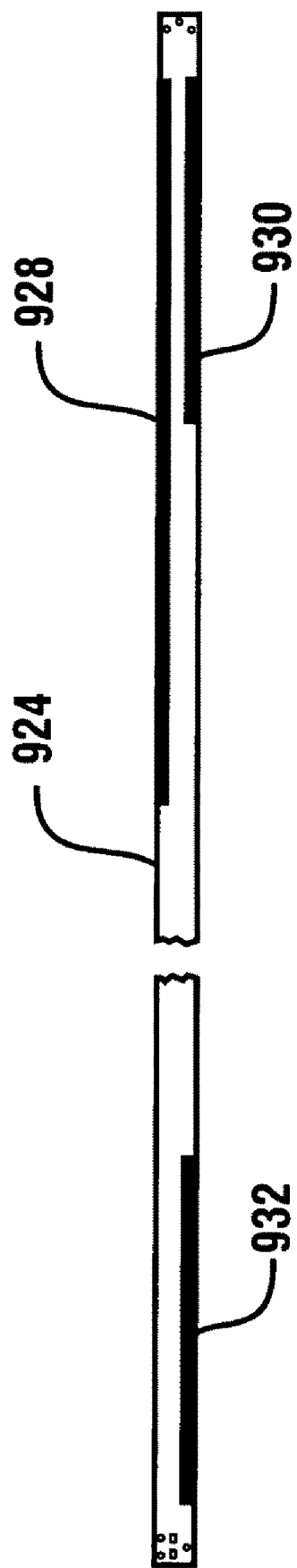
FIG. 81 is a plan view of an exemplary flexible web used in a sheet storage and retrieval device.

It should be pointed out that the exemplary embodiment includes provisions for avoiding excessive movement of the flexible web. As shown in FIG. 81 the flexible web of the exemplary embodiment includes markings 928, 930 and 932 adjacent the ends thereof. These markings, which in the exemplary embodiment comprise darkened areas, are sensed by sensors 934 of the deposit accepting device. These sensors provide an indication when the flexible web is reaching the extremes of its travel. These markings also provide an indication of which end of the web is adjacent to the particular sensors. This is accomplished by the different markings being associated with different ends of the flexible web. The signals from the sensors 934 are communicated through circuitry which includes at least one processor in the machine. The at least one processor operates to assure that the motor 920 does not cause the web to move excessively so that damage is caused thereto. Of course this approach is exemplary and in other embodiments other approaches may be used.

Also in the exemplary embodiment as represented in FIG. 78, the manually actuatable latch 906 is in operative connection with a sensor 936. Sensor 936 is operative to sense when the latch 906 is in an open condition. Thus sensor 936 is usable to indicate that the sheet transport access cover is open. The circuitry in operative connection with the sensor 936 is usable in a manner later discussed to indicate that the deposit accepting device is not in an operative position. Of course this approach is exemplary and in other embodiments other approaches may be used.

In the exemplary embodiment the servicer after removing sheets from the sheet storage and retrieval device may close the sheet transport access cover and reengage the manual latch 906 which closes the transport area and renders it no longer manually accessible to a user. As can be appreciated, closing the transport cover includes rotating the cover about its lower end to reengage the latch. Of course this approach is exemplary and in other embodiments other approaches may be used.

Depending on the circumstances and the type of sheets involved the at least one servicer may take the sheets that have been removed from the sheet storage and retrieval device and handle them as appropriate. This may include for example placing the sheets in the sheet storage device 894 or in the sheet storage area 900. Alternatively in some circumstances where the sheets have not been processed the servicer may operate the machine so that the sheets are reinserted to the deposit accepting device. The insertion of the sheets may cause the automated banking machine to operate in accordance with its programming to read data from the sheets, image the sheets or otherwise validate the sheets. The servicer may operate the machine so that images of the sheets and/or other data is communicated from the machine to one or more remote computers so that the sheets that the user has inserted at the time the machine malfunctioned can be appropriately processed. This may include for example a showing that checks which are deposited by a user are properly credited to the user's account. In some embodiments at least one processor in the machine may execute instructions that enables a servicer to transmit the account data of the user operating the machine at the time of the malfunction to a remote computer so that it may be associated with the checks once the checks have been cleared from the machine. Alternatively, in some embodiments that handle other types of sheets such as notes or tickets, provisions may be made for assuring the crediting of the machine user for those as well. Of course these approaches are exemplary and in other embodiments other approaches may be used.

Once the servicer has completed the service activities the servicer may return the machine to service. This may include moving the deposit accepting device relative to the housing back into an operative position. This may be done by engaging the deposit accepting device with a manual stop or catch. Alternatively or in addition, this may include moving the deposit accepting device relative to the housing such that the deposit accepting device operatively engages one or more sensors. Once the deposit accepting device is back in position the servicer may then close the door on the housing and return the machine to service. Of course these approaches and method steps are exemplary and in other embodiments other approaches may be used.

Some exemplary embodiments of the deposit accepting device may include features that help the servicer determine the operative condition of the deposit accepting device. In some exemplary embodiments the deposit accepting device includes a plurality of visual indicators that provide outputs indicative of conditions of the deposit accepting device. An exemplary form of such visual indicators are shown in FIGS. 82 and 83.

In the exemplary embodiment the deposit accepting device includes a circuit card assembly 938. The circuit card assembly includes numerous components which make up control circuitry associated with the deposit accepting device. In the exemplary embodiment the circuit card assembly extends on the side of the deposit accepting device from an area adjacent the sheet access area, which for purposes of this discussion will be referred to as the front, to the rear of the device which for purposes of this exemplary embodiment is where the sheet transport access cover is located. The circuit card assembly includes a visual indicator 940 located adjacent the front of the deposit accepting device. The circuit card assembly also includes another visual indicator 942 which is located at the rear of the device. Each one of the visual indicators in the exemplary embodiment is comprised of three different color LEDs. Of course this construction of the visual indicators is exemplary.

The visual indicators on the circuit card assembly are positioned so that they are only visible to a servicer from outside the housing when the movable access door is open. The fact that there are a plurality of visual indicators in disposed locations on the deposit accepting device further facilitates observation by a servicer. For example when the deposit accepting device is used in an automated banking machine that has a service access door on the rear, a servicer is readily enabled to observe the visual indicator 942 on the back of the device. Alternatively when the service door of the machine is located adjacent to the front of the deposit accepting device, the visual indicator 940 is readily visible to a servicer once the access door adjacent to the front of the deposit accepting device is open. Of course it should be understood that additional visual indicators may be provided in other embodiments so as to facilitate observation of the visual outputs provided therefrom by a servicer.

In the exemplary embodiment the circuitry associated with the deposit accepting device is operative to sense and/or determine the existence of various conditions. In the exemplary embodiment these include determining conditions that may exist with regard to hardware features or software features. For purposes of this disclosure however, software routines or other electronic features that are operative to determine the existence of conditions, as well as hardware sensors, are referred to herein as sensors.

The exemplary embodiment is operative to include sensors that determine a plurality of conditions that exist with regard to the deposit accepting device. These include for example sensors that sense when the deposit accepting device is positioned in the operative position in the housing. Sensors which are operative to sense the physical location of the deposit accepting device are in operative connection with the circuitry on the circuit card assembly so as to enable the circuit card assembly to provide a unique and distinct output associated with this condition.

Further in the exemplary embodiment the deposit accepting device includes numerous sensors along the path that sheets travel through the device. These sensors are in operative connection with the circuitry. The circuitry includes software instructions that enables the circuitry to determine when the signals from the sensors correspond to a jammed check. Further in exemplary embodiments the sensors and control circuitry may be operative to resolve not only a jammed check condition but also a location within the deposit accepting device where a jam has occurred.

Exemplary embodiments also provide indications of the status of manually movable components on the deposit accepting device. This may include for example sensors which determine the position of the sheet transport access cover as previously discussed. Other sensors may also be operative to sense the latched or unlatched condition of other access openings or other members that are moved on the deposit accepting device. The control circuitry is operative responsive to the sensor signals to determine the particular condition which exists.

Other sensors may be operative to determine printer malfunctions within the device. This may include for example circuitry which is operative to sense that the inkjet printer device is no longer functioning properly to print indicia on checks. Alternatively sensors may be operative to detect a malfunction with regard to the stamper printer. Based on routines and sensors included in the deposit accepting device, the circuitry is operative to determine the conditions corresponding to such malfunctions.

Further in exemplary embodiments the control circuitry is operative to determine if the deposit accepting device is properly in operative communication with other components within the machine. This may be done for example by the control circuitry periodically sending and receiving test messages to show that the deposit accepting device is in operative communication with the other machine components with which it needs to communicate. The circuitry of the deposit accepting device may be operative to determine when a loss of such communication has occurred.

The control circuitry may also be operative to monitor the power level that is available to the control circuitry on the deposit accepting device. The circuitry may be operative to determine that the power supplied is not within an acceptable range and may produce signals indicative thereof.

Likewise exemplary embodiments may include sensors or other detection capabilities that are operative to determine malfunctions of drives, circuitry or other hardware or electronic components that are included in the deposit accepting device. The circuitry may be operative to provide signals indicative of each such respective condition.

It should be understood that these conditions described in connection with the exemplary embodiment are merely examples of some of the types of conditions that may be determined through operation of control circuitry of the deposit accepting device. Other embodiments may provide other or additional capabilities for detecting conditions of the device.

In the exemplary embodiment control circuitry is also operative to generate at least one signal that corresponds to the condition when the deposit accepting device is in a condition to process checks. In the exemplary embodiment the control circuitry is operative to provide a visual signal through the visual indicators which is indicative of this condition. For example in some exemplary embodiments the control circuitry may cause the output of a continuous green LED light when the deposit accepting device is ready to operate to process checks.

In some exemplary embodiments the visual indicators may have LEDs in colors such as red and yellow in addition to green. The conditions that are sensed through operation of the control circuitry may cause distinctive combinations of the red, yellow and green lights from the LEDs to be output that correspond to each given condition. Alternatively or in addition, in some embodiments the LEDs may output flash sequences in which the LEDs illuminate and are on and off in a distinctive pattern which corresponds to the particular condition sensed. In addition in exemplary embodiments the visual indicators may be operative to provide outputs that correspond to a plurality of conditions which render the deposit accepting device inoperative. The visual indications associated with these multiple conditions may be output sequentially during a given time interval from the visual indicators. Of course these approaches are merely exemplary.

As can be appreciated these features enable a servicer who has opened the door of the housing to observe the outputs from one or more of the visual indicators. By viewing these outputs the servicer is very quickly able to determine that there is a condition causing a malfunction of the deposit accepting device. Further the outputs from the visual indicators may quickly indicate to the servicer the nature of such a malfunction. Likewise the visual indicators may be helpful to a servicer who is placing a machine back in service. For example if the servicer has failed to close all of the necessary latches on the device or has not moved the device back into the proper position, the servicer will be apprised of this by the outputs from the visual indicators. This way the servicer may remedy the condition before proceeding further in an attempt to put the machine back into service. Of course these approaches are exemplary and in other embodiments other approaches may be used.

A further feature of some exemplary embodiments of automated banking machines that facilitate servicing is a capability to provide a visual representation of the deposit accepting device to the servicer. The visual representation is output responsive to instructions executed by at least one processor of the machine. Such a visual representation may be output through a display screen of the automated banking machine responsive to inputs through input devices from a servicer that are operative to put the machine in one or more diagnostic conditions. Such a visual representation of the deposit accepting device is indicated 946 in FIG. 84. In the exemplary embodiment the visual representation of the deposit accepting device includes visual representations of the components which make up the device. These include visual representations of sheet sensors for example included in the device. In the exemplary embodiment the visual representations of sheet sensors are operative to change appearance to indicate the sensing of a sheet by the sensor. The sheet sensors are also operative in the exemplary embodiment to change conditions to indicate time periods during which a sheet sensor senses a sheet adjacent thereto during a sheet processing transaction. An exemplary sheet sensor is indicated 948 in FIG. 84.

In the exemplary embodiment a visual representation is also included in the visual representation of the deposit accepting device of the diverter gates. The visual representations also include an indication of the position of each of the diverter gates. As represented in FIG. 84, visual representation 950 corresponds to diverter gate 896. Likewise visual representation 952 corresponds to diverter gate 892, and visual representation 956 corresponds to the diverter gate that is operative to direct sheets returning to the sheet access area.

In the exemplary embodiment a visual representation of the sheet storage and retrieval device 902 is represented by 958. In the visual representation storage device 894 is represented in the visual representation as 960. The visual representation of the storage area 900 is also represented as 962. It should be noted that in the exemplary embodiment each of the visual representations corresponding to the sheet storage and retrieval device, the storage device and the storage area each include a numerical indication which represents the number of sheets currently stored therein. Such information may be useful to a servicer in knowing how many sheets are currently in the various areas of the deposit accepting device. Further the visual representation of the sheet access area 964 also includes numerical indicators which indicate the number of sheets located above and below the divider plate.

Further in the exemplary embodiment the visual representations include representations of the transports that are operative to move sheets within the deposit accepting device. The visual representation of one transport is indicated 966 in FIG. 84. In the exemplary embodiment the visual representation that is output on the display is operative to indicate when transport belts operate during sheet processing, and also indicate the direction of the transport belt movement during such sheet processing. This helps to indicate to a servicer which way the various transports and other items are moving at a given time during the processing of a sheet. Further in exemplary embodiments the at least one processor which causes the visual output corresponding to the deposit accepting device is also operative to provide an indication of a location of a sheet during processing. This visual representation represented 967 in FIG. 84, may in some embodiments correspond to the position of a sheet as determined through operation of the at least one processor based on signals from the various sensors included in the deposit accepting device. This visual representation of the sheet moves in the visual representation of the deposit accepting device to show a servicer a location of a sheet at various times during a sheet processing transaction.

In the exemplary embodiment a servicer who has placed the machine in diagnostic mode may operate the machine to have the deposit accepting device process test sheets. These may include for example simulated checks with sample data thereon. Alternatively other types of test sheets may be used. The user may insert the test sheets into the deposit accepting device and observe the operation of the device as each of the test sheets is processed. Further the technician may also observe the outputs through the display which include the visual representation of the deposit accepting device. This visual representation provides the servicer with an indication of a sensed input and the actions taken by the deposit accepting device in processing the sheet. By observing the visual representation of the deposit accepting device the servicer is enabled to identify components of the deposit accepting device that may not be operating property. This function may be particularly useful for detecting intermittent problems that do not consistently appear for every sheet.

In some embodiments at least one processor in operative connection with the deposit accepting device is operative to store data corresponding to the conditions and operational output signals associated with processing a sheet, in at least one data store of the machine. The servicer may then use the stored data to cause a visual representation to be output through the display which shows the conditions of the various sensors and devices of the device during one or more previous sheet processing transactions. Further, responsive to inputs from a servicer to the machine the at least one processor of some exemplary embodiments is operative to stop, reverse and/or replay the operation data. This enables a servicer to see the visible outputs corresponding to the sheet processing transaction repeatedly through the display. This may enable the servicer to observe problems that might not be readily apparent in a single viewing of the display.

Further in some exemplary embodiments the at least one processor is operative responsive to inputs from a servicer to provide the visual representation through the display in other than real time. Thus for example the display corresponding to the movement of a sheet in the device during a sheet processing transaction may be output in slow motion. This may further facilitate the servicer being able to observe potential problems and malfunctions that have occurred at the machine.

In some exemplary embodiments at least one processor in the machine may store data in a data store corresponding to multiple sheet processing transactions which occur during normal operation of the machine. This stored data enables a servicer to have access to operation data associated with the deposit accepting device for numerous prior transactions including a most recent sheet processing operation during which a malfunction occurred. The ability to use this data to produce visual representations of each sheet processing transaction on the display enables a servicer to analyze what may have occurred that resulted in a malfunction. Of course these approaches are exemplary and in other embodiments other approaches may be used.

In still other exemplary automated banking machines the data corresponding to the operation of the deposit accepting device may be transmitted from the automated banking machine to a remote computer. This operation data may include for example, data corresponding to inputs sensed during sheet processing transactions by the various sensors in the device. Such operation data may also include output operation data. The output operation data may include signals corresponding to the outputs that the deposit accepting device generated to operate components of the device during the sheet processing transactions.

In some exemplary embodiments at least one processor in the machine may be operative to store data corresponding to the operation data on computer readable media. This may include for example storing the data on a CD, flash drive or other media from which the operation data may be read by a computer. Alternatively or in addition the automated banking machine may operate so as to communicate operation data from the machine through a remote computer.

In some embodiments the operation data may be useful when diagnosing problems that exist at the machine. For example the operation data may be used remotely from the machine to operate a deposit accepting device or a test bed form of such a device to determine how the operational data causes the test device to perform. This may be done for example by providing the input operational data from the deposit accepting device in the automated banking machine, to the test deposit accepting device. In this way the test device may receive the same inputs as the device in the machine did based on the signals from the various sensors. By providing these inputs to the test device observations may then be made as to how the test device operates. Operation of the test device may be indicative of problems at the banking machine. Alternatively or in addition the test device may also be in operative connection with a display or other output device so that a technician can observe visual representations of the operation of the devices included in the test device.

Further in some embodiments at least one computer in operative connection with the test device may operate to compare the output signals that were generated by the deposit accepting device in the automated banking machine and the output signals that are generated by the test deposit accepting device in response to the input signals that were provided from the deposit accepting device in the machine. The at least one computer may operate to compare these output signals to identify any variances. These variances cause outputs to the at least one technician through a display or other output device which are indicative of a deficiency in the banking machine. By observing these variances and the nature of the differences, the at least one technician (and/or analysis software in the computer) may be able to identify how the deposit accepting device in the automated banking machine is not performing in the respective manner.

Further in some exemplary embodiments the test deposit accepting device may be operated to conduct a sheet processing transaction. The inputs and the outputs which are generated during such a sheet processing transaction on the test device may be compared through operation of at least one computer to the corresponding operational data generated by the deposit accepting device in the automated banking machine. The at least one computer associated with the test device may thereafter compare the signals, timing and other aspects of the operation data from the two devices so as to identify differences and to provide outputs to a technician which identify the nature of those differences and/or possible deficiencies with the device in the automated banking machine.

Further in some exemplary embodiments the operational data from the automated banking machine and the operational data from the test device may be used to produce visual representations or other outputs that can be observed by a technician for purposes of comparison and diagnosis. This may be done by providing outputs through the display screen or other suitable devices. For example visual representations of the devices may be output in adjacent relation on one or more display screens so that the differences in operational characteristics can be observed. This may include for example comparing the operational outputs of the test device in response to the sensor inputs recorded at the machine to the outputs produced by the deposit accepting device in the automated banking machine. Further such visual outputs may be replayed, run at different speeds, reversed or otherwise analyzed in numerous different ways so as to identify deficiencies.

Of course it should be understood that these approaches are exemplary and in other embodiments other approaches may be used.

Thus the exemplary embodiments achieve at least some of the above stated objectives, eliminate difficulties encountered in the use of prior devices and systems, and attain the useful results described herein.

In the foregoing description certain terms have been described as exemplary embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained; the new and useful structures, devices, elements, arrangements, parts, combinations, systems, equipment, operations, methods, processes and relationships are set forth in the appended claims.

We claim:

1. Apparatus comprising:
a card reader, wherein the card reader is operative to read card data included on user cards,
an automated banking machine, wherein the automated banking machine includes:
  a housing, wherein the housing includes at least one movable door,
    wherein in an open condition the at least one movable door enables a local machine service person to access an interior area of the housing for servicing,
  at least one input device, wherein the at least one input device includes the card reader,
  at least one output device,
  a check processing device, wherein the check processing device is operative to at least one of image checks and read micr line data from checks input to the automated banking machine;
at least one processor,
  wherein the at least one processor is in operative connection with the at least one input device, the at least one output device, and the check processing device,
  wherein the at least one processor is operative to cause the automated banking machine to read card data from cards through operation of the card reader, wherein the card data corresponds to financial accounts,
    wherein the at least one processor enables the automated banking machine to carry out transactions involving financial accounts corresponding to card data,
      wherein at least some of the transactions include transactions in which checks are received by the automated banking machine,
wherein the check processing device includes at least one visual indicator thereon, wherein the at least one visual indicator provides at least one visual output indicative of at least one condition of the check processing device,
wherein the at least one visual indicator is operative to output at least one first visual output,
wherein the at least one first visual output corresponds to a first condition,
wherein in the first condition the check processing device is capable of operation to process checks,
wherein the at least one visual indicator is operative to output a plurality of further visual outputs other than the at least one first visual output,
wherein each of the plurality of further visual outputs corresponds to at least one condition of the check processing device in which the device is not capable of operation to process checks,
wherein the at least one visual indicator is visible from outside the housing only when the at least one movable door is in the open condition.

2. The apparatus according to claim 1 wherein the at least one visual indicator is operative to provide visual outputs including multiple colors.

3. The apparatus according to claim 2 wherein the check processing device includes a plurality of visually identical visual indicators, wherein the visual indicators are located at a plurality of disposed locations on the check processing device.

4. The apparatus according to claim 3 wherein each of the plurality of visual indicators is operative to provide visual outputs in a plurality of colors.

5. The apparatus according to claim 1 wherein the automated banking machine includes at least one sensor operative to sense that the check processing device is not in an operative position relative to the housing, and wherein responsive to the at least one sensor the plurality of visual indicators are operative to provide a further visual output uniquely indicating that the check processing device is not in operative position relative to the housing.

6. The apparatus according to claim 1 wherein the automated banking machine includes at least one sensor operative to sense that a check is jammed in the check processing device, and wherein responsive to the at least one sensor the plurality of visual indicators are operative to provide a further visual output uniquely indicating that a check is jammed in the check processing device.

7. The apparatus according to claim 1 wherein the automated banking machine includes at least one sensor operative to sense that an access member on the check processing device is in an open condition, and wherein responsive to the at least one sensor the plurality of visual indicators are operative to provide a further visual output uniquely indicating that an access member on the check processing device is in an open condition.

8. The apparatus according to claim 1 wherein the automated banking machine includes at least one sensor operative to sense that a printer on the check processing device is not operational, and wherein responsive to the at least one sensor the plurality of visual indicators are operative to provide a further visual output uniquely indicating that the printer on the check processing device is not operational.

9. The apparatus according to claim 1 wherein the automated banking machine includes at least one sensor operative to sense that the check processing device is not, operatively communicating with at least one other device in the automated banking machine, and wherein responsive to the at least one sensor, the plurality of visual indicators are operative to provide a further visual output uniquely indicating that the check processing device is not operatively communicating with at least one other device in the automated banking machine.

10. The apparatus according to claim 1 wherein the automated banking machine includes at least one sensor operative to sense that the check processing device is not receiving a proper supply of electrical power, and wherein responsive to the at least one sensor, the plurality of visual indicators are operative to provide a further visual output uniquely indicating that the check processing device is not receiving a proper supply of electrical power.

11. The apparatus according to claim 1 wherein the automated banking machine includes at least one sensor operative to sense that a circuit of the check processing device has failed, and wherein responsive to the at least one sensor, the plurality of visual indicators are operative to provide a further visual output uniquely indicating that a circuit of the check processing device has failed.

12. The apparatus according to claim 4 wherein each of the plurality of visual indicators is operative to provide during one concurrent time interval, visual outputs corresponding to a plurality of then currently existing further conditions of the check processing device.

13. The apparatus according to claim 12 wherein the check processing device includes two visual indicators, one at each opposed end of the check processing device.

14. The apparatus according to claim 12 wherein at least some of the plurality of further visual outputs include predetermined flash sequences.

15. The apparatus according to claim 12 wherein the automated banking machine further includes a cash dispenser.

16. Apparatus comprising:
an automated transaction machine,
wherein the machine includes a check accepting device,
wherein the check accepting device when fully operational is able to obtain data from checks input to the machine,
wherein the check accepting device includes a plurality of visual indicators,
wherein the visual indicators are respectively located at different locations,
wherein the visual indicators are visually identical,
wherein each visual indicator is operable to provide a plurality of identical visual outputs,
wherein each identical visual output corresponds to an operational-related condition of the check accepting device,
wherein each visual indicator is operable to concurrently provide at least one identical visual output,
wherein the machine includes at least one door,
wherein in an open condition the at least one door enables a local machine service person to access an interior area of the machine for servicing,
wherein at least one of the visual indicators is visible to a local machine servicer only when the at least one door is in the open condition.

17. The apparatus according to claim 16 wherein each visual indicator is operable to concurrently provide each identical visual output.

18. The apparatus according to claim 17
wherein the visual indicators comprise a first visual indicator and a second visual indicator,
wherein the first visual indicator is located at a first end of the check accepting device,
wherein the second visual indicator is located at a second end of the check accepting device.

19. The apparatus according to claim 17 wherein each visual indicator comprises a visually identical plurality of different colored LEDs.

20. The apparatus according to claim 16 wherein the machine includes at least one reader operable to read user data usable to identify at least one of a financial account and a user of the machine.

21. Apparatus comprising:
an automated banking machine including:
  at least one input device,
    wherein the at least one input device includes at least one reader,
      wherein the at least one reader is operable to read user data usable to identify at least one of a financial account and a user of the machine,
  at least one output device,
    wherein the at least one output device includes at least one display,
  a document accepting device,
    wherein the document accepting device when fully operational is able to receive documents,
      wherein the document accepting device when fully operational is able to obtain data from received documents,
    wherein the document accepting device includes a plurality of sensors,
    wherein the document accepting device includes a plurality of indicators, wherein each indicator is operable to locally provide different outputs,
    wherein the document accepting device includes control circuitry,
      wherein the control circuitry is in operative connection with the sensors,
      wherein the control circuitry is operable responsive to document accepting device condition signals received from the sensors, to determine a current operational capability for each of a plurality of different functions of the document accepting device,
      wherein the control circuitry is operable to locally output for each respective determined operational capability, at least one function status signal indicative of the operational capability of the respective function,
      wherein the at least one function status signal for each respective function is usable in servicing the document accepting device,
      wherein the control circuitry is operable to locally output the at least one function status signal to a local machine servicer through the indicators,
  at least one door, wherein in an open condition the at least one door enables a local machine service person to access an interior area of the machine for servicing,
    wherein at least one of the indicators is visible to a local machine servicer only when the at least one door is in the open condition.

22. The apparatus according to claim 21 wherein the plurality of indicators include a plurality of visual indicators, wherein each visual indicator is operable to provide different visual outputs, wherein the control circuitry is operable to visually output the at least one function status signal through the visual indicators.

23. The apparatus according to claim 22 wherein at least one of the visual indicators is visible to a local machine servicer only when the at least one door is in the open condition.

24. The apparatus according to claim 21 wherein the document accepting device comprises a check accepting device.

* * * * *